(12) United States Patent
Farah

(10) Patent No.: US 12,552,882 B2
(45) Date of Patent: Feb. 17, 2026

(54) POLYMERIC DISINFECTANTS AND USES THEREOF

(71) Applicant: TECHNION RESEARCH & DEVELOPMENT FOUNDATION LTD., Haifa (IL)

(72) Inventor: Shady Farah, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 492 days.

(21) Appl. No.: 18/251,223

(22) PCT Filed: Oct. 27, 2021

(86) PCT No.: PCT/IL2021/051272
§ 371 (c)(1),
(2) Date: Apr. 28, 2023

(87) PCT Pub. No.: WO2022/091091
PCT Pub. Date: May 5, 2022

(65) Prior Publication Data
US 2023/0399423 A1    Dec. 14, 2023

Related U.S. Application Data

(60) Provisional application No. 63/107,315, filed on Oct. 29, 2020.

(51) Int. Cl.
| | | |
|---|---|---|
| C08F 126/06 | (2006.01) | |
| A01N 25/34 | (2006.01) | |
| A01N 33/12 | (2006.01) | |

(52) U.S. Cl.
CPC ............ C08F 126/06 (2013.01); A01N 25/34 (2013.01); A01N 33/12 (2013.01)

(58) Field of Classification Search
CPC ......... A01N 59/00; C08F 126/06; C08F 8/02; C08F 8/20
See application file for complete search history.

(56) References Cited

U.S. PATENT DOCUMENTS

2012/0129793 A1*   5/2012  Jain ..................... A61P 31/00
                                              514/23
2012/0183494 A1*   7/2012  Worley .................... B32B 9/00
                                              501/141

(Continued)

FOREIGN PATENT DOCUMENTS

CN     105505083 A      4/2016
WO     2008156636 A1   12/2008

OTHER PUBLICATIONS

Abdel Aziz et al; "Nanocomposites based on chitosan-graft-poly(n-vinyl-2-pyrrolidone): synthesis, characterization, and biological activity". International Journal of Polymeric Materials and Polymeric Biomaterials. 64(11), pp. 578-586. (2015).

(Continued)

*Primary Examiner* — Mark S Kaucher
(74) *Attorney, Agent, or Firm* — Knobbe, Martens, Olson & Bear, LLP

(57) ABSTRACT

Polymers including bifunctional mono- or poly-cyclic heterocyclic or heteroaromatic repeating units having disinfecting activity, compositions thereof, and methods for disinfecting surfaces utilizing the compositions. The method for disinfecting includes brushing, spraying, wiping, casting, dipping, or vapor coating, to the surface a disinfecting material to thereby render the surface antiseptic. The surface being disinfected by this method may be smooth, rough, tough, or soft, and may be selected from a cardboard, cloth, stainless steel or metallic surface, plastic, glass, wood, paper, surgical glove, or skin.

24 Claims, 21 Drawing Sheets

(56) References Cited

U.S. PATENT DOCUMENTS

| | | | |
|---|---|---|---|
| 2016/0058008 A1* | 3/2016 | Cao | A01K 1/0155 424/76.8 |
| 2017/0240435 A1* | 8/2017 | Chen | C08F 8/20 |
| 2018/0297957 A1* | 10/2018 | Wolff | A01N 43/50 |

OTHER PUBLICATIONS

Akdag A, et al; "The stabilities of N—Cl bonds in biocidal materials". Journal of Chemical Theory and Computation. 2 (3), pp. 879-884. (2006).

Bojian Hu, et al; Dual action bactericides: Quaternary ammonium/N-halamine-functionalized cellulose fiber. Journal of Applied Polymer Science, 131, pp. 1-7. (2014).

Chylinska M, et al; "Synthesis and biocidal activity of novel N-halamine hydantoin-containing polystyrenes". e-Polymers.14(1), pp. 15-25. (2014).

Jie, et al; "Eco-friendly synthesis of regenerable antimicrobial polymeric resin with N-halamine and quaternary ammonium salt groups". RSC Advances, 4 pp. 6048-6054. (2014).

Li, et al; "New biocide with both n-chloramine and quaternary ammonium moieties exerts enhanced bactericidal activity". Advanced healthcare materials 1, pp. 609-620. (2012).

Rai et al; "Jayakrishnan A. Development of new hydantoin-based biooidal polymers with improved reohargeability and anti-microbial activity". New Journal of Chemistry. 43(9), pp. 3778-3787. (2019).

Yang et al; "Theoretical studies on cycloaddition reactions of 2-azaallene cations with isocyanates". European Journal of Organic 10 pp. 1942-1947. 2003.

International Search Report and Written Opinion issued in International Application No. PCT/IL2021/051272, dated Jan. 26, 2022.

Behzadinasab et al. "A Surface Coating that Rapidly Inactivates SARS-CoV-2", Applied Materials & Interfaces, 12(31), pp. 34723-34727 (2020).

Extended European Search Report (EESR) issued in EP Application No. 21885524.5, dated Aug. 29, 2024. (7 pages).

\* cited by examiner

POLYMERIC DISINFECTANTS AND USES THEREOF

TECHNICAL FIELD

The present invention relates to polymers comprising bifunctional heterocyclic or heteroaromatic repeating units having disinfecting activity, compositions thereof, and methods of use.

BACKGROUND ART

While referring to commercially available disinfectants, the US Environmental Protection Agency (EPA) has prepared a list of disinfectants suitable for use against coronavirus. Though the major part of those disinfectants have not been tested on the SARS-CoV-2 directly, they were proved to be efficient against said virus, using other types of "enveloped viruses" as models. Based on the list prepared, most of the commercially available disinfectant formulations may be used in sites/places such as institutional, healthcare, and residential areas.

The commercially available disinfectants are all small molecules of different categories, including quaternary ammoniums; bleaches such as sodium hypochlorite, hypochlorous acid; peroxides of hydrogen peroxide, and peroxy acetic acid; alcohols such as ethanol and isopropanol; natural compounds such as citric acid, lactic acid and thymol; as well as others such as phenols and sodium chlorite. The disinfecting formulations listed by the EPA comprise either one of those active ingredients or a combination thereof.

For many years, viral infections are considered a critical issue. On December 2019, a new coronavirus emerged in Wuhan City, Hubei Province, China, and gained the name Severe Acute Respiratory Syndrome Coronavirus-2 (SARS-CoV-2). Said virus causes COVID-19 disease and shortly thereafter has become a worldwide pandemic. Coronaviridae is the family which includes the coronaviruses and subfamily of Coronavirinae. There are four types of coronaviruses classified as alpha, beta, gamma and delta. The SARS-CoV-2 belongs to the beta coronaviruses, which include severe acute respiratory syndrome virus (SARS-CoV), Middle East respiratory syndrome virus (MERS-CoV), and the recently discovered SARS-CoV-2. SARS-CoV-2 attacks the lower respiratory systems causing a viral pneumonia, and may further attack the gastrointestinal system, kidneys, heart, and central nervous system. Like other coronaviruses, SARS-CoV-2 includes a single stranded positive RNA (+ssRNA) molecule; an envelope glycoprotein spike (S) responsible for recognizing the host cell receptors; and membrane (M) proteins responsible for shaping the virions.

SUMMARY OF INVENTION

In one aspect, the present invention provides a polymer represented by the formula Q-[L-A]$_n$, wherein:

Q is an aliphatic chain optionally interrupted by one or more groups each independently selected from —O—, —CO—, —NH—, —S—, —CO—NH—, —NH—CO—, —NH—CO—NH—, cycloalkylene, cycloalkenylene, arylene, and heteroarylene, and further optionally substituted by one or more groups each independently selected from alkyl, —O-alkyl, cycloalkyl, cycloalkenyl, heterocyclyl, aryl, and heteroaryl;

L is selected from alkylene, alkenylene, alkynylene, cycloalkylene, cycloalkenylene, arylene, and heteroarylene, wherein said alkylene, alkenylene and alkynylene each independently is optionally interrupted by one or more groups each independently selected from —O—, —CO—, —NH—, —S—, —CO—NH—, —NH—CO—, —NH—CO—NH—, cycloalkylene, cycloalkenylene, arylene, and heteroarylene;

A each independently is a mono- or poly-cyclic heterocyclyl or heteroaryl of the formula I, II, III, or IV:

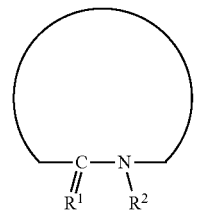

I

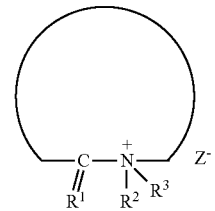

II

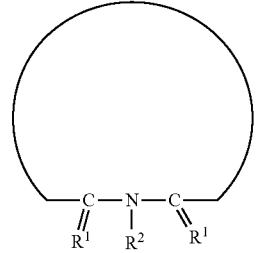

III

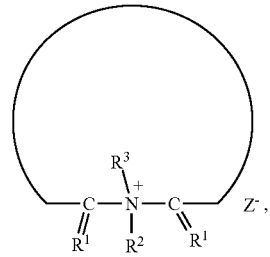

IV linked to group L via any one of the ring atoms, and optionally further substituted with one or more groups each independently selected from =O, =S, halogen, —CN, —OH, —COOH, =N—OH, —NO$_2$, alkyl, cycloalkyl, cycloalkenyl heterocyclyl, aryl, heteroaryl, —N(R$^4$)$_2$, —NR$^4$C(O)N(R$^4$)$_2$, [—NR$^4$C(O)—NR$^4$—(CH$_2$)$_l$—NR$^4$C(O)—NR$^4$]$_m$—R$^5$, —N=R$^5$, and —O$^-$B$^+$, wherein said alkyl, cycloalkyl, cycloalkenyl, heterocyclyl, aryl, and heteroaryl each independently is optionally substituted with one or more groups each independently selected from halogen, —OH, —COOH, =O, =S, and —N(R$^4$)$_2$;

R$^1$ each independently is O or S, preferably O;
R$^2$ is H, halogen, alkyl, or represents group L;
R$^3$ is alkyl;
R$^4$ each independently is H, halogen, alkyl, cycloalkyl, cycloalkenyl, heterocyclyl, aryl, or heteroaryl;
R$^5$ each independently is cycloalkenyl, cycloalkyl, or heterocyclyl;

l and m each independently is an integer of at least 1;
n is an integer of at least 1;
B⁺ is an organic cation or a metal ion; and
Z⁻ is a counter anion,
provided that (i) group A each independently optionally comprises at least one quaternary ammonium group, at least one N-halogen, preferably N—Cl, bond, or both at least one quaternary ammonium group and at least one N-halogen bond; and (ii) at least about 1%, e.g., at least about 2%, 5%, 10%, 15%, 20%, 30%, 40%, 50%, 60%, 70%, 80%, 90%, or more, of the A groups comprises both at least one quaternary ammonium group and at least one N-halogen, preferably N—Cl, bond.

In certain embodiments, the polymer disclosed herein is represented by the formula V:

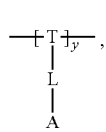

V wherein T is a group of the formula $C_pR^6{}_{2p-1}$ optionally interrupted by at least one group each independently selected from —O—, —CO—, —NH—, —S—, —CO—NH—, —NH—CO—, —NH—CO—NH—, cycloalkylene, cycloalkenylene, arylene, and heteroarylene; $R^6$ each independently is H, alkyl, —O-alkyl, cycloalkyl, cycloalkenyl, heterocyclyl, aryl, or heteroaryl; p is an integer of at least 1; and y is an integer of at least 2.

In another aspect, the present invention provides a composition comprising a polymer as disclosed herein, i.e., a polymer of the formula Q-[L-A]$_n$, e.g., when represented by the formula V, each as defined above.

In yet another aspect, the present invention thus provides a surface coating material, or a surface disinfecting material such as a wet wipe, comprising a composition as defined above.

In still another aspect, the present invention provides a wet wipe impregnated with, or comprising, a composition as defined above.

In a further aspect, the present invention relates to a method for disinfecting a surface, said method comprising applying, e.g., by brushing, spraying, wiping, casting, dipping, or vapor coating, to said surface a disinfecting material as defined above, to thereby render said surface antiseptic. The surface being disinfected by this method may be smooth, rough, tough, or soft, and may be selected from, e.g., a cardboard, cloth, stainless steel or metallic surface, plastic, glass, wood, paper, surgical glove, or skin.

In still another aspect, the present invention relates to a functionalized compound derived from a heterocyclic ring selected from the compounds referred to herein as SM-1, SM-2, SM-3, SM-7, SM-8, SM-9, SM-10, SM-12, SM-13, SM-14, SM-15, SM-16, SM-17, SM-18, SM-19, SM-20, SM-21, SM-22, SM-23, SM-25, SM-28, SM-29, SM-30, SM-31, SM-32, SM-33, SM-34, SM-35, SM-36, SM-37, SM-38, SM-41, SM-42, SM-43, SM-44, SM-47, SM-48, SM-49, and SM-50 (see Table 1), wherein at least one of the nitrogen atoms of the heterocyclic ring is alkylated, preferably methylated, thereby forming a quaternary ammonium group; and/or at least one nitrogen atom is halogenated, preferably chlorinated, thereby forming a N-halogen, preferably N—Cl, bond. Particular such compounds are bifunctional, wherein at least one of the nitrogen atoms of the heterocyclic ring is alkylated, and at least one nitrogen atom is halogenated. The compounds disclosed herein, either per se or when comprised within a composition, when applied to a surface as defined above, are capable of rendering said surface antiseptic.

In yet another aspect, the present invention thus relates to a composition comprising a functionalized compound as defined above, or a mixture thereof. Such a composition may be comprised within a surface coating- or disinfecting material, or impregnated within a wet wipe.

DETAILED DESCRIPTION

Figure 1:
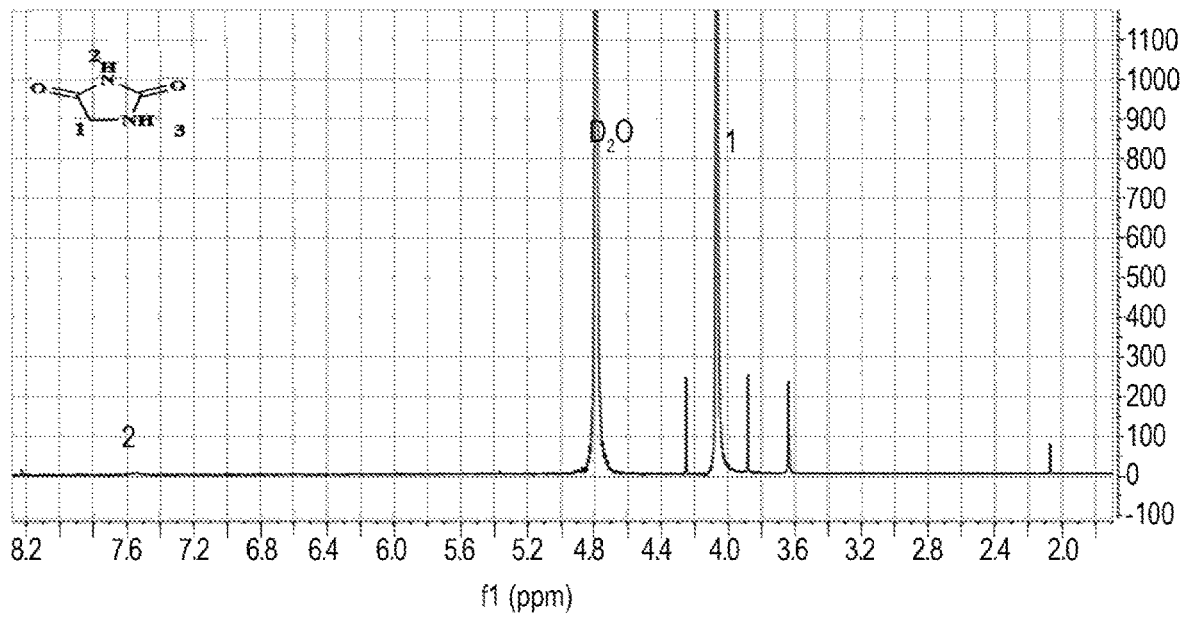
FIG. 1 shows ¹H NMR of commercial hydantoin (SM1) in D₂O at 400 MHz NMR.
Figure 2:
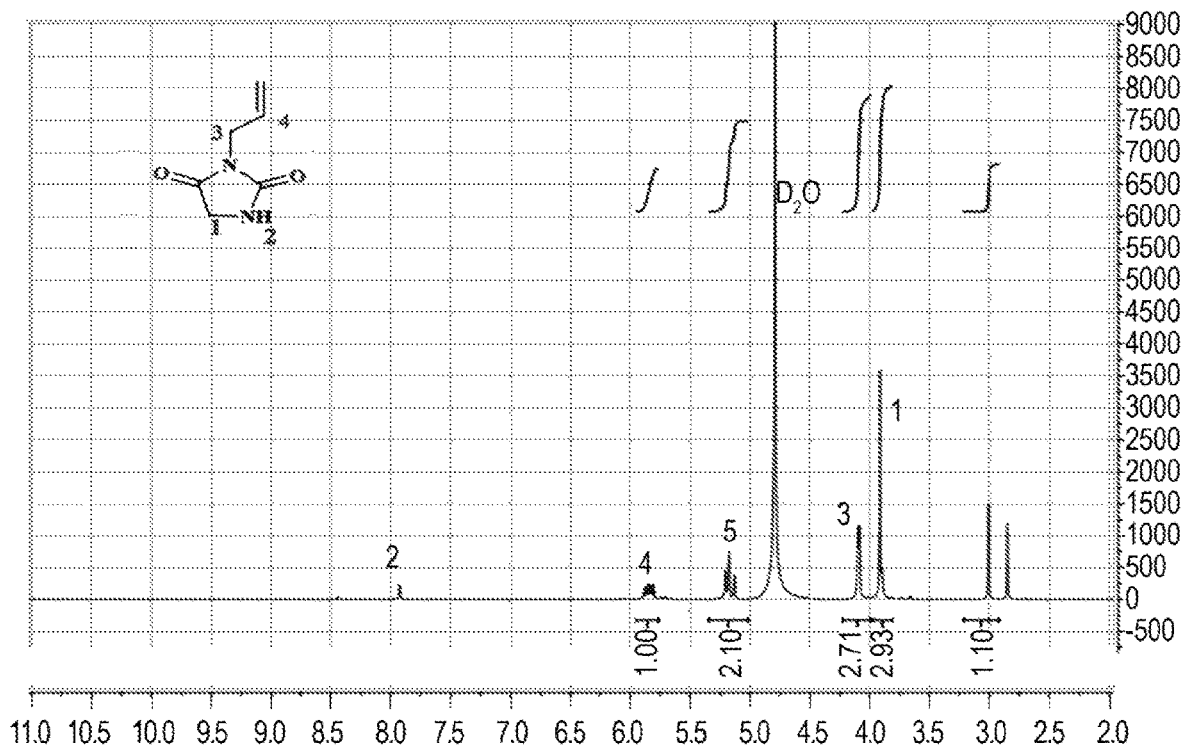
FIG. 2 shows ¹H NMR of allyl hydantoin monomer (M1) in D₂O at 400 MHz NMR (non-purified).
Figure 3:
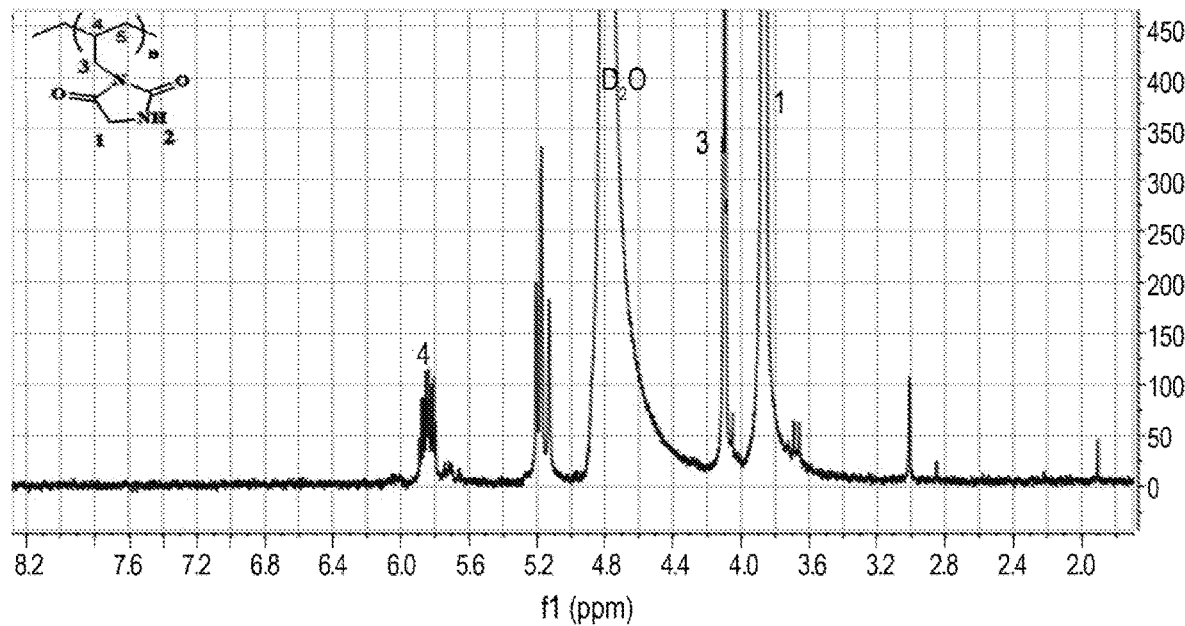
FIG. 3 shows ¹H NMR of hydantoin polymer (P1) in D₂O at 400 MHz NMR (non-purified).
Figure 4:
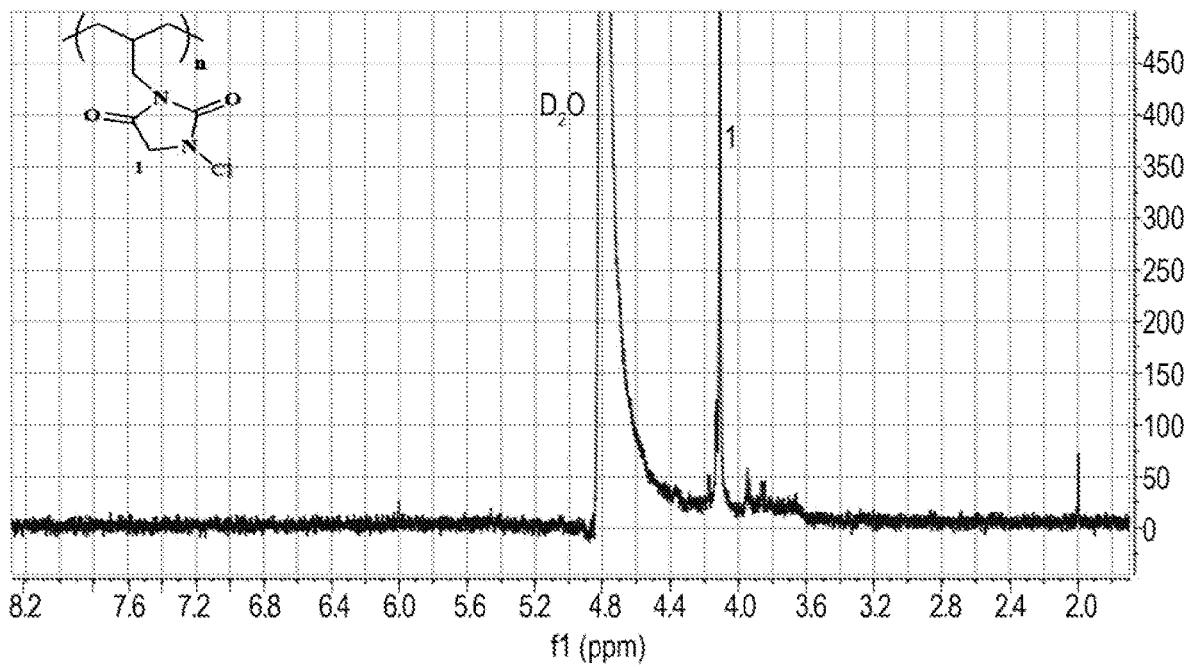
FIG. 4 shows ¹H NMR of chlorinated hydantoin polymer (P1Cl) in D₂O at 400 MHz NMR (non-purified).
Figure 5:
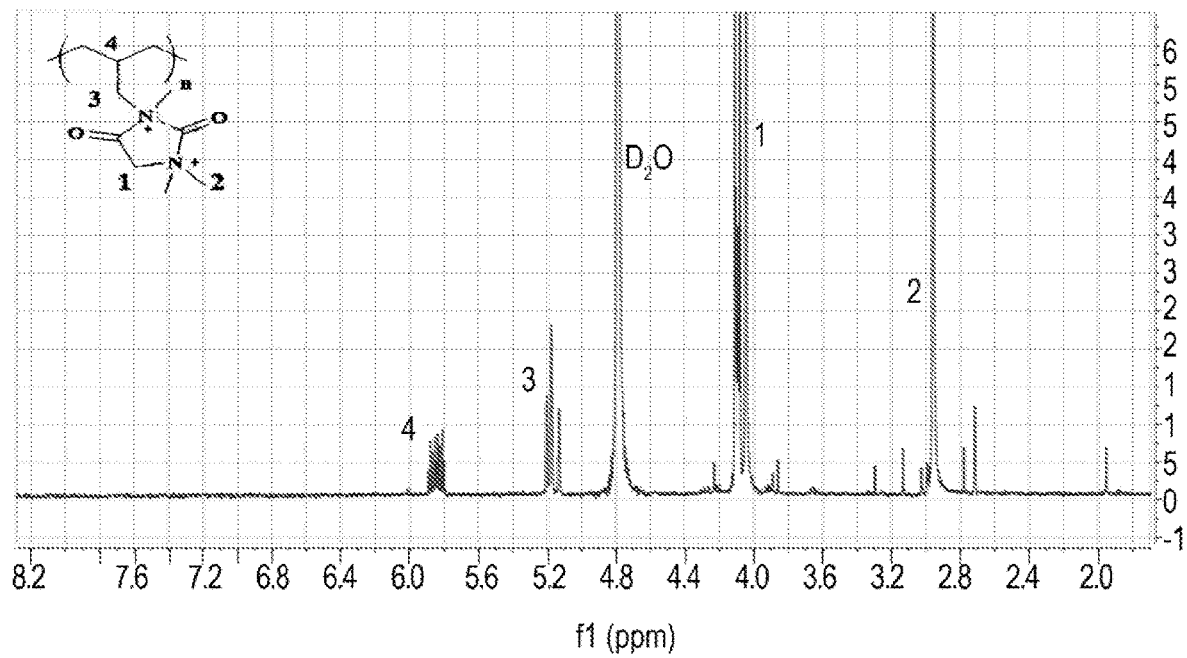
FIG. 5 shows ¹H NMR of quaternized hydantoin polymer (P1Q) in D₂O at 400 MHz NMR (non-purified).
Figure 6:
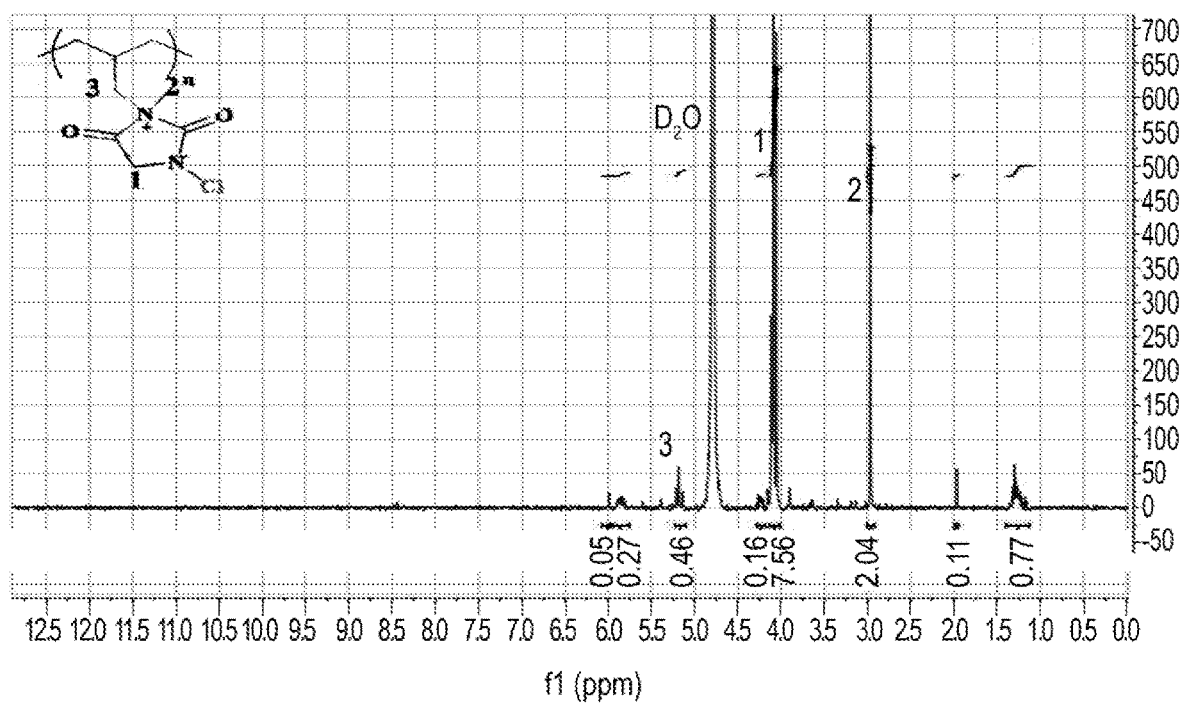
FIG. 6 shows ¹H NMR of hydantoin polymer both chlorinated and quaternized (P1ClQ) in D₂O at 400 MHz NMR.
Figure 7:
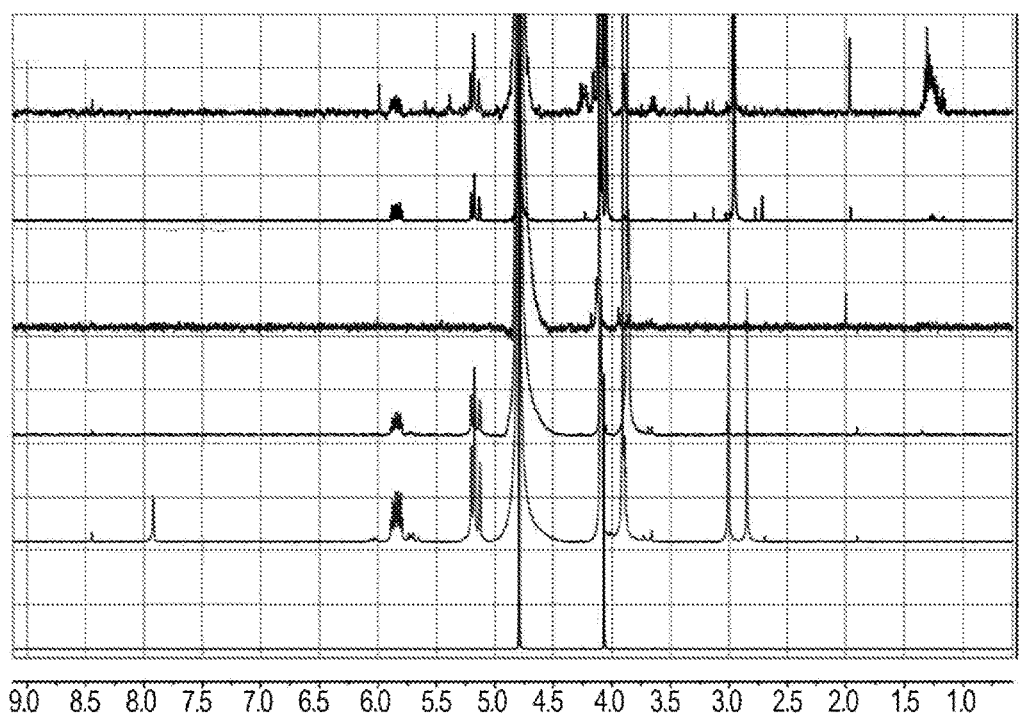
FIG. 7 shows ¹H NMR spectra of SM1, M1, P1, P1Cl, P1Q, and P1ClQ (from bottom to top, respectively) in D₂O at 400 MHz NMR.
Figure 8A:
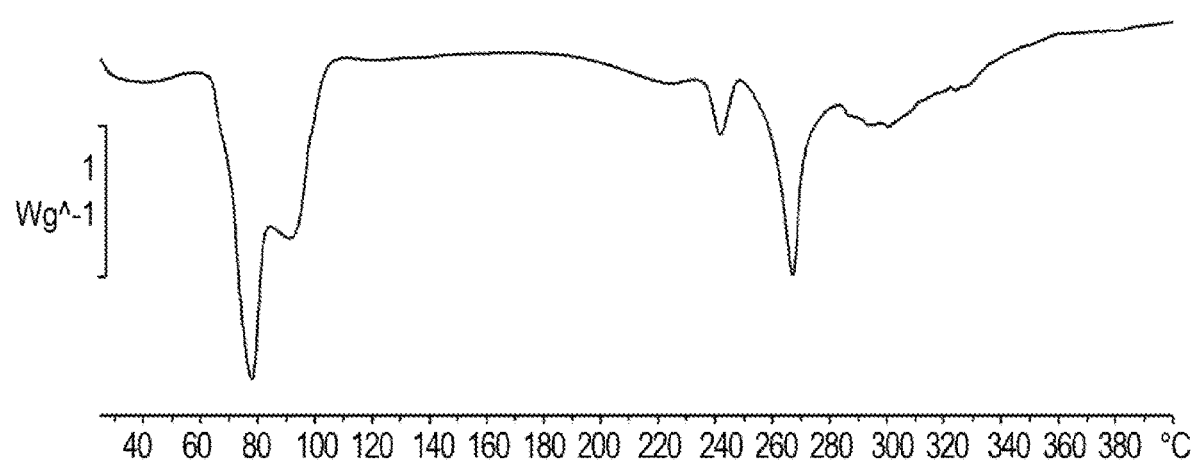
FIGS. 8A-8D show DSC studies of P1, P1Cl, P1Q and P1ClQ (8A, 8B, 8C and 8D, respectively), performed at a heating rate of 10° C./min from room temperature to 400° C. under N₂ atmosphere.
Figure 8B:
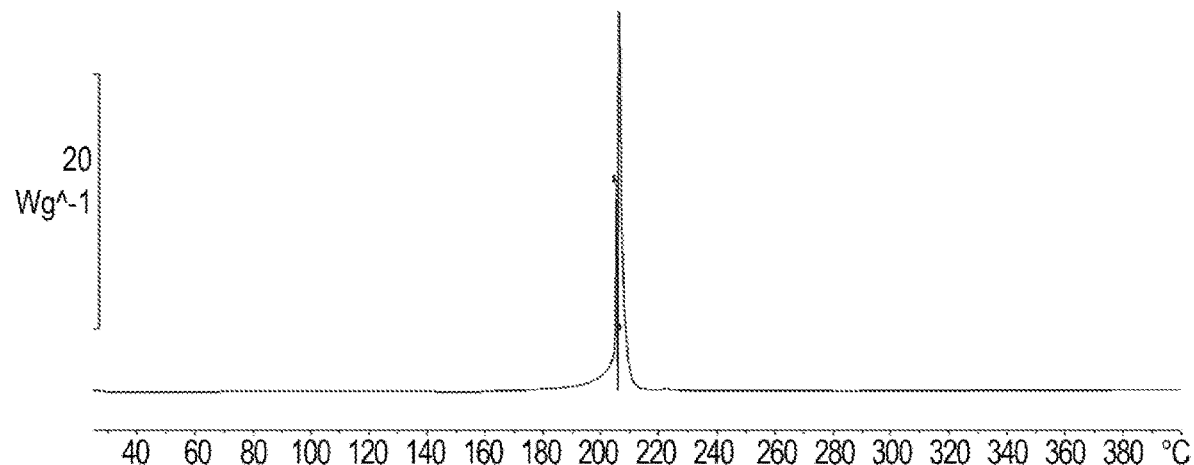
Figure 8C:
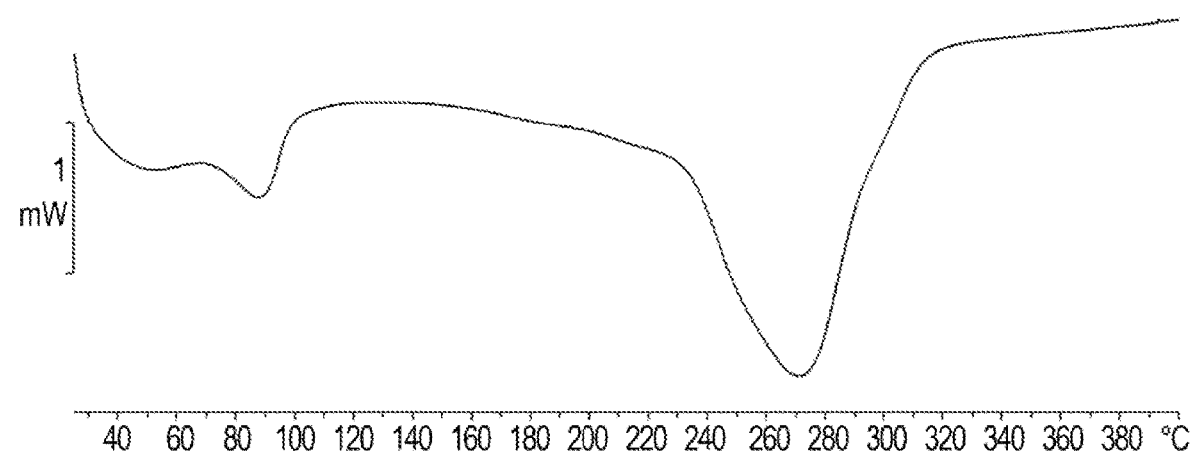
Figure 8D:
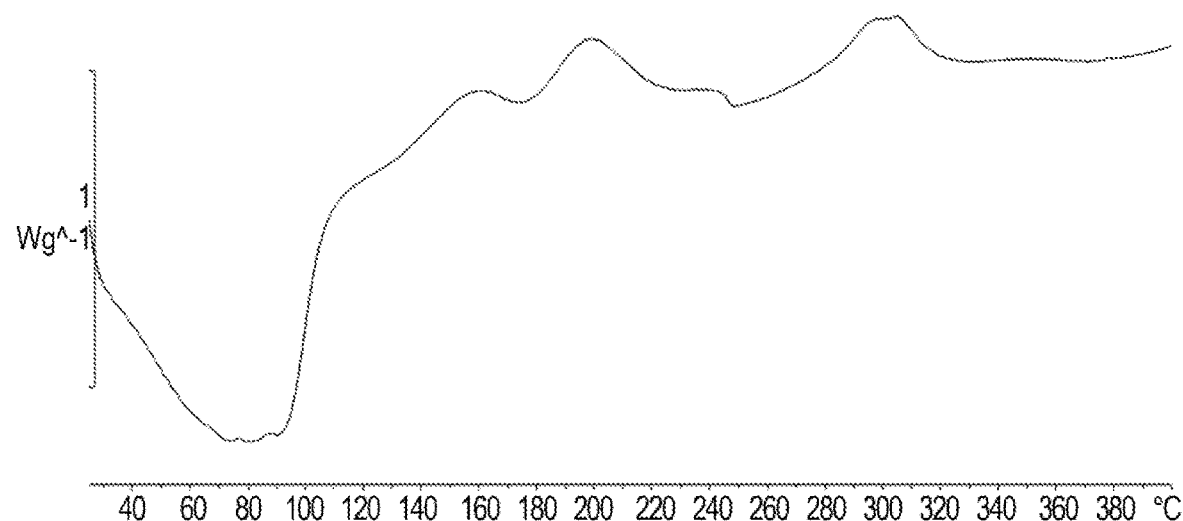

The studies described in the Experimental section herein summarize the design, preparation and evaluation of aliphatic backbone-based polymers having bifunctional mono- or poly-cyclic heterocyclic or heteroaromatic repeating units, which have antiviral activity and may thus be used as disinfectants. Fifty different polymer groups, each comprising a different heterocyclic or heteroaromatic group functionalized with at least one quaternary ammonium group, at least one N—Cl bond, or both at least one quaternary ammonium group and at least one N—Cl bond, have been prepared, and tested. Particular polymers capable of continuously releasing a hypohalogen (a halogen having a positive charge, e.g., $Cl^+$ and $Br^+$) and having superior activity were discovered. The various functionalized polymers were tested for antiviral efficiency using a high throughput plan, where they evaluated for anti-SARS-CoV-2 efficiency at 3 levels: (1) SARS-CoV-2 spike RBD: ACE2 inhibitor screening assay kit; (2) pseudovirus SARS-CoV-2 activity test; and finally against a clinically isolated SARS-CoV-2 strain.

The superior polymers identified were found to be highly effective against SARS-CoV-2, and capable of inactivating key features of virus thereby destabilizing it and demolishing thus limiting its infectivity. Those polymers exhibited activity that was stronger than that of the household bleach, exhibiting over 99.9% activity against the SARS-CoV-2 spikes at 60 times lower concentration of the bleach, 3 log reduction in 10 min and 99.99% deactivation of infection capability of SARS-CoV-2 in the pseudovirus model, and up to 5 log reduction of infection capability of a clinically isolated intact SARS-CoV-2 virus. Moreover, said polymers were found to maintain their anti-SARS-CoV-2 activity against the spikes on varied surfaces including plastic, glass, cardboard, fabric, wood, and stainless steel, even following a week in a ventilated open space. The superior polymers were further examined for safety and toxicity against different human cells including skin, lungs, and kidney cells, as well as against non-human primates Vero-E6 cells, for up to 72 hours. The polymers showed no toxicity, and higher safety profile in comparison to household bleach, which found to demolish cells quickly starting after 90 minutes.

Nevertheless, the polymers having bifunctional repeating units (regardless of the specific repeating units used) were found to exhibit the strongest antiviral efficiency compared to each functionality separately, indicating the importance of dual functionality on the same repeating unit, and suggesting a mechanism of action where the positive charge attracts the virus and the hypohalogen slowly released in close distance causes a major damage to the virus, which consequently lose its infection capability and demolished. The particular polymers having a superior activity are anticipated to exhibit wide spectrum activity against large spectrum of cellular and acellular (other viruses) elements, and may thus be highly effective as disinfectants.

In one aspect, the present invention thus provides a polymer represented by the formula Q-[L-A]$_n$ as defined above.

The term "aliphatic chain" as used herein refers to a linear or branched hydrocarbon chain having up to, e.g., 10, 20, 30, 40, 50, 60, 70, 80, 90, 100, 200, 300, 400, 500, 1000, or more, carbon atoms. The aliphatic chain may be saturated or unsaturated, i.e., containing one or more double and/or triple bonds. The aliphatic chain may optionally be interrupted by one or more groups each independently selected from —O—, —CO—, —NH—, —S—, —CO—NH—, —NH—CO—, —NH—CO—NH—, cycloalkylene, cycloalkenylene, arylene, and heteroarylene, and/or substituted by one or more groups each independently selected from alkyl, —O-alkyl, cycloalkyl, heterocyclyl, aryl, and heteroaryl.

The term "alkyl" as used herein refers to a saturated hydrocarbyl, i.e., a univalent group derived from a saturated aliphatic chain as defined herein by removal of hydrogen atom from any of the carbon atoms. Particular alkyl groups are (C$_1$-C$_{20}$)alkyl such as methyl, ethyl, n-propyl, isopropyl, n-butyl, sec-butyl, isobutyl, tert-butyl, n-pentyl, isopentyl, neopentyl, 2,2-dimethylpropyl, n-hexyl, isohexyl, n-heptyl, 1,1-dimethylpentyl, 1,1-dimethylbutyl, 2,2-dimethylbutyl, 2-ethylbutyl, 1,1-dimethylheptyl, 1,2-dimethylheptyl, n-octyl, n-nonyl, n-decyl, n-undecyl, n-dodecyl, and the like. Preferred are (C$_1$-C$_8$)alkyl, (C$_1$-C$_6$)alkyl, or (C$_1$-C$_4$)alkyl groups.

The terms "alkenyl" and "alkynyl" as used herein refer to unsaturated hydrocarbyls containing one or more double or triple bonds, respectively, i.e., univalent radicals derived from unsaturated aliphatic chains by removal of hydrogen atom from any of the carbon atoms. Particular alkenyl and alkynyl groups are (C$_2$-C$_{20}$)alkenyl and (C$_2$-C$_{20}$)alkynyl groups, such as ethenyl, propenyl, 3-buten-1-yl, 2-ethenylbutyl, 3-octen-1-yl, 3-nonenyl, 3-decenyl, and the like; and propynyl, 2-butyn-1-yl, 3-pentyn-1-yl, 3-hexynyl, 3-octynyl, 4-decynyl, and the like. Preferred are (C$_2$-C$_8$)alkenyl and (C$_2$-C$_8$)alkenyl, (C$_2$-C$_6$)alkenyl and (C$_2$-C$_6$)alkenyl, or (C$_2$-C$_4$)alkenyl and (C$_2$-C$_4$)alkenyl groups.

The term "alkylene" as used herein refers to a saturated hydrocarbylene, i.e., a divalent group derived from a saturated aliphatic chain as defined herein by removal of two hydrogen atoms from any of the carbon atoms. Particular alkylene groups are (C$_1$-C$_{20}$)alkylene such as methylene, ethylene, propylene, butylene, 2-methylpropylene, pentylene, 2-methylbutylene, hexylene, and the like. Preferred are (C$_1$-C$_8$)alkylene, (C$_1$-C$_6$)alkylene, or (C$_1$-C$_4$)alkylene groups.

The terms "alkenylene" and "alkynylene" as used herein refer to unsaturated divalent groups derived from unsaturated aliphatic chains having one or more double or triple bonds, respectively, by removal of two hydrogen atoms from any of the carbon atoms. Particular alkenylene and alkynylene groups are (C$_2$-C$_{20}$)alkenylene or (C$_2$-C$_{20}$)alkynylene groups, such as ethenylene, propenylene, 3-buten-1-yl, 2-ethenylbutyl, 3-octen-1-yl, 3-nonenyl, 3-decenyl, and the like; and propynyl, 2-butyn-1-yl, 3-pentyn-1-yl, 3-hexynyl, 3-octynyl, 4-decynyl, and the like. Preferred are (C$_2$-C$_8$)alkenylene and (C$_2$-C$_8$)alkynylene, (C$_2$-C$_6$)alkenylene and (C$_2$-C$_6$)alkynylene, or (C$_2$-C$_4$)alkenylene and (C$_2$-C$_4$)alkynylene groups.

The term "aliphatic ring", also referred to as "carbocyclic ring", means a mono-, bi-, or poly-cyclic non-aromatic hydrocarbon having, e.g., 3-12 carbon atoms. The carbocyclic ring may be saturated, such as cyclopropane, cyclobutane, cyclopentane, cyclohexane, cycloheptane, adamantane, and the like; or unsaturated, i.e., having one or more double bonds, such as cyclopropene, cyclobutene, cyclopentene, cyclohexene, and the like.

The term "cycloalkyl" as used herein refers to a univalent group derived from a saturated carbocyclic ring by removal of hydrogen atom from any of the carbon atoms. Examples of cycloalkyls include, without limiting, (C$_3$-C$_{12}$)cycloalkyl groups such as cyclopropyl, cyclobutyl, cyclopentyl, cyclohexyl, cycloheptyl, adamantyl.

The term "cycloalkenyl" as used herein refers to a univalent group derived from an unsaturated carbocyclic ring by removal of hydrogen atom from any of the carbon atoms. Examples of such radicals include, without limiting, (C$_3$-C$_8$)cycloalkenyl such as cyclopropenyl (e.g., 2-cyclopropen-1-yl), cyclobutenyl (e.g., 2-cyclobuten-1-yl), cyclopentenyl (e.g., 2-cyclopenten-1-yl, or 3-cyclopenten-1-yl), cyclohexenyl (e.g., 2-cyclohexen-1-yl, or 3-cyclohexen-1-yl), and the like.

The terms "cycloalkylene" and "cycloalkenylene" as used herein refer to a saturated or unsaturated divalent radical, derived from a saturated or unsaturated carbocyclic ring as defined herein, respectively, by removal of two hydrogen atoms from any of the carbon atoms. Examples of such radicals include, without limiting, (C$_3$-C$_{10}$)cycloalkylene such as cyclopropylene, cyclobutylene, cyclopentylene, cyclohexylene, cycloheptylene, and the like; and (C$_3$-C$_{10}$) cycloalkenylene such as cyclopropenylene (e.g., 2-cyclopropen-1-yl-2-yl), cyclobutenylene (e.g., 2-cyclobuten-1-yl-4-yl), cyclopentenylene (e.g., 2-cyclopenten-1-yl-4-yl, and 2-cyclopenten-1-yl-5-yl), cyclohexenylene (e.g., 2-cyclohexen-1-yl-4-yl, and 2-cyclohexen-1-yl-5-yl), and the like.

The term "heterocyclic ring" denotes a mono-, bi-, or poly-cyclic non-aromatic ring having, e.g., 3-12 atoms including at least one carbon atom and at least one heteroatom selected from nitrogen, oxygen, and sulfur (optionally oxidized), which may be saturated or unsaturated, i.e., containing at least one unsaturated bond. Preferred are 5- or 6-membered heterocyclic rings. Non-limiting examples of heterocyclic rings include azetidine, pyrrolidine, piperidine, morpholine, thiomorpholine, piperazine, oxazolidine, thiazolidine, imidazolidine, oxazoline, thiazoline, imidazoline, dioxole, dioxolane, dihydrooxadiazole, pyran, dihydropyran, tetrahydropyran, thiopyran, dihydrothiopyran, tetrahydrothiopyran, 1-oxidotetrahydrothiopyran, 1,1-dioxidotetrahydrothiopyran, tetrahydrofuran, pyrazolidine, pyrazoline, tetrahydropyrimidine, dihydrotriazole, tetrahydrotriazole, azepane, dihydropyridine, tetrahydropyridine, and the like. The term "heterocyclyl" as used herein refers to a univalent radical derived from a heterocyclic ring by removal of hydrogen atom from any of the ring atoms.

The term "aromatic ring" denotes an aromatic carbocyclic ring having, e.g., 6-14 carbon atoms, and consisting of a single ring or multiple rings either condensed or linked by a covalent bond. Non-limiting examples of aromatic rings include benzene, naphthalene, anthracene, naphthacene, phenanthrene, pyrene, chrysene, tetracene, and triphenylene. The term "aryl" as used herein denotes a univalent group derived from an aromatic ring by removal of hydrogen atom from any of the ring atoms. The term "arylene" as used herein refers to a divalent group derived from an aromatic ring by removal of two hydrogen atoms from any of the ring atoms.

The term "heteroaromatic ring" denotes a mono-, bi-, or poly-cyclic aromatic ring having, e.g., 4-12 atoms, and consisting of at least one carbon atom and at least one heteroatom selected from nitrogen, oxygen, sulfur (optionally oxidized). Preferred are 5- or 6-membered heteroaromatic rings. Non-limiting examples of heteroaromatic ring include thiophene, imidazole, pyridine, furan, pymole, oxazole, thiazole, purine, indole, pyrrole, pyrazine, isoquinoline, pyrazole, isoxazole, thiazole, isothiazole, pyrazine, pyrimidine, pyridazine, carbazole. The term "heteroaryl" as used herein refers to a univalent group derived from a heteroaromatic ring as defined herein by removal of hydrogen atom from any of the ring atoms. The term "heteroarylene" as used herein denotes a divalent group derived from a heteroaromatic ring as defined herein by removal of two hydrogen atoms from any of the ring atoms.

The term "halogen" as used herein refers to a halogen and includes fluoro, chloro, bromo, and iodo, but it is preferably chloro.

The term "metal ion" as used herein means an ion of a metal, e.g., an alkali metal such as lithium, sodium, or potassium, and alkaline earth metal such as calcium and magnesium.

The term "organic cation" as used herein refers to an amine of the formula $R_4N^+$, wherein each one of the Rs independently is selected from H, $C_1$-$C_{22}$, preferably $C_1$-$C_{18}$ alkyl, such as methyl, ethyl, propyl, isopropyl, n-butyl, sec-butyl, isobutyl, tert-butyl, n-pentyl, 2,2-dimethylpropyl, n-hexyl, and the like, phenyl, or heteroaryl such as pyridyl, imidazolyl, pyrimidinyl, and the like, or two of the Rs together with the nitrogen atom to which they are attached form a 3-7 membered ring optionally containing a further heteroatom selected from N, S and O, such as pyrrolydine, piperidine and morpholine.

The term "counter anion" as used herein refers to an anion such as an halide, e.g., fluoride ($F^-$), chloride ($Cl^-$), bromide ($Br^-$), and iodide ($I^-$), but preferably iodide, or an organic anion, e.g., mesylate, maleate, fumarate, tartrate, p-toluenesulfonate, benzenesulfonate, benzoate, acetate, phosphate, sulfate, citrate, carbonate, and succinate.

In certain embodiments, the present invention provides a polymer of the formula Q-[L-A]$_n$ as defined above, wherein A each independently is a mono- or poly-cyclic heterocyclyl or heteroaryl of the formula II or IV as defined above, e.g., of the formula IIa, IIb, IVa, IVb, IVc, or IVd:

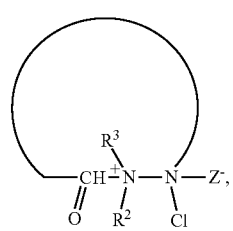

IIa

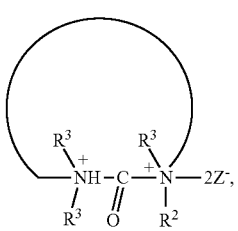

IIb

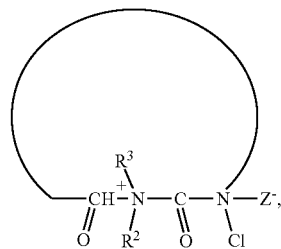

IVa

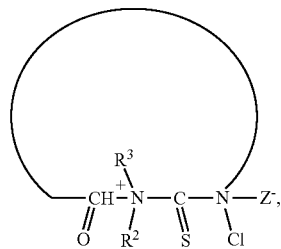

IVb

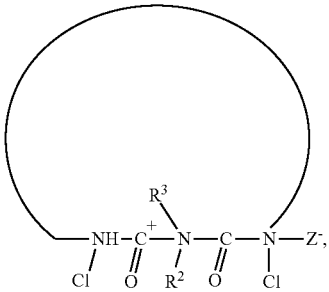

IVc

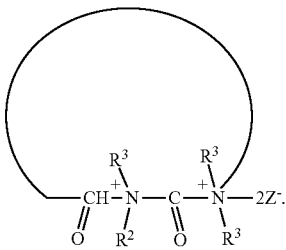

IVd

The polymer of the present invention consists of an aliphatic backbone referred to herein as group "Q", to which multiple repeating units, each referred to herein as group "A", are linked via linkers each referred to herein as group "L". According to the present invention, each one of the repeating units independently is a mono- or poly-cyclic heterocyclyl or heteroaryl of the formula I, II, III, or IV, optionally substituted, as defined above, and may comprise at least one quaternary ammonium group and/or at least one N-halogen, preferably N—Cl, bond. Yet, at least about 1%, e.g., at least about 2%, 5%, 10%, 15%, 20%, 30%, 40%, 50%, 60%, 70%, 80%, 90%, or more, of the A groups, each is a bifunctional group comprising both at least one quaternary ammonium group and at least one N-halogen, preferably N—Cl, bond.

The repeating units linked to the aliphatic backbone of the polymer may be identical, i.e., of the same formula I, II (e.g., IIa or IIb), III, or IV (e.g., IVa, IVb, IVc, or IVd), either non-substituted or substituted in an identical manner, or different. Yet, it should be clear that identical repeating units may still be differently functionalized, having either at least one quaternary ammonium group or at least one N-halogen bond, or both at least one quaternary ammonium group and at least one N-halogen bond. Particular polymers according to the present invention are those comprising identical repeating units, wherein some of the repeating units may have either at least one quaternary ammonium group or at least one N-halogen bond, but at least about 1% e.g., at least about 2%, 5%, 10%, 15%, 20%, 30%, 40%, 50%, 60%, 70%, 80%, 90%, or more, of said units are bifunctional, i.e., have both at least one quaternary ammonium group and at least one N-halogen bond.

In certain embodiments, the polymer disclosed herein, i.e., the polymer of the formula Q-[L-A]$_n$, as defined in any one of the embodiments above, is represented by the formula V:

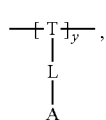

wherein T is a group of the formula $C_pR^6_{2p-1}$ optionally interrupted by one or more groups each independently selected from —O—, —CO—, —NH—, —S—, —CO—NH—, —NH—CO—, —NH—CO—NH—, cycloalkylene, cycloalkenylene, arylene, and heteroarylene; $R^6$ each independently is H, alkyl, —O-alkyl, cycloalkyl, cycloalkenyl, heterocyclyl, aryl, or heteroaryl; p is an integer of at least 1, preferably at least 2; and y is an integer of at least 2, e.g., at least 20, 30, 40, 50, 100, 150, 200, 500, 1000, 2000, 3000, 4000, 5000, or more.

In certain embodiments, the present invention provides a polymer the formula V, wherein $R^6$ each independently is H, or alkyl such as methyl, ethyl, propyl, or butyl. More particular such embodiments are those wherein $R^6$ is H.

In certain embodiments, the present invention provides a polymer the formula V, wherein p is 2 or 3.

In certain embodiments, the present invention provides a polymer the formula V, wherein L is $(C_1-C_6)$alkylene, e.g., is $(C_1-C_3)$alkylene such as methylene, ethylene, or propylene.

In certain embodiments, the present invention provides a polymer the formula V, wherein A is a 5-7-membered mono-cyclic or 9-12-membered poly-cyclic heterocyclyl of the formula I, II, III, or IV, as defined above. In particular such embodiments, A is (i) a group of the formula II, wherein $R^1$ is O or S; or (ii) a group of the formula IV, wherein one of $R^1$ is O and the other one of $R^1$ is O or S; and $R^2$ represents group L, e.g., wherein $R^3$ is methyl. More particular such embodiments are those wherein $R^3$ is methyl; and the ring comprises a further nitrogen atom adjacent to one of the —C($R^1$)— groups and substituted with Cl.

In certain particular such embodiments, the disclosed polymer has the formula V, wherein A is a group of the formula IVa, more specifically of the formula IVa$_1$:

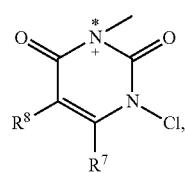

wherein $R^7$ and $R^8$ each independently is selected from H, —NH$_2$, halogen, —N(halogen)$_2$, $(C_1-C_6)$alkyl, —NO$_2$, —COOH, —O$^-$B$^+$, and —N=heterocyclyl, wherein said alkyl and heterocyclyl each independently is optionally substituted with one or more groups each independently selected from halogen, —OH, —COOH, =O, =S, and —N(R$^4$)$_2$; $R^4$ each independently is H, halogen, alkyl, cycloalkyl, cycloalkenyl, heterocyclyl, aryl, or heteroaryl; and • represents the point of attachment to group L. More particular such embodiments are those wherein (i) at least one of $R^7$ and $R^8$ is H, —NH$_2$, or methyl; (ii) $R^7$ and $R^8$ each is H, —NH$_2$, or methyl; (iii) $R^7$ is H, and $R^8$ is —NCl$_2$, —NO$_2$, methyl, ethyl, F, Cl, or Br; (iv) $R^7$ is —COOH, and $R^8$ is H; (v) $R^7$ is Cl, and $R^8$ is H; or (v) $R^7$ is —O$^-$B$^+$, wherein B$^+$ is ammonium, and $R^8$ is 1,3-dichloro-5-imino-pyrimidinyl-2,4,6(1H,3H,5H)-trione.

In other particular such embodiments, the disclosed polymer has the formula V, wherein A is a group of the formula IVb, more specifically of the formula IVb$_1$:

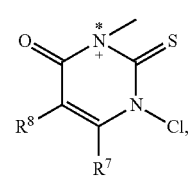

wherein $R^7$ and $R^8$ each independently is selected from H, —NH$_2$, halogen, —N(halogen)$_2$, $(C_1-C_6)$alkyl, —NO$_2$, —COOH, —O$^-$B$^+$, and —N=heterocyclyl wherein said alkyl and heterocyclyl each independently is optionally substituted with one or more groups each independently selected from halogen, —OH, —COOH, =O, =S, and —N(R$^4$)$_2$; $R^4$ each independently is H, halogen, alkyl, cycloalkyl, cycloalkenyl, heterocyclyl, aryl, or heteroaryl; and • represents the point of attachment to group L. More particular such embodiments are those wherein (i) at least one of $R^7$ and $R^8$ is H, —NH$_2$, or methyl; or (ii) $R^7$ and $R^8$ each is H.

In yet other particular such embodiments, the disclosed polymer has the formula V, wherein A is a group of the formula IVa, more specifically of the formula IVa$_2$:

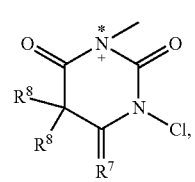

wherein $R^7$ is O or S; $R^8$ each independently is selected from H, —NH$_2$, halogen, —N(halogen)$_2$, $(C_1-C_6)$alkyl, —NO$_2$, —COOH, —OH, —O$^-$B$^+$, heterocyclyl, and —N(CH$_2$COOH)$_2$, wherein said alkyl and heterocyclyl each independently is optionally substituted with one or more groups each independently selected from halogen, —OH, —COOH, =O, =S, and —N(R$^4$)$_2$; $R^4$ each independently is H, halogen, alkyl, cycloalkyl, cycloalkenyl, heterocyclyl, aryl, or heteroaryl; and • represents the point of attachment to group L. More particular such embodiments are those wherein (i) $R^7$ is O, one of $R^8$ is —OH, and the other one of $R^8$ is 1,3-dichloro-5-hydroxy-5-pyrimidinyl-2,4,6(1H,3H, 5H)-trione; (ii) $R^7$ is O, and $R^8$ each is H; (iii) $R^7$ is O, one of $R^8$ is —$NO_2$, and the other one of $R^8$ is H; (iv) $R^7$ is O, one of $R^8$ is —$NCl_2$, and the other one of $R^8$ is H; or (v) $R^7$ is O, one of $R^8$ is —$N(CH_2COOH)_2$, and the other one of $R^8$ is H.

In still other particular such embodiments, the disclosed polymer has the formula V, wherein A is a group of the formula IVa, more specifically of the formula $IVa_3$:

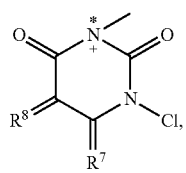

IVa₃ wherein $R^7$ is O or S; $R^8$ is =N—OH, O, or S; and • represents the point of attachment to group L. More particular such embodiments are those wherein $R^7$ is O, and $R^8$ is =N—OH; or $R^7$ and $R^8$ each is O.

In further particular such embodiments, the disclosed polymer has the formula V, wherein A is a group of the formula IVa, more specifically of the formula $IVa_4$:

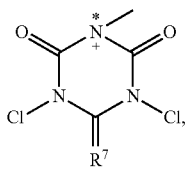

IVa₄ wherein $R^7$ is O or S; and • represents the point of attachment to group L. More particular such embodiments are those wherein $R^7$ is O.

In yet further particular such embodiments, the disclosed polymer has the formula V, wherein A is a group of the formula IVa, selected from the groups:

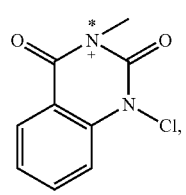

IVa₅

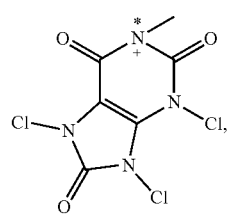

IVa₆

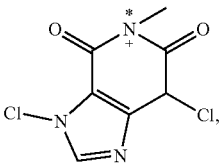

IVa₇

IVa₈

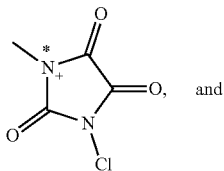

IVa₉

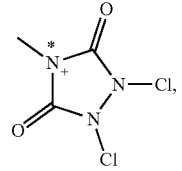

IVa₁₀ wherein • represents the point of attachment to group L.

In other particular such embodiments, the disclosed polymer has the formula V, wherein A is a group of the formula IVa, more specifically of the formula $IVa_{11}$:

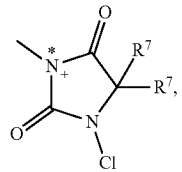

IVa₁₁ wherein $R^7$ each independently is selected from H, ($C_1$-$C_6$) alkyl, aryl, and —$NR^4C(O)N(R^4)_2$, wherein said alkyl and aryl each independently is optionally substituted with one or more groups each independently selected from halogen, —OH, —COOH, =O, =S, and —$N(R^4)_2$; $R^4$ each independently is H, halogen, alkyl, cycloalkyl, cycloalkenyl, heterocyclyl, aryl, or heteroaryl; and • represents the point of attachment to group L. More particular embodiments are those wherein (i) $R^7$ each is H, methyl, or phenyl; (ii) one of $R^7$ is methyl, and the other one of $R^7$ is H, ethyl, or phenyl; or (iii) one of $R^7$ is H, and the other one of $R^7$ is phenyl, 4-hydroxyphenyl, propyl, hydroxybutanyl, chlorobutanyl, carboxymethyl, or —N(Cl)C(O)$NCl_2$.

In yet other particular such embodiments, the disclosed polymer has the formula V, wherein A is a group of the formula IVb, wherein one of $R^1$ is O; and the other one of $R^1$ is S, more specifically the group $IVb_2$:

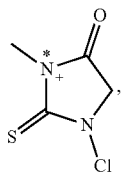

IVb₂

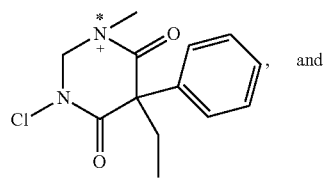

IIc₄ and

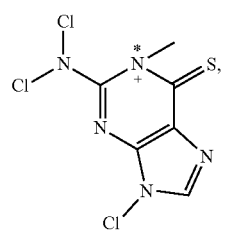

IIc₅ wherein • represents the point of attachment to group L.

In still other particular such embodiments, the disclosed polymer has the formula V, wherein A is a group of the formula IV wherein $R^1$ is O, more specifically the group $IV_1$:

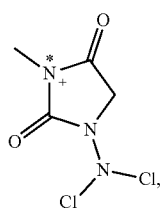

IV₁ wherein • represents the point of attachment to group L.

In further particular such embodiments, the disclosed polymer has the formula V, wherein A is a group of the formula II, wherein $R^1$ is O; and $R^3$ is methyl, selected from the groups:

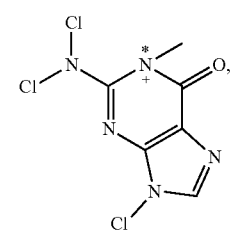

IIc₁

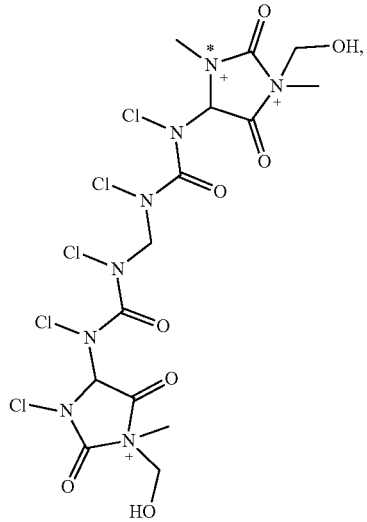

wherein • represents the point of attachment to group L.

In other particular embodiments, the disclosed polymer has the formula V, wherein A is a group of the formula II, wherein $R^1$ is S; and $R^3$ is methyl, more specifically the group IIc₆:

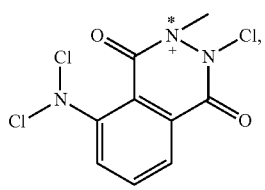

IIa₁

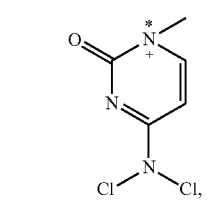

IIc₂

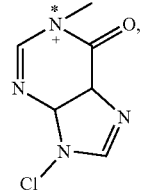

IIc₃

IIc₆ wherein • represents the point of attachment to group L.

In certain embodiments, the present invention provides a polymer of the formula V, wherein $R^6$ each independently is H, or alkyl such as methyl, ethyl, propyl, or butyl, preferably H; p is 2 or 3; L is $(C_1-C_6)$alkylene, e.g., is $(C_1-C_3)$alkylene such as methylene, ethylene, or propylene; and A is (i) a group of the formula II, wherein $R^1$ is O or S; or (ii) a group of the formula IV, wherein one of $R^1$ is O and the other one of $R^1$ is O or S; and $R^2$ represents group L, e.g., wherein $R^3$ is methyl.

In some particular such embodiments, A is a group of the formula IV, wherein one of $R^1$ is O and the other one of $R^1$ is O or S; $R^3$ is methyl; and the ring comprises a further nitrogen atom adjacent to one of the —C($R^1$)— groups and substituted with Cl.

In certain more particular such embodiments, A is a group of the formula IVa, more specifically of the formula $IVa_1$:

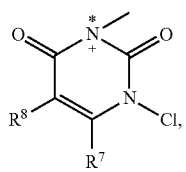

IVa₁

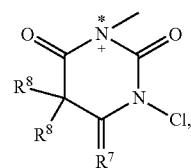

IVa₂ wherein $R^7$ and $R^8$ each independently is selected from H, —NH₂, halogen, —N(halogen)₂, (C₁-C₆)alkyl, —NO₂, —COOH, —O⁻B⁺, and —N=heterocyclyl, wherein said alkyl and heterocyclyl each independently is optionally substituted with one or more groups each independently selected from halogen, —OH, —COOH, =O, =S, and —N(R⁴)₂; $R^4$ each independently is H, halogen, alkyl, cycloalkyl, cycloalkenyl, heterocyclyl, aryl, or heteroaryl; and • represents the point of attachment to group L. Specific such polymers are those wherein (i) at least one of $R^7$ and $R^8$ is H, —NH₂, or methyl; (ii) $R^7$ and $R^8$ each is H (herein identified polymer P7-Cl-Q), —NH₂, or methyl (herein identified polymer P36-Cl-Q); (iii) $R^7$ is H, and $R^8$ is —NCl₂, —NO₂, methyl, ethyl, F, Cl, Br (herein identified polymer P9-Cl-Q, P10-Cl-Q, P18-Cl-Q, P37-Cl-Q, P19-Cl-Q, P20-Cl-Q, or P38-Cl-Q, respectively), or —NH₂; (iv) $R^7$ is —COOH, and $R^8$ is H (herein identified polymer P11-Cl-Q); (v) $R^7$ is Cl, and $R^8$ is H (herein identified polymer P39-Cl-Q); or (v) $R^7$ is —O⁻B⁺, wherein B⁺ is ammonium, and $R^8$ is 1,3-dichloro-5-iminopyrimidinyl-2,4,6(1H,3H,5H)-trione (herein identified polymer P25-Cl-Q) (the polymers specifically referred to are those wherein $R^6$ is H; p is 2; and L is methylene, and are shown in Table 6).

In other more particular such embodiments, A is a group of the formula IVb, more specifically of the formula IVb₁:

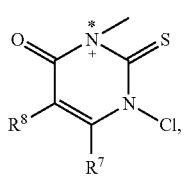

IVb₁ wherein $R^7$ and $R^8$ each independently is selected from H, —NH₂, halogen, —N(halogen)₂, (C₁-C₆)alkyl, —NO₂, —COOH, —O⁻B⁺, and —N=heterocyclyl, wherein said alkyl and heterocyclyl each independently is optionally substituted with one or more groups each independently selected from halogen, —OH, —COOH, =O, =S, and —N(R⁴)₂; $R^4$ each independently is H, halogen, alkyl, cycloalkyl, cycloalkenyl, heterocyclyl, aryl, or heteroaryl; and • represents the point of attachment to group L. Specific such polymers are those wherein (i) at least one of $R^7$ and $R^8$ is H, —NH₂, or methyl; or (ii) $R^7$ and $R^8$ each is H (herein identified polymer P8-Cl-Q (the polymer specifically referred to is that wherein $R^6$ is H; p is 2; and L is methylene, and is shown in Table 6).

In yet other more particular such embodiments, A is a group of the formula IVa, more specifically of the formula IVa₂:

wherein $R^7$ is O or S; and $R^8$ each independently is selected from H, —NH₂, halogen, —N(halogen)₂, (C₁-C₆)alkyl, —NO₂, —COOH, —OH, —O⁻B⁺, heterocyclyl, and —N(CH₂COOH)₂, wherein said alkyl and heterocyclyl each independently is optionally substituted with one or more groups each independently selected from halogen, —OH, —COOH, =O, =S, and —N(R⁴)₂; $R^4$ each independently is H, halogen, alkyl, cycloalkyl, cycloalkenyl, heterocyclyl, aryl, or heteroaryl; and • represents the point of attachment to group L. Specific such polymers are those wherein (i) $R^7$ is O, one of $R^8$ is —OH, and the other one of $R^8$ is 1,3-dichloro-5-hydroxy-5-pyrimidinyl-2,4,6(1H,3H,5H)-trione (herein identified polymer P15-Cl-Q); (ii) $R^7$ is O, and $R^8$ each is H (herein identified polymer P21-Cl-Q); (iii) $R^7$ is O, one of $R^8$ is —NO₂, and the other one of $R^8$ is H (herein identified polymer P41-Cl-Q); (iv) $R^7$ is O, one of $R^8$ is —NCl₂, and the other one of $R^8$ is H (herein identified polymer P45-Cl-Q); or (v) $R^7$ is O, one of $R^8$ is —N(CH₂COOH)₂, and the other one of $R^8$ is H (herein identified polymer P47-Cl-Q) (the polymers specifically referred to are those wherein $R^6$ is H; p is 2; and L is methylene, and are shown in Table 6).

In still other more particular such embodiments, A is a group of the formula IVa, more specifically of the formula IVa₃:

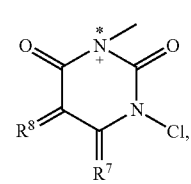

IVa₃ wherein $R^7$ is O or S; $R^8$ is =N—OH, O, or S; and • represents the point of attachment to group L. Specific such polymers are those wherein $R^7$ is O, and $R^8$ is =N—OH (herein identified polymer P46-Cl-Q); or $R^7$ and $R^8$ each is O (herein identified polymer P24-Cl-Q) (the polymers specifically referred to are those wherein $R^6$ is H; p is 2; and L is methylene, and are shown in Table 6).

In other more particular such embodiments, A is a group of the formula IVa, more specifically of the formula IVa₄:

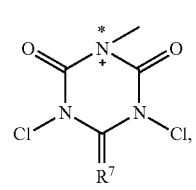

IVa₄ wherein $R^7$ is O or S; and • represents the point of attachment to group L. Specific such polymers are those wherein $R^7$ is O (herein identified polymer P27-Cl-Q or P28-Cl-Q) (the polymer specifically referred to is that wherein $R^6$ is H; p is 2; and L is methylene, and is shown in Table 6).

In yet other more particular such embodiments, A is a group of the formula IVa, selected from groups:

IVa$_5$

IVa$_6$
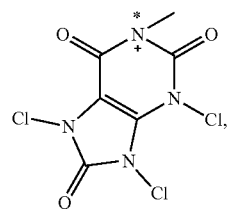

IVa$_7$
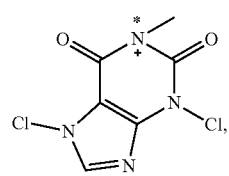

IVa$_8$

IVa$_9$
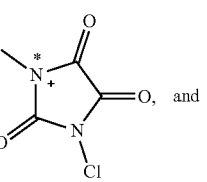

IVA$_{10}$
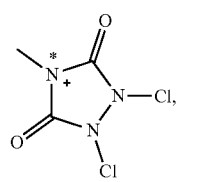

wherein • represents the point of attachment to group L (herein identified polymer P22-Cl-Q, P26-Cl-Q, P49-Cl-Q, P48-Cl-Q, P12-Cl-Q, or P17-Cl-Q, respectively (the polymers specifically referred to are those wherein $R^6$ is H; p is 2; and L is methylene, and are shown in Table 6).

In still other more particular such embodiments, A is a group of the formula IVa, more specifically of the formula IVa$_{11}$:

IVa$_{11}$
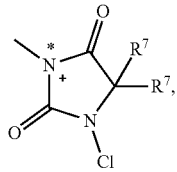

wherein $R^7$ each independently is selected from H, $(C_1-C_6)$ alkyl, aryl, and $-NR^4C(O)N(R^4)_2$, wherein said alkyl and aryl each independently is optionally substituted with one or more groups each independently selected from halogen, $-OH$, $-COOH$, $=O$, $=S$, and $-N(R^4)_2$; $R^4$ each independently is H, halogen, alkyl, cycloalkyl, cycloalkenyl, heterocyclyl, aryl, or heteroaryl; and • represents the point of attachment to group L. Specific such polymers are those wherein (i) $R^7$ each is H, methyl, or phenyl (herein identified polymer P1-Cl-Q, P3-Cl-Q, or P4-Cl-Q, respectively); (ii) one of $R^7$ is methyl, and the other one of $R^7$ is H, ethyl, or phenyl (herein identified polymer P2-Cl-Q, P31-Cl-Q, or P30-Cl-Q, respectively); or (iii) one of $R^7$ is H, and the other one of $R^7$ is phenyl, 4-hydroxyphenyl, propyl, hydroxybutanyl, chlorobutanyl, carboxymethyl, or $-N(Cl)C(O)NCl_2$ (herein identified polymer P13-Cl-Q, P5-Cl-Q, P33-Cl-Q, P50-Cl-Q, P32-Cl-Q, P35-Cl-Q, or P6-Cl-Q, respectively) (the polymers specifically referred to are those wherein $R^6$ is H; p is 2; and L is methylene, and are shown in Table 6).

In yet other more particular such embodiments, A is a group of the formula IVb, more specifically the group IVb$_2$:

IVb$_2$
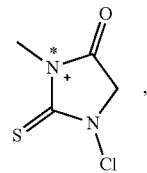

wherein • represents the point of attachment to group L (herein identified polymer P29-Cl-Q) (the polymer specifically referred to is that wherein $R^6$ is H; p is 2; and L is methylene, and is shown in Table 6).

In other particular such embodiments, A is a group of the formula II, wherein $R^1$ is O; or of the formula IIa, more specifically the group IIc$_1$, IIa$_1$, IIc$_2$, IIc$_3$, IIc$_4$, or IIc$_5$:

IIc$_1$
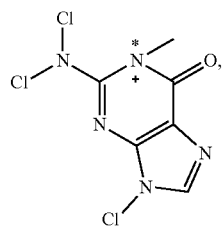

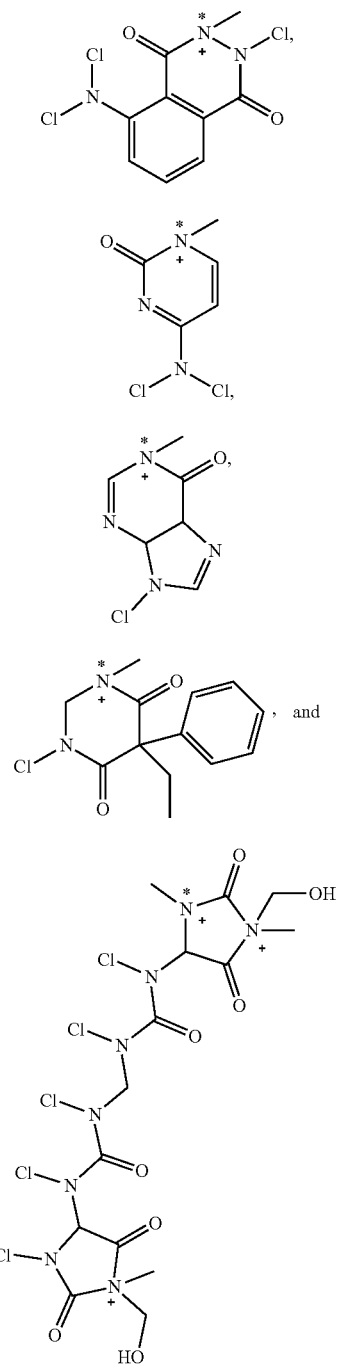

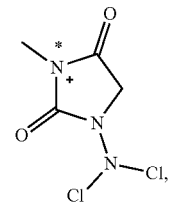

wherein • represents the point of attachment to group L (herein identified polymer P14-Cl-Q, P23-Cl-Q, P42-Cl-Q, P43-Cl-Q, P44-Cl-Q, or P16-Cl-Q, respectively (the polymers specifically referred to are those wherein $R^6$ is H; p is 2; and L is methylene, and are shown in Table 6).

In yet other particular such embodiments, A is a group of the formula II, wherein $R^1$ is S; more specifically the group IIc$_6$:

wherein • represents the point of attachment to group L (herein identified polymer P40-Cl-Q (the polymer specifically referred to is that wherein $R^6$ is H; p is 2; and L is methylene, and is shown in Table 6.

In still other particular such embodiments, A is a group of the formula IV, wherein $R^1$ is O; more specifically the group IV$_1$:

wherein • represents the point of attachment to group L (herein identified polymer P34-Cl-Q) (the polymer specifically referred to is that wherein $R^6$ is H; p is 2; and L is methylene, and is shown in Table 6).

In another aspect, the present invention provides a composition comprising a polymer as defined in any one of the embodiments above. Particular such compositions comprise a polymer of the formula V, wherein $R^6$ each independently is H, or alkyl such as methyl, ethyl, propyl, or butyl, preferably H; p is 2 or 3; L is $(C_1-C_6)$alkylene, e.g., $(C_1-C_3)$alkylene such as methylene, ethylene, or propylene; and A is a group of the formula II wherein $R^1$ is O or S, or of the formula IV wherein one of $R^1$ is O and the other one of $R^1$ is O or S; $R^2$ represents group L; and $R^3$ is methyl (e.g., wherein A is a group of the formula IV, wherein the ring comprises a further nitrogen atom adjacent to one of the —C($R^1$)— groups and substituted with Cl. More specific such polymers are those wherein A is a group of the formula IVa$_1$, IVa$_2$, IVa$_3$, IVa$_4$, IVa$_5$, IVa$_6$, IVa$_7$, IVa$_8$, IVa$_9$, IVa$_{10}$, IVa$_{11}$, IVb$_1$, IVb$_2$, IIc$_1$, IIa$_1$, IIc$_2$, IIc$_3$, IIc$_4$, IIc$_5$, IIc$_6$, or IV$_1$. As defined above, e.g., the polymers specifically shown in Table 6.

In yet another aspect, the present invention thus provides a surface coating material or a surface disinfecting material, comprising a composition as defined in any one of the embodiments above. In particular embodiments, said disinfecting material is a wet wipe comprising a composition as defined above.

In still another aspect, the present invention thus provides a wet wipe impregnated with, or comprising, a composition as defined in any one of the embodiments above.

In a further aspect, the present invention relates to a method for disinfecting a surface, said method comprising applying, e.g., by brushing, spraying, wiping, casting, dipping, or vapor coating, to said surface a disinfecting material as defined herein, to thereby render said surface antiseptic.

In certain embodiments, the surface being disinfected using the method of the invention is smooth, rough, tough, or soft surface. In another embodiments, said surface is a cardboard, cloth, stainless steel or metallic surface, plastic, glass, wood, paper, surgical glove, or skin.

In still another aspect, disclosed herein is a functionalized compound derived from a heterocyclic ring selected from compounds (starting materials) SM-1, SM-2, SM-3, SM-7, SM-8, SM-9, SM-10, SM-12, SM-13, SM-14, SM-15, SM-16, SM-17, SM-18, SM-19, SM-20, SM-21, SM-22, SM-23, SM-25, SM-28, SM-29, SM-30, SM-31, SM-32, SM-33, SM-34, SM-35, SM-36, SM-37, SM-38, SM-41, SM-42, SM-43, SM-44, SM-47, SM-48, SM-49, and SM-50 (see Table 1), wherein at least one of the nitrogen atoms of the heterocyclic ring is alkylated, preferably methylated, thereby forming a quaternary ammonium group; and/or at least one nitrogen atom is halogenated, preferably chlorinated, thereby forming a N-halogen, preferably N—Cl, bond. In particular such functionalized compounds, at least one of the nitrogen atoms of the heterocyclic ring is alkylated, and at least one nitrogen atom is halogenated. Such compounds, either per se or when comprised within a composition, when applied to a surface as defined above, are capable of rendering said surface antiseptic.

In yet another aspect, disclosed herein is a composition comprising a functionalized compound as disclosed hereinabove, or a mixture thereof. Particular such compositions are those wherein in at least about 1%, e.g., at least about 2%, 5%, 10%, 15%, 20%, 30%, 40%, 50%, 60%, 70%, 80%, 90%, or more, of the functionalized compounds comprised within the composition, one or more of the nitrogen atoms of the heterocyclic ring is alkylated, and one or more of the nitrogen atoms is halogenated, e.g., chlorinated. Such a composition may be comprised within a surface coating- or disinfecting material, or impregnated within a wet wipe.

Unless otherwise indicated, all numbers expressing, e.g., percentages, used in this specification, are to be understood as being modified in all instances by the term "about". Accordingly, unless indicated to the contrary, the numerical parameters set forth in this specification are approximations that may vary by up to plus or minus 10% depending upon the desired properties to be obtained by the present invention.

The invention will now be illustrated by the following non-limiting Examples.

EXAMPLES

Example 1. Synthesis of Monomers, Polymers, and Functionalized Polymers

Materials. Hydantoin (SM1), 5-methylhydantoin (SM2), 5,5'-dimethylhydantoin (SM3), 5,5'-diphenylhydantoin sodium salt (SM4), 5-(4-hydroxyphenyl)hydantoin (SM5), allantoin (SM6), uracil (SM7), thiouracil (SM8), 5-aminouracil (SM9), 5-nitrouracil (SM10), orotic acid monohydrate (SM11), parabanic acid (SM12), 5-phenylhydantoin (SM13), guanine (SM14), alloxantin dihydrate (SM15), imidazolidinyl urea (SM16), urazole (SM17), thymine (SM18), 5-fluorouracil (SM19), 5-chlorouracil (SM20), barbituric acid (SM21), benzoyleneurea (SM22), luminol (SM23), alloxan (SM24), murexide (SM25), uric acid (SM26), sodium dichloroisocyanurate (SM27), cyanuric acid (SM28), 2-thiohydantoin (SM29), 5-methyl-5-phenylhydantoin (SM30), 5-ethyl-5-methylhydantoin (SM31), 5-(4-chlorobutyl)hydantoin (SM32), 5-propylhydantoin (SM33), 1-aminohydantoin hydrochloride (SM34), hydantoin-5-acetic acid (SM35), 5,6-dimethyluracil (SM36), 5-ethyluracil (SM37), 5-bromouracil (SM38), 6-chlorouracil (SM39), 6-thioguanine (SM40), 5-nitrobarbituric acid (SM41), cytosine (SM42), hypoxanthine (SM43), primidone (SM44), uramil (SM45), violuric acid monohydrate (SM46), uramil-N—N-diacetic acid (SM47), lumazine (SM48), xanthine (SM49), 5-(4-hydroxybutyl)hydantoin (SM 50) was prepared from SM 32. All starting materials were purchased from Sigma-Aldrich, Israel/TCI chemicals, Belgium. Methyl iodide and 2,2'-azobis(2-methylpropionitrile) (AIBN) were purchased from Sigma-Aldrich, Israel. Sodium hypochlorite (11%) was purchased from the Chemical warehouse of Technion-Israel Institute of Technology, Israel. Ethanol was purchased form Gadot-Group, Israel. The rest of the chemicals and solvents used were purchased from Bio-Lab Ltd. Israel. The structures of the starting materials are shown in Table 1.

Synthesis of monomers M1-M50. Functionalized monomers M1-M50 (Table 2) were synthesized from starting materials SM1-SM50, respectively, following the general procedure shown in Scheme 1 (illustrating, as an example, the synthesis of M1 from SM1). Initially, 1 g of all the starting material (SM1-SM50) was reacted with 1 equivalent of potassium hydroxide in ethanol solvent at 70° C. for 2 h. After 2 h of the reaction, 1.5 equivalent of allyl bromide was added and stirring was continued for 24 h at 70° C. at the rate of 600 rpm. As the reaction progress towards the monomer formation, a white precipitate of salt was observed. After 24 h, the solvent was evaporated under reduced pressure by connecting tubing to high vacuum pump with a trapper. All these reactions have been performed using parallel and expedited synthesizers. The synthesized monomers were characterized by FT-IR. Various purification techniques have been applied to achieve the purity of the monomers for further polymerizations.

Scheme 1. Synthesis of 1-allyl hydantoin monomer (M1) from hydantoin (SM1)

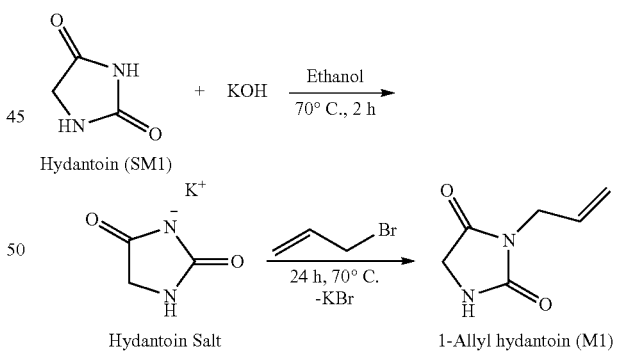

Synthesis of the polymers P1-P50. Polymers P1-P50 (Table 3) were synthesized from monomers M1-M50, respectively, following the general procedure shown in Scheme 2 (illustrating, as an example, the synthesis of P1 from M1). Each of the monomers (M1-M50) was dissolved in 10 mL of ethanol in the parallel synthesizer tubes with a continuous stirring for 30 minutes at the rate of 600 rpm at 70° C. in order to dissolve the monomer completely in ethanol. After 30 minutes, 0.1 wt % of the catalyst AIBN was added to the tubes under nitrogen stream and the reactions were continued for radical polymerizations for 24 h. Then, reactions cooled down to room temperature and the solvent was evaporated using high vacuum pump with a trapper. The obtained solid polymers (P1-P50) were further characterized using FT-IR.

Scheme 2. Synthesis of polymer P1 from 1-allyl hydantoin (M1)

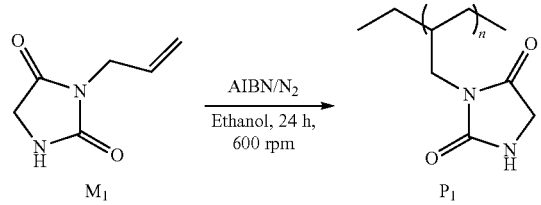

Synthesis of the chlorinated polymers P1Cl-P50Cl. The chlorinated polymers P1Cl-P50Cl (Table 4) were prepared from polymers P1-P50, respectively, following the general procedure shown in Scheme 3 (illustrating, as an example, the preparation of P1Cl from P1). Weights, 0.2 g of the synthesized polymers (P1-P50) were taken in 20 mL scintillation vials and placed magnetic beads. To these polymer samples a 1:3 molar ratio of sodium hypochlorite solution at pH 7 was added and stirred at 600 rpm at room temperature for 24 h. The entire reaction setup was covered with aluminum foil. After 24 h, the reaction samples were dried at room temperature in the fume hood. The obtained chlorinated polymers (P1Cl-P50Cl) were characterized by FT-IR to monitor functional changes following the halogenations step.

Scheme 3. Synthesis of chlorinated polymer P1Cl from polymer P1

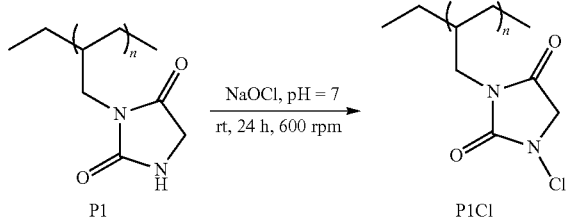

Synthesis of quaternized polymers P1Q-P50Q. The quaternized polymers P1Q-P50Q (Table 5) were prepared from polymers P1-P50, respectively, following the general procedure shown in Scheme 4 (illustrating, as an example, the preparation of P1Q from P1). A weight, 0.2 g of the polymer sample (P1-P50) was transferred into parallel synthesizer tubes. The polymer was dissolved in 10 mL of ethanol. Methyl iodide was added to each sample in 1:3 molar ratios of polymer vs. methyl iodide under nitrogen at 70° C. for 24 h at 600 rpm. After 24 h, the reactions were cooled to room temperature and evaporated the solvent under reduced pressure. The samples were characterized by FT-IR analysis after quaternizations for monitoring the new functionalities development.

Scheme 4. Synthesis of quaternized polymer P1Q from polymer P1

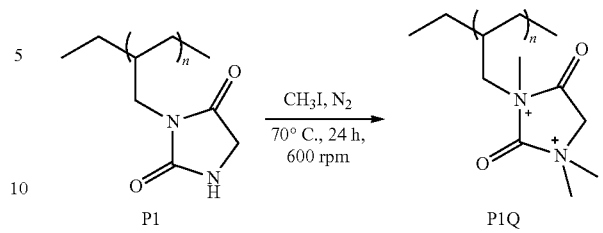

Synthesis of chlorinated-quaternized polymers P1ClQ-P50ClQ. The chlorinated-quaternized polymers P1ClQ-P50ClQ (Table 6) were prepared from the chlorinated polymers P1Cl-P50Cl, respectively, following the general procedure shown in Scheme 5 (illustrating, as an example, the preparation of P1ClQ from P1Cl). A weight, 0.2 g of the each of chlorinated polymer sample (P1Cl-P50Cl) was transferred into parallel synthesizer tubes. The polymer was dissolved in 10 mL of ethanol. Methyl iodide was added to each sample in 1:3 molar ratios of polymer repeating unit vs. methyl iodide under nitrogen at 70° C. and the reaction was continued for 24 h at 600 rpm. After 24 h, the reactions were cooled to room temperature and evaporated the solvent under reduced pressure. The samples were characterized by FT-IR analysis to see the changes after the quaternizations.

Scheme 5. Synthesis of chlorinated-quaternized polymer P1ClQ from chlorinated polymer P1Cl

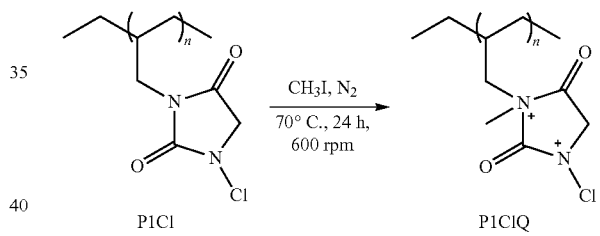

Example 2. Characterization of Monomers, Polymers, and Functionalized Polymers

Characterizations and Instruments

Fourier transform infra-red (FTIR). The FTIR spectra of the starting materials SM1-SM50, monomers M1-M50, polymers P1-P50, chlorinated polymers P1Cl-P50Cl, quaternized polymers P1Q-P50Q, and chlorinated-quaternized polymers P1ClQ-P50ClQ, were recorded and collected on a Nicolet iS 50 FTIR spectrometer (Thermo Fisher Scientific, USA) using the ATR method in the range of 500-4000 cm$^{-1}$ and analyzed.

Nuclear magnetic resonance (NMR) spectroscopy. The $^1$H-NMR spectra of the starting materials SM1-SM50, monomers M1-M50, polymers P1-P50, chlorinated polymers P1Cl-P50Cl, quaternized polymers P1Q-P50Q, and chlorinated-quaternized polymers P1ClQ-P50ClQ were recorded by dissolving the samples in in different deuterated solvents at 25° C. using and AVANCE 400 spectrometer in a glass tubes of 5 mm outside diameter. Tetramethylsilane served as a solvent reference.

Determination of the oxidative chlorine content (% Cl$^+$) using iodometric titration. The percentage of the oxidative chlorine loadings on the polymers were determined by an iodometric/thiosulfate titration procedure. Approximately 20 mg of chlorinated sample of polymers were dissolved in 20 mL of DDW containing 0.2 g potassium iodide, 2.5 mL of 2 M acetic acid, and 0.4 mL starch solution (1% w/v). The released chlorine was titrated using 0.1 N of sodium thiosulfate solution (standardized with potassium iodate). The end point of the titration was observed as a color change from blue to colorless. The weight percentage $Cl^+$ % of bound oxidative chlorine was calculated according to the following formula:

$$Cl^+ \%(\text{Weight}) = \frac{35.45 \times N \times V}{2 \times W} \times 100$$

where $Cl^+$ is the wt. % of the oxidative chlorine on the samples; N and V are the normality (equiv/L) and volume (L) of $Na_2S_2O_3$ (titrant), respectively; and W is the weight of the chlorinated polymer samples.

Percentage (%) quaternary ammonium quantification. In this method, 0.020-0.050 g of various quaternized polymer samples were dissolved in 50 mL of 0.05N acetic acid. To the solutions three drops of 0.5% bromophenol blue/ethanol were added as an indicator. The titrant was 0.0100N sodium tetraphenylborate, and the end point was determined by a color change from blue to light yellow. The weight percent quat was calculated according to the following equation:

$$\% \text{ Quant} = \frac{M \times N \times V}{W} \times 100$$

where, N and V are the normality (equiv/L) and volume (L) consumed, respectively, of sodium tetraphenylborate solution; M is the molecular weight of a quat repeating unit; and W is the weight in g of the sample.

Molecular weight determination of the polymers. The molecular weights of the prepared polymers were determined using a gel-permeation chromatography (GPC) system, Waters. The samples were dissolved in suitable solvents and appropriate solvents were utilized as mobile phased to determine the molecular weight (MW), average mw by number (Mn), average molecular weight by peak maximum (Mp), and polydispersity (PDI).

Differential scanning calorimetry (DSC). Samples of the P1, P1Cl, P1Q and P1ClQ of 5-10 mg per weight were prepared and weighted by a microanalytical balance of ±0.1 μg. The thermal behavior of the polymers was determined by running the samples, and the thermograms were recorded from 25° C. to 400° C. at heating rate of 10° C. per minute under $N_2$ conditions.

Chlorine release study. The chlorinated polymer are water soluble polymers and due to that, while dissolving the polymers in water, some of the chlorine are immediately released and some are covalently linked to the nitrogen as N-halamine/chloramines. Therefore, determination of the free chlorine (the chlorine released to the solution) and the total chlorine is necessary to determine the effect of the structure or the derivative on the release profile. Hence, three samples of each polymer (P1, P1Cl, P1Q and P1-Cl-Q) were dissolved in 10 mL DDW, for each series one sample was used as a control, the second sample was used for determination of the free chlorine using N,N-diethyl-p-phenylenediamine (DPD; reacts with chlorine stoichiometrically to form a Würster dye and an imine), and the third sample was used to determine the total chlorine.

Safety and toxicity assessment. In order to test the safety and potential toxicity of the polymers prepared, the effect of various concentrations (0.02-0.2 mg/ml) and contact time points (10 min up to 72 hours) of the polymers against lungs cells (Beas-2b) and skin cells (HaCaT) were tested, according to the following procedure. (1) Beas-2b and HaCaT cells were seeded at 10 k initial density, and left to grow overnight. (2) Treatment agents were solubilized in PBS for 30 min before usage, and different concentration were prepared at 4:1 media to PBS ratio (v/v). The final polymer concentrations: 0.02 mg/ml, 0.1 mg/ml, and 0.2 mg/ml. Control cells were either treated with 3 mg/ml bleach (1/tenth household concentration) or left untreated. (3) Media was aspirated and replaced with the treatment solutions. (4) Alamar blue was added at different time points: 10 min, 20 min, 90 min, 24 hours and 72 hours. Moreover, the cells incubated for another 4 hours at 37° C. before measurement (ex: 520-20 nm, em: 570-30 nm). The safety of the polymers was further tested against kidney cells (Hek293) and E6 Vero cells.

Results and Discussion

FT-IR Results

Comparative FT-IR spectra of the 50 synthesized monomers and their all-respective functionalized polymers is given below (spectra not shown).

M1, P1, P1Cl, P1Q and P1ClQ. The changes observed in the hydantoin-based monomer M1 compared to SM were shift in the peaks of C=O from 1772, 1749, 1693 $cm^{-1}$ to 1752, 1693 $cm^{-1}$, disappearance of imide N—H at 3283 $cm^{-1}$, and shift in the amide N—H peaks from 3131 to 3119 $cm^{-1}$. Also found —CH=$CH_2$ overtone at 1806 $cm^{-1}$, observed stretching of C=C at 1640 $cm^{-1}$, and also bending out of the plane was observed for the —CH=$CH_2$ at 917 and 1000 $cm^{-1}$. The —N—$CH_2$— bond was found as a peak at 1234 $cm^{-1}$. The disappearance of all the peaks related —CH=$CH_2$ was found in the polymer (P1) and —NH bond was observed at 3205 $cm^{-1}$. Compared to P1, reduction in the intensity of the N—H stretching vibration (3205 $cm^{-1}$) in the chlorinated polymer (P1Cl) confirmed the generation of the N—Cl bond through chlorination. In quaternized polymer (P1Q) observed a prominent peak at 958 $cm^{-1}$ for the quaternary nitrogen and along with the C=O peaks at 1766 $cm^{-1}$. In the chlorinated-quaternized polymer (P1ClQ) compared to polymer (P1), reduction in the intensity of the N—H stretching vibration peak at 3205 $cm^{-1}$ confirmed the N—Cl bond formation through chlorination and observed a peak for the quaternary nitrogen at 961 $cm^{-1}$ along with other carbonyl peaks at 1763 and 1705 $cm^{-1}$.

M2, P2, P2Cl, P2Q and P2ClQ. The changes observed in the 5-methylhydantoin-based monomer M2 compared to SM2 were shift in the peaks of C=O from 1713, 1688 $cm^{-1}$ to 1763, 1700 $cm^{-1}$ and shift in the amide N—H peaks from 3309 to 3282 $cm^{-1}$. Also bending out of the plane was observed for the —CH=$CH_2$ at 930 and 988 $cm^{-1}$. The disappearance of all the peaks related —CH=$CH_2$ was found in the polymer (P2) and —NH bond was observed at 3283 $cm^{-1}$. Compared to P2, reduction in the intensity of the N—H stretching vibration (3283 $cm^{-1}$) in the chlorinated polymer (P2Cl) confirmed the generation of the N—Cl bond through chlorination. In quaternized polymer (P2Q) observed a prominent peak at 988 $cm^{-1}$ for the quaternary nitrogen and along with the C=O peaks at 1767 and 1700 $cm^{-1}$. In the chlorinated-quaternized polymer (P2ClQ) compared to polymer (P2), reduction in the intensity of the N—H stretching vibration peak at 3283 $cm^{-1}$ confirmed the N—Cl bond formation through chlorination and observed a peak for the quaternary nitrogen at 970 cm$^{-1}$ along with other carbonyl peaks at 1768 and 1700 cm$^{-1}$.

M3, P3, P3Cl, P3Q and P3ClQ. The changes observed in the 5,5'-dimethylhydantoin-based monomer M3 compared to SM3 were shift in the peaks of C=O from 1769, 1696 cm$^{-1}$ to 1773, 1696 cm$^{-1}$, disappearance of imide N—H at 3243 cm$^{-1}$, and shift in the amide N—H peaks from 3162 to 3101 cm$^{-1}$. Also observed stretching of C=C at 1642 cm$^{-1}$ and also bending out of the plane was observed for the —CH=CH$_2$ at 907 and 991 cm$^{-1}$. The disappearance of all the peaks related —CH=CH$_2$ was found in the polymer (P3) and —NH bond was observed at 3174 cm$^{-1}$. Compared to P3, reduction in the intensity of the N—H stretching vibration (3174 cm$^{-1}$) in the chlorinated polymer (P3Cl) confirmed the generation of the N—Cl bond through chlorination. In quaternized polymer (P3Q) observed a prominent peak at 972 cm$^{-1}$ for the quaternary nitrogen and along with the C=O peaks at 1766 cm$^{-1}$. In the chlorinated-quaternized polymer (P3ClQ) compared to polymer (P1), reduction in the intensity of the N—H stretching vibration peak at 3174 cm$^{-1}$ confirmed the N—Cl bond formation through chlorination and observed a peak for the quaternary nitrogen at 959 cm$^{-1}$ along with the carbonyl peak at 1708 cm$^{-1}$.

M4, P4, P4Cl, P4Q and P4ClQ. The changes observed in the 5,5'-diphenylhydantoin-based monomer M4 compared to SM4 were shift in the peaks of C=O from 1689 cm$^{-1}$ to 1773, 1707 cm$^{-1}$. Also observed stretching of C=C of aromatic ring at 1597 cm$^{-1}$ and also bending out of the plane was observed for the —CH=CH$_2$ at 877 and 938 cm$^{-1}$. The disappearance of all the peaks related —CH=CH$_2$ was found in the polymer (P4) and —NH band was observed at 3239 cm$^{-1}$. Compared to P4, reduction in the intensity of the N—H stretching vibration (3239 cm$^{-1}$) in the chlorinated polymer (P4Cl) confirmed the generation of the N—Cl bond through chlorination. In quaternized polymer (P4Q) observed a peak at 938 cm$^{-1}$ for the quaternary nitrogen and along with the C=O peaks at 1704 and 1773 cm$^{-1}$. In the chlorinated-quaternized polymer (P4ClQ) compared to polymer (P4), reduction in the intensity of the N—H stretching vibration peak at 3174 cm$^{-1}$ confirmed the N—Cl bond formation through chlorination and observed a peak for the quaternary nitrogen at 941 cm$^{-1}$ along with the carbonyl peak at 1704 and 1771 cm$^{-1}$.

M5, P5, P5Cl, P5Q and P5ClQ. The changes observed in the 5-(4-hydroxyphenyl) hydantoin-based monomer M5 compared to SM5 were shift in the peaks of C=O from 1762, 1701 cm$^{-1}$ to 1704 cm$^{-1}$, disappearance of imide N—H at 3289 cm$^{-1}$, and shift in the amide N—H peaks from 3145 to 3148 cm$^{-1}$. Also observed stretching of aromatic C=C at 1613 cm$^{-1}$ and also the hydroxyl group on the aromatic ring was present in all M5 and P5 at 3321 cm$^{-1}$ and —NH bond was observed at 3148 cm$^{-1}$ (P3). Compared to P5, reduction in the intensity of the N—H stretching vibration (3148 cm$^{-1}$) in the chlorinated polymer (P5Cl) confirmed the generation of the N—Cl bond through chlorination. In quaternized polymer (P5Q) observed a prominent peak at 955 cm$^{-1}$ for the quaternary nitrogen and along with the C=O peaks at 1711 and 1760 cm$^{-1}$. In the chlorinated-quaternized polymer (P5ClQ) compared to polymer (P5), reduction in the intensity of the N—H stretching vibration peak at 3148 cm$^{-1}$ confirmed the N—Cl bond formation through chlorination and observed a peak for the quaternary nitrogen at 954 cm$^{-1}$ along with the carbonyl peak at 1704 and 1759 cm$^{-1}$.

M6, P6, P6Cl, P6Q and P6ClQ. The changes observed in the allantoin-based monomer M6 compared to SM6 were shift in the peaks of C=O from 1777, 1703, 1651 cm$^{-1}$ to 1778, 1704, 1652 cm$^{-1}$ and amide NH stretching bands are found at 3433 and 3337 cm$^{-1}$ shifted to 3434 and 3340 cm$^{-1}$ and shift in the amide N—H peaks from 3186 to 3205 cm$^{-1}$. —NH bond was observed at 3203 cm$^{-1}$ in the polymer (P6). Compared to P6, reduction in the intensity of the N—H stretching vibration (3203 cm$^{-1}$) in the chlorinated polymer (P6Cl) confirmed the generation of the N—Cl bond through chlorination. In quaternized polymer (P6Q) observed a prominent peak at 968 cm$^{-1}$ for the quaternary nitrogen and along with the C=O peak at 1702 cm$^{-1}$. In the chlorinated-quaternized polymer (P6ClQ) compared to polymer (P6), reduction in the intensity of the N—H stretching vibration peak at 3203 cm$^{-1}$ confirmed the N—Cl bond formation through chlorination and observed a peak for the quaternary nitrogen at 963 cm$^{-1}$ along with other carbonyl peaks at 1778 and 1715 cm$^{-1}$.

M7, P7, P7Cl, P7Q and P7ClQ. The changes observed in the uracil-based monomer M7 compared to SM7 were shift in the peaks of C=O from 1766, 1710, 1633 cm$^{-1}$ to 1605 cm$^{-1}$. Also bending out of the plane was observed for the —CH=CH$_2$ at 905 and 979 cm$^{-1}$. The —N—CH$_2$— bond was found as a peak at 1234 cm$^{-1}$. The disappearance of all the peaks related —CH=CH$_2$ was found in the polymer (P7) and —NH bond was observed at 3201 cm$^{-1}$. Compared to P7, reduction in the intensity of the N—H stretching vibration (3205 cm$^{-1}$) in the chlorinated polymer (P7Cl) confirmed the generation of the N—Cl bond through chlorination. In quaternized polymer (P7Q) observed a prominent peak at 992 cm$^{-1}$ for the quaternary nitrogen and along with the C=O peaks at 1766 cm$^{-1}$. In the chlorinated-quaternized polymer (P7ClQ) compared to polymer (P7), reduction in the intensity of the N—H stretching vibration peak at 3201 cm$^{-1}$ confirmed the N—Cl bond formation through chlorination and observed a peak for the quaternary nitrogen at 960 cm$^{-1}$ along with other carbonyl peaks at 1763 and 1705 cm$^{-1}$.

M8, P8, P8Cl, P8Q and P8ClQ. The changes observed in the 2-thiouracil-based monomer M8 compared to SM8 were shift in the peaks of C=O from 1693, 1679, 1626 cm$^{-1}$ to 1729, 1673, 1605 cm$^{-1}$. Also bending out of the plane was observed for the —CH=CH$_2$ at 921 and 985 cm$^{-1}$. The —N—CH$_2$— bond was found as a peak at 1232 cm$^{-1}$. The disappearance of all the peaks related —CH=CH$_2$ was found in the polymer (P8) and —NH bond was observed at 3248 cm$^{-1}$. Compared to P8, reduction in the intensity of the N—H stretching vibration (3248 cm$^{-1}$) in the chlorinated polymer (P8Cl) confirmed the generation of the N—Cl bond through chlorination. In quaternized polymer (P8Q) observed a prominent peak at 993 cm$^{-1}$ for the quaternary nitrogen and along with the C=O peaks at 1713 cm$^{-1}$. In the chlorinated-quaternized polymer (P8ClQ) compared to polymer (P8), reduction in the intensity of the N—H stretching vibration peak at 3248 cm$^{-1}$ confirmed the N—Cl bond formation through chlorination and observed a peak for the quaternary nitrogen at 968 cm$^{-1}$ along with other carbonyl peaks at 1714 cm$^{-1}$.

M9, P9, P9Cl, P9Q and P9ClQ. The changes observed in the 5-aminouracil-based monomer M9 compared to SM9 were shift in the peaks of C=O from 1731, 1670, 1651 cm$^{-1}$ to 1755, 1651 cm$^{-1}$ and disappearance of imide N—H at 3299 cm$^{-1}$. Observed stretching of C=C at 1651 cm$^{-1}$ and also bending out of the plane was observed for the —CH=CH$_2$ at 912 and 995 cm$^{-1}$. The —N—CH$_2$— bond was found as a peak at 1244 cm$^{-1}$. The disappearance of all the peaks related —CH=CH$_2$ was found in the polymer (P9) and —NH bond was observed at 3275 cm$^{-1}$. Compared to P9, reduction in the intensity of the N—H stretching vibration (3275 cm$^{-1}$) in the chlorinated polymer (P9Cl) confirmed the generation of the N—Cl bond through chlorination. In quaternized polymer (P9Q) observed a prominent peak at 983 cm$^{-1}$ for the quaternary nitrogen and along with the C=O peaks at 1673 cm$^{-1}$. In the chlorinated-quaternized polymer (P9ClQ) compared to polymer (P9), reduction in the intensity of the N—H stretching vibration peak at 3275 cm$^{-1}$ confirmed the N—Cl bond formation through chlorination and observed a peak for the quaternary nitrogen at 967 cm$^{-1}$ along with other carbonyl peaks at 1725 and 1676 cm$^{-1}$.

M10, P10, P10Cl, P10Q and P10ClQ. The changes observed in the 5-nitrouracil-based monomer M10 compared to SM10 were shift in the peaks of C=O from 1768, 1730, 1715 cm$^{-1}$ to 1762, 1724, 1704 cm$^{-1}$, and observed a peak at 3243 cm$^{-1}$. Observed stretching of C=C at 1644 cm$^{-1}$ and also bending out of the plane was observed for the —CH=CH$_2$ at 966 and 993 cm$^{-1}$. The —N—CH$_2$— bond was found as a peak at 1240 cm$^{-1}$. The disappearance of all the peaks related —CH=CH$_2$ was found in the polymer (P10) and —NH bond was observed at 3244 cm$^{-1}$. Peak for the —NO$_2$ observed at 1540 cm$^{-1}$. Compared to P10, reduction in the intensity of the N—H stretching vibration (3244 cm$^{-1}$) in the chlorinated polymer (P10Cl) confirmed the generation of the N—Cl bond through chlorination. In quaternized polymer (P10Q) observed a prominent peak at 975 cm$^{-1}$ for the quaternary nitrogen and along with the C=O peaks at 1760 and 1730 cm$^{-1}$. In the chlorinated-quaternized polymer (P10ClQ) compared to polymer (P10), reduction in the intensity of the N—H stretching vibration peak at 3244 cm$^{-1}$ confirmed the N—Cl bond formation through chlorination and observed a peak for the quaternary nitrogen at 957 cm$^{-1}$ along with other carbonyl peaks at 1720 cm$^{-1}$.

M11, P11, P11Cl, P11Q and P11ClQ. The changes observed in the orotic acid-based monomer M11 compared to SM11 were shift in the peaks of C=O from 1710, 1670, 1654 cm$^{-1}$ to 1651 cm$^{-1}$ and disappearance of imide N—H at 3247 cm$^{-1}$ and shift in the amide N—H peaks from 3101 to 3142 cm$^{-1}$. Observed stretching of C=C at 1614 cm$^{-1}$. The disappearance of all the peaks related —CH=CH$_2$ was found in the polymer (P11) and —NH bond was observed at 3142 cm$^{-1}$. Compared to P11, reduction in the intensity of the N—H stretching vibration (3142 cm$^{-1}$) in the chlorinated polymer (P11Cl) confirmed the generation of the N—Cl bond through chlorination. In quaternized polymer (P11Q) observed a prominent peak at 967 cm$^{-1}$ for the quaternary nitrogen and along with the C=O peaks at 1677 cm$^{-1}$. In the chlorinated-quaternized polymer (P11ClQ) compared to polymer (P11), reduction in the intensity of the N—H stretching vibration peak at 3142 cm$^{-1}$ confirmed the N—Cl bond formation through chlorination and observed a peak for the quaternary nitrogen at 967 cm$^{-1}$ along with other carbonyl peaks at 1763 and 1705 cm$^{-1}$.

M12, P12, P12Cl, P12Q and P12ClQ. The changes observed in the parabanic acid-based monomer M12 compared to SM12 were shift in the peaks of C=O from 1831, 1790, 1761 cm$^{-1}$ to 1621 cm$^{-1}$ and disappearance of imide N—H at 3290 cm$^{-1}$ and shift in the amide N—H peaks from 3165 to 3160 cm$^{-1}$. The disappearance of all the peaks related —CH=CH$_2$ was found in the polymer (P12) and —NH bond was observed at 3245 cm$^{-1}$. Compared to P12, reduction in the intensity of the N—H stretching vibration (3245 cm$^{-1}$) in the chlorinated polymer (P12Cl) confirmed the generation of the N—Cl bond through chlorination. In quaternized polymer (P12Q) observed a prominent peak at 961 cm$^{-1}$ for the quaternary nitrogen and along with the C=O peaks at 1747 cm$^{-1}$. In the chlorinated-quaternized polymer (P12ClQ) compared to polymer (P12), reduction in the intensity of the N—H stretching vibration peak at 3245 cm$^{-1}$ confirmed the N—Cl bond formation through chlorination and observed a peak for the quaternary nitrogen at 961 cm$^{-1}$ along with other carbonyl peaks at 1712 cm$^{-1}$.

M13, P13, P13Cl, P13Q and P13ClQ. The changes observed in the 5-phenylhydantoin-based monomer M13 compared to SM13 were shift in the peaks of C=O from 1768, 1705 cm$^{-1}$ to 1770, 1694 cm$^{-1}$ and shift in the N—H peak from 3291 to 3229 cm$^{-1}$. observed stretching of C=C at 1640 cm$^{-1}$ and also bending out of the plane was observed for the —CH=CH$_2$ at 929 and 992 cm$^{-1}$. The disappearance of all the peaks related —CH=CH$_2$ was found in the polymer (P13) and —NH bond was observed at 3248 cm$^{-1}$. Compared to P13, reduction in the intensity of the N—H stretching vibration (3248 cm$^{-1}$) in the chlorinated polymer (P13Cl) confirmed the generation of the N—Cl bond through chlorination. In quaternized polymer (P13Q) observed a prominent peak at 964 cm$^{-1}$ for the quaternary nitrogen and along with the C=O peaks at 1741 cm$^{-1}$. In the chlorinated-quaternized polymer (P13ClQ) compared to polymer (P13), reduction in the intensity of the N—H stretching vibration peak at 3248 cm$^{-1}$ confirmed the N—Cl bond formation through chlorination and observed a peak for the quaternary nitrogen at 962 cm$^{-1}$ along with other carbonyl peaks at 1712 cm$^{-1}$.

M14, P14, P14Cl, P14Q and P14ClQ. The changes observed in the guanine-based monomer M14 compared to SM14 were shift in the peaks of C=O from 1690 cm$^{-1}$ to 1660 cm$^{-1}$ and disappearance of imdide N—H at 3313 cm$^{-1}$ and shift in the amide N—H peaks from 3285 to 320 cm$^{-1}$. Also bending out of the plane was observed for the —CH=CH$_2$ at 948 and 994 cm$^{-1}$. The —N—CH$_2$— bond was found as a peak at 1258 cm$^{-1}$. The disappearance of all the peaks related —CH=CH$_2$ was found in the polymer (P14) and —NH bond was observed at 3280 cm$^{-1}$. Compared to P14, reduction in the intensity of the N—H stretching vibration (3280 cm$^{-1}$) in the chlorinated polymer (P14Cl) confirmed the generation of the N—Cl bond through chlorination. In quaternized polymer (P14Q) observed a prominent peak at 948 cm$^{-1}$ for the quaternary nitrogen and along with the C=O peaks at 1689 cm$^{-1}$. In the chlorinated-quaternized polymer (P14ClQ) compared to polymer (P14), reduction in the intensity of the N—H stretching vibration peak at 3205 cm$^{-1}$ confirmed the N—Cl bond formation through chlorination and observed a peak for the quaternary nitrogen at 949 cm$^{-1}$ along with other carbonyl peaks at 1693 cm$^{-1}$.

M15, P15, P15Cl, P15Q and P15ClQ. The changes observed in the alloxantin-based monomer M15 compared to SM15 were shift in the peaks of C=O from 1712 cm$^{-1}$ to 1682 cm$^{-1}$ and disappearance of imdide N—H at 3309 cm$^{-1}$ and shift in the amide N—H peaks from 3225 to 3203 cm$^{-1}$. The disappearance of all the peaks related —CH=CH$_2$ was found in the polymer (P15) and —NH bond was observed at 3203 cm$^{-1}$. Compared to P15, reduction in the intensity of the N—H stretching vibration (3203 cm$^{-1}$) in the chlorinated polymer (P15Cl) confirmed the generation of the N—Cl bond through chlorination. In quaternized polymer (P15Q) observed a peak at 970 cm$^{-1}$ for the quaternary nitrogen and along with the C=O peaks at 1682 cm$^{-1}$. In the chlorinated-quaternized polymer (P15ClQ) compared to polymer (P15), reduction in the intensity of the N—H stretching vibration peak at 3203 cm$^{-1}$ confirmed the N—Cl bond formation through chlorination and observed a peak for the quaternary nitrogen at 972 cm$^{-1}$ along with other carbonyl peaks at 1763 and 1705 cm$^{-1}$.

M16, P16, P16Cl, P16Q and P16ClQ. The changes observed in the imidazolidinyl urea-based monomer M16 compared to SM16 were shift in the peaks of C=O from 1777, 1708 cm$^{-1}$ to 1779, 1713 cm$^{-1}$ and disappearance of imide N—H at 3285 cm$^{-1}$ and shift in the amide N—H peaks from 3327 to 3304 cm$^{-1}$. Observed stretching of C=C at 1661 cm$^{-1}$. The —N—CH$_2$— bond was found as a peak at 1238 cm$^{-1}$. The disappearance of all the peaks related —CH=CH$_2$ was found in the polymer (P16) and —NH bond was observed at 3304 cm$^{-1}$. Compared to P16, reduction in the intensity of the N—H stretching vibration (3304 cm$^{-1}$) in the chlorinated polymer (P16Cl) confirmed the generation of the N—Cl bond through chlorination. In quaternized polymer (P16Q) observed a prominent peak at 987 cm$^{-1}$ for the quaternary nitrogen and along with the C=O peaks at 1712 cm$^{-1}$. In the chlorinated-quaternized polymer (P16ClQ) compared to polymer (P16), reduction in the intensity of the N—H stretching vibration peak at 3205 cm$^{-1}$ confirmed the N—Cl bond formation through chlorination and observed a peak for the quaternary nitrogen at 964 cm$^{-1}$ along with other carbonyl peaks at 1716 cm$^{-1}$.

M17, P17, P17Cl, P17Q and P17ClQ. The changes observed in the urazole-based monomer M17 compared to SM17 were shift in the peaks of C=O from 1792, 1682 cm$^{-1}$ to 1683 cm$^{-1}$ and disappearance of imide N—H at 3263 cm$^{-1}$ and shift in the amide N—H peaks from 3159 to 3152 cm$^{-1}$. Also bending out of the plane was observed for the —CH=CH$_2$ at 878 and 937 cm$^{-1}$. The —N—CH$_2$— bond was found as a peak at 1211 cm$^{-1}$. The disappearance of all the peaks related —CH=CH$_2$ was found in the polymer (P17) and —NH bond was observed at 3147 cm$^{-1}$. Compared to P17, reduction in the intensity of the N—H stretching vibration (3147 cm$^{-1}$) in the chlorinated polymer (P17Cl) confirmed the generation of the N—Cl bond through chlorination. In quaternized polymer (P17Q) observed a prominent peak at 937 cm$^{-1}$ for the quaternary nitrogen and along with the C=O peaks at 1769 cm$^{-1}$. In the chlorinated-quaternized polymer (P17ClQ) compared to polymer (P17), reduction in the intensity of the N—H stretching vibration peak at 3147 cm$^{-1}$ confirmed the N—Cl bond formation through chlorination and observed a peak for the quaternary nitrogen at 957 cm$^{-1}$ along with other carbonyl peaks at 1703 cm$^{-1}$.

M18, P18, P18Cl, P18Q and P18ClQ. The changes observed in the thymine-based monomer M18 compared to SM18 were shift in the peaks of C=O from 1772, 1693 cm$^{-1}$ to 1752, 1700 cm$^{-1}$ and disappearance of imdide N—H at 3263 cm$^{-1}$ and shift in the amide N—H peaks from 3131 to 3119 cm$^{-1}$. Observed stretching of C=C at 1640 cm$^{-1}$ and also bending out of the plane was observed for the —CH=CH$_2$ at 917 and 951 cm$^{-1}$. The —N—CH$_2$— bond was found as a peak at 1234 cm$^{-1}$. The disappearance of all the peaks related —CH=CH$_2$ was found in the polymer (P18) and —NH bond was observed at 3205 cm$^{-1}$. Compared to P18, reduction in the intensity of the N—H stretching vibration (3205 cm$^{-1}$) in the chlorinated polymer (P18Cl) confirmed the generation of the N—Cl bond through chlorination. In quaternized polymer (P18Q) observed a prominent peak at 982 cm$^{-1}$ for the quaternary nitrogen and along with the C=O peaks at 1721 cm$^{-1}$. In the chlorinated-quaternized polymer (P18ClQ) compared to polymer (P18), reduction in the intensity of the N—H stretching vibration peak at 3205 cm$^{-1}$ confirmed the N—Cl bond formation through chlorination and observed a peak for the quaternary nitrogen at 964 cm$^{-1}$ along with other carbonyl peaks at 1763 and 1694 cm$^{-1}$.

M19, P19, P19Cl, P19Q and P19ClQ. The changes observed in the 5-flurouracil-based monomer M19 compared to SM19 were shift in the peaks of C=O from 1771, 1719 cm$^{-1}$ to 1697 cm$^{-1}$ and disappearance of imide N—H at 3211 cm$^{-1}$ and shift in the amide N—H peaks from 3122 to 3110 cm$^{-1}$. Also bending out of the plane was observed for the —CH=CH$_2$ at 940 and 994 cm$^{-1}$. The —N—CH$_2$— bond was found as a peak at 1245 cm$^{-1}$. The disappearance of all the peaks related —CH=CH$_2$ was found in the polymer (P19) and —NH bond was observed at 3065 cm$^{-1}$. Compared to P19, reduction in the intensity of the N—H stretching vibration (3065 cm$^{-1}$) in the chlorinated polymer (P19Cl) confirmed the generation of the N—Cl bond through chlorination. In quaternized polymer (P19Q) observed a prominent peak at 962 cm$^{-1}$ for the quaternary nitrogen. In the chlorinated-quaternized polymer (P19ClQ) compared to polymer (P19), reduction in the intensity of the N—H stretching vibration peak at 3065 cm$^{-1}$ confirmed the N—Cl bond formation through chlorination and observed a peak for the quaternary nitrogen at 964 cm$^{-1}$.

M20, P20, P20Cl, P20Q and P20ClQ. The changes observed in the 5-chlorourcil-based monomer M20 compared to SM20 were shift in the peaks of C=O from 1780, 1663 cm$^{-1}$ to 1693, 1654 cm$^{-1}$ and disappearance of imide N—H at 3185 cm$^{-1}$ and shift in the amide N—H peaks from 3131 to 3119 cm$^{-1}$. Also bending out of the plane was observed for the —CH=CH$_2$ at 917 and 993 cm$^{-1}$. The —N—CH$_2$— bond was found as a peak at 1229 cm$^{-1}$. The disappearance of all the peaks related —CH=CH$_2$ was found in the polymer (P20) and —NH bond was observed at 3201 cm$^{-1}$. Compared to P20, reduction in the intensity of the N—H stretching vibration (3201 cm$^{-1}$) in the chlorinated polymer (P20Cl) confirmed the generation of the N—Cl bond through chlorination. In quaternized polymer (P20Q) observed a peak at 981 cm$^{-1}$ for the quaternary nitrogen. In the chlorinated-quaternized polymer (P20ClQ) compared to polymer (P20), reduction in the intensity of the N—H stretching vibration peak at 3201 cm$^{-1}$ confirmed the N—Cl bond formation through chlorination and observed a peak for the quaternary nitrogen at 963 cm$^{-1}$.

M21, P21, P21Cl, P21Q and P21ClQ. The changes observed in the barbituric acid-based monomer M21 compared to SM21 were shift in the peaks of C=O from 1750, 1682 cm$^{-1}$ to 1675 cm$^{-1}$ and disappearance of imide N—H at 3183 cm$^{-1}$ and shift in the amide N—H peaks from 3230 to 3225 cm$^{-1}$. Also bending out of the plane was observed for the —CH=CH$_2$ at 995 and 1046 cm$^{-1}$. The —N—CH$_2$— bond was found as a peak at 1240 cm$^{-1}$. The disappearance of all the peaks related —CH=CH$_2$ was found in the polymer (P21) and —NH bond was observed at 3224 cm$^{-1}$. Compared to P21, reduction in the intensity of the N—H stretching vibration (3224 cm$^{-1}$) in the chlorinated polymer (P21Cl) confirmed the generation of the N—Cl bond through chlorination. In quaternized polymer (P21Q) observed a prominent peak at 995 cm$^{-1}$ for the quaternary nitrogen and along with the C=O peaks at 1730 cm$^{-1}$. In the chlorinated-quaternized polymer (P21ClQ) compared to polymer (P21), reduction in the intensity of the N—H stretching vibration peak at 3224 cm$^{-1}$ confirmed the N—Cl bond formation through chlorination and observed a peak for the quaternary nitrogen at 963 cm$^{-1}$ along with other carbonyl peaks at 1698 cm$^{-1}$.

M22, P22, P22Cl, P22Q and P22ClQ. The changes observed in the benzoyleneurea-based monomer M22 compared to SM22 were shift in the peaks of C=O from 1697, 1661 cm$^{-1}$ to 1698, 1652 cm$^{-1}$ and disappearance of imide N—H at 3249 cm$^{-1}$ and shift in the amide N—H peaks from 3161 to 3164 cm$^{-1}$. Also bending out of the plane was observed for the —CH=CH$_2$ at 925 and 997 cm$^{-1}$. The disappearance of all the peaks related —CH=CH$_2$ was found in the polymer (P22) and —NH bond was observed at 3251 cm$^{-1}$. Compared to P22, reduction in the intensity of the N—H stretching vibration (3251 cm$^{-1}$) in the chlorinated polymer (P22Cl) confirmed the generation of the N—Cl bond through chlorination. In quaternized polymer (P22Q) observed a prominent peak at 961 cm$^{-1}$ for the quaternary nitrogen and along with the C=O peaks at 1697 cm$^{-1}$. In the chlorinated-quaternized polymer (P22ClQ) compared to polymer (P22), reduction in the intensity of the N—H stretching vibration peak at 3251 cm$^{-1}$ confirmed the N—Cl bond formation through chlorination and observed a peak for the quaternary nitrogen at 961 cm$^{-1}$ along with other carbonyl peaks at 1698 cm$^{-1}$.

M23, P23, P23Cl, P23Q and P23ClQ. The changes observed in the luminol-based monomer M23 compared to SM23 were shift in the peaks of C=O from 1654 cm$^{-1}$ to 1640 cm$^{-1}$. Also bending out of the plane was observed for the —CH=CH$_2$ at 920 and 990 cm$^{-1}$. The disappearance of all the peaks related —CH=CH$_2$ was found in the polymer (P23). Compared to P23, reduction in the intensity of the N—H stretching vibration in the chlorinated polymer (P23Cl) confirmed the generation of the N—Cl bond through chlorination. In quaternized polymer (P23Q) observed a prominent peak at 926 cm$^{-1}$ for the quaternary nitrogen and along with the C=O peaks at 1711 cm$^{-1}$. In the chlorinated-quaternized polymer (P23ClQ) compared to polymer (P23), reduction in the intensity of the N—H stretching vibration peak confirmed the N—Cl bond formation through chlorination and observed a peak for the quaternary nitrogen at 965 cm$^{-1}$.

M24, P24, P24Cl, P24Q and P24ClQ. The changes observed in the alloxan-based monomer M24 compared to SM24 were shift in the peaks of C=O from 1693 cm$^{-1}$ to 1695 cm$^{-1}$ and shift in the imide N—H peaks from 3255 to 3164 cm$^{-1}$. The disappearance of all the peaks related —CH=CH$_2$ was found in the polymer (P24) and —NH bond was observed at 3151 cm$^{-1}$. Compared to P24, reduction in the intensity of the N—H stretching vibration (3151 cm$^{-1}$) in the chlorinated polymer (P24Cl) confirmed the generation of the N—Cl bond through chlorination. In quaternized polymer (P24Q) observed a prominent peak at 972 cm$^{-1}$ for the quaternary nitrogen and along with the C=O peaks at 1698 cm$^{-1}$. In the chlorinated-quaternized polymer (P24ClQ) compared to polymer (P24), reduction in the intensity of the N—H stretching vibration peak at 3151 cm$^{-1}$ confirmed the N—Cl bond formation through chlorination and observed a peak for the quaternary nitrogen at 966 cm$^{-1}$ along with other carbonyl peaks at 1682 cm$^{-1}$.

M25, P25, P25Cl, P25Q and P25ClQ. The changes observed in the murexide-based monomer M25 compared to SM25 were shift in the peaks of C=O from 1690 cm$^{-1}$ to 1693 cm$^{-1}$ and shift in the imide N—H peaks from 3190 to 3185 cm$^{-1}$. The —N—CH$_2$— bond was found as a peak at 1258 cm$^{-1}$. The disappearance of all the peaks related —CH=CH$_2$ was found in the polymer (P25) and —NH bond was observed at 3187 cm$^{-1}$. Compared to P25, reduction in the intensity of the N—H stretching vibration (3187 cm$^{-1}$) in the chlorinated polymer (P25Cl) confirmed the generation of the N—Cl bond through chlorination. In quaternized polymer (P25Q) observed a peak at 964 cm$^{-1}$ for the quaternary nitrogen and along with the C=O peaks at 1690 cm$^{-1}$. In the chlorinated-quaternized polymer (P25ClQ) compared to polymer (P25), reduction in the intensity of the N—H stretching vibration peak at 3205 cm$^{-1}$ confirmed the N—Cl bond formation through chlorination and observed a peak for the quaternary nitrogen at 964 cm$^{-1}$ along with other carbonyl peaks at 1692 cm$^{-1}$.

M26, P26, P26Cl, P26Q and P26ClQ. The changes observed in the uric acid-based monomer M26 compared to SM26 were shift in the peaks from 1639 cm$^{-1}$ to 1636 cm$^{-1}$. The disappearance of all the peaks related —CH=CH$_2$ was found in the polymer (P26) and —NH bond was observed at 3105 cm$^{-1}$. Compared to P26, reduction in the intensity of the N—H stretching vibration (3105 cm$^{-1}$) in the chlorinated polymer (P26Cl) confirmed the generation of the N—Cl bond through chlorination. In quaternized polymer (P26Q) observed a prominent peak at 989 cm$^{-1}$ for the quaternary nitrogen and along with the C=O peaks at 1727 cm$^{-1}$. In the chlorinated-quaternized polymer (P26ClQ) compared to polymer (P26), reduction in the intensity of the N—H stretching vibration peak at 3205 cm$^{-1}$ confirmed the N—Cl bond formation through chlorination and observed a peak for the quaternary nitrogen at 971 cm$^{-1}$ along with other carbonyl peaks at 1732 cm$^{-1}$.

M27, P27, P27Cl, P27Q and P27ClQ. The changes observed in the dichloroisocyanuric acid sodium-based monomer M27 compared to SM27 were shift in the peaks of C=O from 1750, 1732, 1681 cm$^{-1}$ to 1760, 1698 cm$^{-1}$. The disappearance of all the peaks related —CH=CH$_2$ was found in the polymer (P27). In the chlorinated-quaternized polymer (P27ClQ) compared to polymer (P27) observed a peak for the quaternary nitrogen at 967 cm$^{-1}$ along with other carbonyl peaks at 1708 cm$^{-1}$.

M28, P28, P28Cl, P28Q and P28ClQ. The changes observed in the cyanuric acid-based monomer M28 compared to SM28 were shift in the peaks of C=O from 1753, 1691 cm$^{-1}$ to 1749, 1712 cm$^{-1}$ and shift in the imide N—H peaks from 3200 to 3113 cm$^{-1}$. The disappearance of all the peaks related —CH=CH$_2$ was found in the polymer (P28) and —NH bond was observed at 3106 cm$^{-1}$. Compared to P28, reduction in the intensity of the N—H stretching vibration (3106 cm$^{-1}$) in the chlorinated polymer (P28Cl) confirmed the generation of the N—Cl bond through chlorination. In quaternized polymer (P28Q) observed a prominent peak at 978 cm$^{-1}$ for the quaternary nitrogen and along with the C=O peaks at 1747 and 1706 cm$^{-1}$. In the chlorinated-quaternized polymer (P28ClQ) compared to polymer (P28), reduction in the intensity of the N—H stretching vibration peak at 3106 cm$^{-1}$ confirmed the N—Cl bond formation through chlorination and observed a peak for the quaternary nitrogen at 958 cm$^{-1}$ along with other carbonyl peaks at 1756 and 1719 cm$^{-1}$.

M29, P29, P29Cl, P29Q and P29ClQ. The changes observed in the 2-thiohydantoin-based monomer M29 compared to SM29 were shift in the peaks of C=O from 1783, 1709 cm$^{-1}$ to 1774, 1692 cm$^{-1}$ and disappearance of imide N—H at 3256 cm$^{-1}$ and shift in the amide N—H peaks from 3170 to 3133 cm$^{-1}$. Also bending out of the plane was observed for the —CH=CH$_2$ at 900 and 993 cm$^{-1}$. The —N—CH$_2$— bond was found as a peak at 1286 cm$^{-1}$. The disappearance of all the peaks related —CH=CH$_2$ was found in the polymer (P29) and —NH bond was observed at 3133 cm$^{-1}$. Compared to P29, reduction in the intensity of the N—H stretching vibration (3133 cm$^{-1}$) in the chlorinated polymer (P29Cl) confirmed the generation of the N—Cl bond through chlorination. In quaternized polymer (P29Q) observed a prominent peak at 992 cm$^{-1}$ for the quaternary nitrogen and along with the C=O peaks at 1773 and 1693 cm$^{-1}$. In the chlorinated-quaternized polymer (P29ClQ) compared to polymer (P29), reduction in the intensity of the N—H stretching vibration peak at 3133 cm$^{-1}$ confirmed the N—Cl bond formation through chlorination and observed a peak for the quaternary nitrogen at 988 cm$^{-1}$ along with other carbonyl peaks at 1759 and 1704 cm$^{-1}$.

M30, P30, P30Cl, P30Q and P30ClQ. The changes observed in the 5-methyl-5-phenylhydantoin-based monomer M30 compared to SM30 were shift in the peaks of C=O from 1765, 1710 cm$^{-1}$ to 1774, 1700 cm$^{-1}$ and disappearance of imide N—H at 3196 cm$^{-1}$ and shift in the amide N—H peaks from 3274 to 3263 cm$^{-1}$. also bending out of the plane was observed for the —CH=CH$_2$ at 922 and 986 cm$^{-1}$. The —N—CH$_2$— bond was found as a peak at 1260 cm$^{-1}$. The disappearance of all the peaks related —CH=CH$_2$ was found in the polymer (P30) and —NH bond was observed at 3262 cm$^{-1}$. Compared to P30, reduction in the intensity of the N—H stretching vibration (3262 cm$^{-1}$) in the chlorinated polymer (P30Cl) confirmed the generation of the N—Cl bond through chlorination. In quaternized polymer (P30Q) observed a prominent peak at 986 cm$^{-1}$ for the quaternary nitrogen and along with the C=O peaks at 1770 and 1697 cm$^{-1}$. In the chlorinated-quaternized polymer (P30ClQ) compared to polymer (P30), reduction in the intensity of the N—H stretching vibration peak at 3262 cm$^{-1}$ confirmed the N—Cl bond formation through chlorination and observed a peak for the quaternary nitrogen at 983 cm$^{-1}$ along with other carbonyl peaks at 1763 and 1696 cm$^{-1}$.

M31, P31, P31Cl, P31Q and P31ClQ. The changes observed in the 5-ethyl-5-methylhydantoin-based monomer M31 compared to SM31 were shift in the peaks of C=O from 1766, 1703 cm$^{-1}$ to 1773, 1700 cm$^{-1}$ and shift in the amide N—H peaks from 3214 to 3276 cm$^{-1}$. Also bending out of the plane was observed for the —CH=CH$_2$ at 923 and 986 cm$^{-1}$. The —N—CH$_2$— bond was found as a peak at 1259 cm$^{-1}$. The disappearance of all the peaks related —CH=CH$_2$ was found in the polymer (P31) and —NH bond was observed at 3210 cm$^{-1}$. Compared to P31, reduction in the intensity of the N—H stretching vibration (3210 cm$^{-1}$) in the chlorinated polymer (P31Cl) confirmed the generation of the N—Cl bond through chlorination. In quaternized polymer (P31Q) observed a prominent peak at 985 cm$^{-1}$ for the quaternary nitrogen and along with the C=O peaks at 1767, 1698 cm$^{-1}$. In the chlorinated-quaternized polymer (P31ClQ) compared to polymer (P31), reduction in the intensity of the N—H stretching vibration peak at 3205 cm$^{-1}$ confirmed the N—Cl bond formation through chlorination and observed a peak for the quaternary nitrogen at 988 cm$^{-1}$ along with other carbonyl peaks at 1770 and 1698 cm$^{-1}$.

M32, P32, P32Cl, P32Q and P32ClQ. The changes observed in the 5-(4-chlorobutyl)hydantoin-based monomer M32 compared to SM32 were shift in the peaks of C=O from 1766, 1708 cm$^{-1}$ to 1765, 1692 cm$^{-1}$ and shift in the amide N—H peaks from 3305 to 3312 cm$^{-1}$. Also bending out of the plane was observed for the —CH=CH$_2$ at 927 and 994 cm$^{-1}$. The —N—CH$_2$— bond was found as a peak at 1267 cm$^{-1}$. The disappearance of all the peaks related —CH=CH$_2$ was found in the polymer (P32) and —NH bond was observed at 3311 cm$^{-1}$. Compared to P32, reduction in the intensity of the N—H stretching vibration (3311 cm$^{-1}$) in the chlorinated polymer (P32Cl) confirmed the generation of the N—Cl bond through chlorination. In quaternized polymer (P32Q) observed a prominent peak at 993 cm$^{-1}$ for the quaternary nitrogen and along with the C=O peaks at 1766 cm$^{-1}$. In the chlorinated-quaternized polymer (P32ClQ) compared to polymer (P32), reduction in the intensity of the N—H stretching vibration peak at 3205 cm$^{-1}$ confirmed the N—Cl bond formation through chlorination and observed a peak for the quaternary nitrogen at 988 cm$^{-1}$ along with other carbonyl peaks at 1769 and 1698 cm$^{-1}$.

M33, P33, P33Cl, P33Q and P33ClQ. The changes observed in the 5-propylhydantoin-based monomer M33 compared to SM33 were shift in the peaks of C=O from 1763, 1694 cm$^{-1}$ to 1764, 1701 cm$^{-1}$ and shift in the amide N—H peaks from 3250 to 3218 cm$^{-1}$. Also bending out of the plane was observed for the —CH=CH$_2$ at 930 and 970 cm$^{-1}$. The —N—CH$_2$— bond was found as a peak at 1247 cm$^{-1}$. The disappearance of all the peaks related —CH=CH$_2$ was found in the polymer (P33) and —NH bond was observed at 3220 cm$^{-1}$. Compared to P33, reduction in the intensity of the N—H stretching vibration (3220 cm$^{-1}$) in the chlorinated polymer (P33Cl) confirmed the generation of the N—Cl bond through chlorination. In quaternized polymer (P33Q) observed a prominent peak at 988 cm$^{-1}$ for the quaternary nitrogen and along with the C=O peaks at 1766 cm$^{-1}$. In the chlorinated-quaternized polymer (P33ClQ) compared to polymer (P33), reduction in the intensity of the N—H stretching vibration peak at 3220 cm$^{-1}$ confirmed the N—Cl bond formation through chlorination and observed a peak for the quaternary nitrogen at 970 cm$^{-1}$ along with other carbonyl peaks at 1768 and 1701 cm$^{-1}$.

M34, P34, P34Cl, P34Q and P34ClQ. The changes observed in the 1-aminohydantoin hydrochloride-based monomer M34 compared to SM34 were shift in the peaks of C=O from 1783, 1720 cm$^{-1}$ to 1780, 1720 cm$^{-1}$. Also bending out of the plane was observed for the —CH=CH$_2$ at 954 and 988 cm$^{-1}$. The —N—CH$_2$— bond was found as a peak at 1226 cm$^{-1}$. The disappearance of all the peaks related —CH=CH$_2$ was found in the polymer (P34) and —NH bond was observed at 3128 cm$^{-1}$. Compared to P34, reduction in the intensity of the N—H stretching vibration (3124 cm$^{-1}$) in the chlorinated polymer (P34Cl) confirmed the generation of the N—Cl bond through chlorination. In quaternized polymer (P34Q) observed a prominent peak at 986 cm$^{-1}$ for the quaternary nitrogen and along with the C=O peaks at 1774 and 1697 cm$^{-1}$. In the chlorinated-quaternized polymer (P34ClQ) compared to polymer (P34), reduction in the intensity of the N—H stretching vibration peak at 3205 cm$^{-1}$ confirmed the N—Cl bond formation through chlorination and observed a peak for the quaternary nitrogen at 989 cm$^{-1}$ along with other carbonyl peaks at 1778 and 1692 cm$^{-1}$.

M35, P35, P35Cl, P35Q and P35ClQ. The changes observed in the hydantoin-5-acetic acid monomer M35 compared to SM35 were shift in the peaks of C=O from 1757, 1682 cm-1 to 1767, 1685 cm$^{-1}$. The disappearance of all the peaks related —CH=CH2 was found in the polymer (P35) and —NH bond was observed at 3214 cm$^{-1}$. Compared to P35, reduction in the intensity of the N—H stretching vibration (3214 cm$^{-1}$) in the chlorinated polymer (P35Cl) confirmed the generation of the N—Cl bond through chlorination. In quaternized polymer (P35Q) observed a prominent peak at 962 cm$^{-1}$ for the quaternary nitrogen and along with the C=O peaks at 1769 and 1712 cm$^{-1}$. In the chlorinated-quaternized polymer (P35ClQ) compared to polymer (P35), reduction in the intensity of the N—H stretching vibration peak at 3214 cm-1 confirmed the N—Cl bond formation through chlorination and observed a peak for the quaternary nitrogen at 964 cm$^{-1}$ along with other carbonyl peaks at 1767 and 1710 cm$^{-1}$.

M36, P36, P36Cl, P36Q and P36ClQ. The changes observed in the 5,6-dimethyluracil-based monomer M36 compared to SM36 were shift in the peaks of C=O from 1706, 1631 cm$^{-1}$ to 1632 cm$^{-1}$ and shift in the imide N—H peaks from 3090 to 3138 cm$^{-1}$. Also bending out of the plane was observed for the —CH=CH$_2$ at 938 and 984 cm$^{-1}$. The —N—CH$_2$— bond was found as a peak at 1215 cm$^{-1}$. The disappearance of all the peaks related —CH=CH$_2$ was found in the polymer (P36) and —NH bond was observed at 3240 cm$^{-1}$. Compared to P36, reduction in the intensity of the N—H stretching vibration (3240 cm$^{-1}$) in the chlorinated polymer (P36Cl) confirmed the generation of the N—Cl bond through chlorination. In quaternized polymer (P36Q) observed a prominent peak at 936 cm$^{-1}$ for the quaternary nitrogen and along with the C=O peaks at 1693 cm$^{-1}$. In the chlorinated-quaternized polymer (P36ClQ) compared to polymer (P36), reduction in the intensity of the N—H stretching vibration peak at 3205 cm$^{-1}$ confirmed the N—Cl bond formation through chlorination and observed a peak for the quaternary nitrogen at 964 cm$^{-1}$ along with other carbonyl peaks at 1693 cm$^{-1}$.

M37, P37, P37Cl, P37Q and P37ClQ. The changes observed in the 5-ethyluracil-based monomer M37 compared to SM37 were shift in the peaks of C=O from 1727, 1667, cm$^{-1}$ to 1655 cm$^{-1}$ and shift in the amide N—H peaks from 3131 to 3119 cm$^{-1}$. The —N—CH$_2$— bond was found as a peak at 1242 cm$^{-1}$. The disappearance of all the peaks related —CH=CH$_2$ was found in the polymer (P37) and —NH bond was observed at 3192 cm$^{-1}$. Compared to P37, reduction in the intensity of the N—H stretching vibration (3192 cm$^{-1}$) in the chlorinated polymer (P37Cl) confirmed the generation of the N—Cl bond through chlorination. In quaternized polymer (P37Q) observed a prominent peak at 991 cm$^{-1}$ for the quaternary nitrogen and along with the C=O peaks at 1655 cm$^{-1}$. In the chlorinated-quaternized polymer (P37ClQ) compared to polymer (P37), reduction in the intensity of the N—H stretching vibration peak at 3205 cm$^{-1}$ confirmed the N—Cl bond formation through chlorination and observed a peak for the quaternary nitrogen at 989 cm$^{-1}$ along with other carbonyl peaks at 1660 cm$^{-1}$.

M38, P38, P38Cl, P38Q and P38ClQ. The changes observed in the 5-bromouracil-based monomer M38 compared to SM38 were shift in the peaks of C=O from 1694, 1660 cm$^{-1}$ to 1696, 1654 cm$^{-1}$ and shift in the amide N—H peaks from 3156 to 3157 cm$^{-1}$. Also found —CH=CH$_2$ overtone at 1806 cm$^{-1}$, observed stretching of C=C at 1640 cm$^{-1}$ and also bending out of the plane was observed for the —CH=CH$_2$ at 922 and 981 cm$^{-1}$. The —N—CH$_2$— bond was found as a peak at 1226 cm$^{-1}$. The disappearance of all the peaks related —CH=CH$_2$ was found in the polymer (P38) and —NH bond was observed at 3157 cm$^{-1}$. Compared to P38, reduction in the intensity of the N—H stretching vibration (3157 cm$^{-1}$) in the chlorinated polymer (P38Cl) confirmed the generation of the N—Cl bond through chlorination. In quaternized polymer (P38Q) observed a prominent peak at 986 cm$^{-1}$ for the quaternary nitrogen and along with the C=O peaks at 1694 cm$^{-1}$. In the chlorinated-quaternized polymer (P38ClQ) compared to polymer (P38), reduction in the intensity of the N—H stretching vibration peak at 3205 cm$^{-1}$ confirmed the N—Cl bond formation through chlorination and observed a peak for the quaternary nitrogen at 967 cm$^{-1}$ along with other carbonyl peaks at 1695 cm$^{-1}$.

M39, P39, P39Cl, P39Q and P39ClQ. The changes observed in the 6-chlorouracil-based monomer M39 compared to SM39 were shift in the peaks of C=O from 1715 cm$^{-1}$ to 1716 cm$^{-1}$ and shift in the amide N—H peaks from 3089 to 3090 cm$^{-1}$. Also bending out of the plane was observed for the —CH=CH$_2$ at 912 and 981 cm$^{-1}$. The disappearance of all the peaks related —CH=CH$_2$ was found in the polymer (P39) and —NH bond was observed at 3089 cm$^{-1}$. Compared to P39, reduction in the intensity of the N—H stretching vibration (3089 cm$^{-1}$) in the chlorinated polymer (P39Cl) confirmed the generation of the N—Cl bond through chlorination. In quaternized polymer (P39Q) observed a prominent peak at 985 cm$^{-1}$ for the quaternary nitrogen and along with the C=O peaks at 1735 cm$^{-1}$. In the chlorinated-quaternized polymer (P39ClQ) compared to polymer (P39), reduction in the intensity of the N—H stretching vibration peak at 3205 cm$^{-1}$ confirmed the N—Cl bond formation through chlorination and observed a peak for the quaternary nitrogen at 993 cm$^{-1}$ along with other carbonyl peaks at 1715 cm$^{-1}$.

M40, P40, P40Cl, P40Q and P40ClQ. The changes observed in the 6-thioguanine-based monomer M40 compared to SM40 were shift in the peaks of C=O from 1662 cm$^{-1}$ to 1637 cm$^{-1}$ and shift in the amide N—H peaks from 3275 to 3293 cm$^{-1}$. The disappearance of all the peaks related —CH=CH$_2$ was found in the polymer (P40) and —NH bond was observed at 3292 cm$^{-1}$. Compared to P40, reduction in the intensity of the N—H stretching vibration (3292 cm$^{-1}$) in the chlorinated polymer (P40Cl) confirmed the generation of the N—Cl bond through chlorination. In quaternized polymer (P40Q) observed a prominent peak at 978 cm$^{-1}$ for the quaternary nitrogen and along with the C=O peaks at 1628 cm$^{-1}$. In the chlorinated-quaternized polymer (P40ClQ) compared to polymer (P40), reduction in the intensity of the N—H stretching vibration peak at 3205 cm$^{-1}$ confirmed the N—Cl bond formation through chlorination and observed a peak for the quaternary nitrogen at 965 cm$^{-1}$ along with other carbonyl peaks at 1703 cm$^{-1}$.

M41, P41, P41Cl, P41Q and P41ClQ. The changes observed in the 5-nitrobarbituric acid-based monomer M41 compared to SM41 were shift in the peaks of C=O from 1716 cm$^{-1}$ to 1712 cm$^{-1}$ and shift in the amide N—H peaks from 3130 to 3135 cm$^{-1}$. The —N—CH$_2$— bond was found as a peak at 1268 cm$^{-1}$. The disappearance of all the peaks related —CH=CH$_2$ was found in the polymer (P41) and —NH bond was observed at 3135 cm$^{-1}$. Compared to P41, reduction in the intensity of the N—H stretching vibration (3135 cm$^{-1}$) in the chlorinated polymer (P41Cl) confirmed the generation of the N—Cl bond through chlorination. In quaternized polymer (P41Q) observed a prominent peak at 961 cm$^{-1}$ for the quaternary nitrogen and along with the C=O peaks at 1766 cm$^{-1}$. In the chlorinated-quaternized polymer (P41ClQ) compared to polymer (P41), reduction in the intensity of the N—H stretching vibration peak at 3135 cm$^{-1}$ confirmed the N—Cl bond formation through chlorination and observed a peak for the quaternary nitrogen at 967 cm$^{-1}$ along with other carbonyl peaks at 1763 and 1705 cm$^{-1}$.

M42, P42, P42Cl, P42Q and P42ClQ. The changes observed in the 5-cytosine-based monomer M42 compared to SM42 were shift in the peaks of C=O from 1710 cm$^{-1}$ to 1712 cm$^{-1}$ and shift in the amide N—H peaks from 3250 to 3270 cm$^{-1}$. Also bending out of the plane was observed for the —CH=CH$_2$ at 926 and 998 cm$^{-1}$. The —N—CH$_2$— bond was found as a peak at 1250 cm$^{-1}$. The disappearance of all the peaks related —CH=CH$_2$ was found in the polymer (P42) and —NH bond was observed at 3275 cm$^{-1}$. Compared to P42, reduction in the intensity of the N—H stretching vibration (3275 cm$^{-1}$) in the chlorinated polymer (P42Cl) confirmed the generation of the N—Cl bond through chlorination. In quaternized polymer (P42Q)

observed a prominent peak at 987 cm$^{-1}$ for the quaternary nitrogen and along with the C=O peaks at 1711 cm$^{-1}$. In the chlorinated-quaternized polymer (P42ClQ) compared to polymer (P42), reduction in the intensity of the N—H stretching vibration peak at 3205 cm$^{-1}$ confirmed the N—Cl bond formation through chlorination and observed a peak for the quaternary nitrogen at 935 cm$^{-1}$ along with other carbonyl peaks at 1711 cm$^{-1}$.

M43, P43, P43Cl, P43Q and P43ClQ. The changes observed in the hypoxanthine-based monomer M43 compared to SM43 were shift in the peaks of C=O from 1765, 1662 cm$^{-1}$ to 1670 cm$^{-1}$ and shift in the amide N—H peaks from 3133 to 3142 cm$^{-1}$. The disappearance of all the peaks related —CH=CH$_2$ was found in the polymer (P43) and —NH bond was observed at 3195 cm$^{-1}$. Compared to P43, reduction in the intensity of the N—H stretching vibration (3195 cm$^{-1}$) in the chlorinated polymer (P43Cl) confirmed the generation of the N—Cl bond through chlorination. In quaternized polymer (P43Q) observed a prominent peak at 961 cm$^{-1}$ for the quaternary nitrogen and along with the C=O peaks at 1663 cm$^{-1}$. In the chlorinated-quaternized polymer (P43ClQ) compared to polymer (P43), reduction in the intensity of the N—H stretching vibration peak at 3205 cm$^{-1}$ confirmed the N—Cl bond formation through chlorination and observed a peak for the quaternary nitrogen at 964 cm$^{-1}$ along with other carbonyl peaks at 1701 cm$^{-1}$.

M44, P44, P44Cl, P44Q and P44ClQ. The changes observed in the primidone-based monomer M44 compared to SM44 were shift in the peaks of C=O from 1708, 1651 cm$^{-1}$ to 1691, 1651 cm$^{-1}$ and shift in the amide N—H peaks from 3187 to 3194 cm$^{-1}$. The —N—CH$_2$— bond was found as a peak at 1276 cm$^{-1}$. The disappearance of all the peaks related —CH=CH$_2$ was found in the polymer (P44) and —NH bond was observed at 3191 cm$^{-1}$. Compared to P44, reduction in the intensity of the N—H stretching vibration (3191 cm$^{-1}$) in the chlorinated polymer (P44Cl) confirmed the generation of the N—Cl bond through chlorination. In quaternized polymer (P44Q) observed a prominent peak at 934 cm$^{-1}$ for the quaternary nitrogen and along with the C=O peaks at 1692 cm$^{-1}$. In the chlorinated-quaternized polymer (P44ClQ) compared to polymer (P44), reduction in the intensity of the N—H stretching vibration peak at 3191 cm$^{-1}$ confirmed the N—Cl bond formation through chlorination and observed a peak for the quaternary nitrogen at 955 cm$^{-1}$ along with other carbonyl peaks at 1660 cm$^{-1}$.

M45, P45, P45Cl, P45Q and P45ClQ. The changes observed in the uramil-based monomer M45 compared to SM45 were shift in the peaks of C=O from 1693 cm$^{-1}$ to 1690 cm$^{-1}$ and shift in the amide N—H peaks from 3195 to 3187 cm$^{-1}$. The disappearance of all the peaks related —CH=CH$_2$ was found in the polymer (P45) and —NH bond was observed at 3097 cm$^{-1}$. Compared to P45, reduction in the intensity of the N—H stretching vibration (3097 cm$^{-1}$) in the chlorinated polymer (P45Cl) confirmed the generation of the N—Cl bond through chlorination. In quaternized polymer (P45Q) observed a prominent peak at 946 cm$^{-1}$ for the quaternary nitrogen and along with the C=O peaks at 1698 cm$^{-1}$. In the chlorinated-quaternized polymer (P45ClQ) compared to polymer (P45), reduction in the intensity of the N—H stretching vibration peak at 3205 cm$^{-1}$ confirmed the N—Cl bond formation through chlorination and observed a peak for the quaternary nitrogen at 954 cm$^{-1}$ along with other carbonyl peaks at 1723 cm$^{-1}$.

M46, P46, P46Cl, P46Q and P46ClQ. The changes observed in the violuric acid monohydrate-based monomer M46 compared to SM46 were shift in the peaks of C=O from 1772, 1694 cm$^{-1}$ to 1690 cm$^{-1}$ and shift in the amide N—H peaks from 3187 to 3194 cm$^{-1}$. The disappearance of all the peaks related —CH=CH$_2$ was found in the polymer (P46) and —NH bond was observed at 3194 cm$^{-1}$. Compared to P46, reduction in the intensity of the N—H stretching vibration (3194 cm$^{-1}$) in the chlorinated polymer (P46Cl) confirmed the generation of the N—Cl bond through chlorination. In quaternized polymer (P46Q) observed a prominent peak at 970 cm$^{-1}$ for the quaternary nitrogen and along with the C=O peaks at 1720 cm$^{-1}$. In the chlorinated-quaternized polymer (P46ClQ) compared to polymer (P46), reduction in the intensity of the N—H stretching vibration peak at 3194 cm$^{-1}$ confirmed the N—Cl bond formation through chlorination and observed a peak for the quaternary nitrogen at 983 cm$^{-1}$ along with other carbonyl peaks at 1720 cm$^{-1}$.

M47, P47, P47Cl, P47Q and P47ClQ. The changes observed in the uramil-N,N-diacetic acid-based monomer M47 compared to SM47 were shift in the peaks of C=O from 1723, 1687 cm$^{-1}$ to 1749 cm$^{-1}$ and shift in the amide N—H peaks from 3131 to 3140 cm$^{-1}$. The disappearance of all the peaks related —CH=CH$_2$ was found in the polymer (P47) and —NH bond was observed at 3142 cm$^{-1}$. Compared to P47, reduction in the intensity of the N—H stretching vibration (3142 cm$^{-1}$) in the chlorinated polymer (P47Cl) confirmed the generation of the N—Cl bond through chlorination. In quaternized polymer (P47Q) observed a prominent peak at 961 cm$^{-1}$ for the quaternary nitrogen and along with the C=O peaks at 1717 cm$^{-1}$. In the chlorinated-quaternized polymer (P47ClQ) compared to polymer (P47), reduction in the intensity of the N—H stretching vibration peak at 3142 cm$^{-1}$ confirmed the N—Cl bond formation through chlorination and observed a peak for the quaternary nitrogen at 981 cm$^{-1}$ along with other carbonyl peaks at 1739 cm$^{-1}$.

M48, P48, P48Cl, P48Q and P48ClQ. The changes observed in the lumazine-based monomer M48 compared to SM48 were shift in the peaks of C=O from 1682 cm$^{-1}$ to 1688 cm$^{-1}$ and shift in the amide N—H peaks from 3170 to 3185 cm$^{-1}$. The disappearance of all the peaks related —CH=CH$_2$ was found in the polymer (P48) and —NH bond was observed at 3185 cm$^{-1}$. Compared to P48, reduction in the intensity of the N—H stretching vibration (3185 cm$^{-1}$) in the chlorinated polymer (P48Cl) confirmed the generation of the N—Cl bond through chlorination. In quaternized polymer (P48Q) observed a prominent peak at 964 cm$^{-1}$ for the quaternary nitrogen and along with the C=O peaks at 1685 cm$^{-1}$. In the chlorinated-quaternized polymer (P48ClQ) compared to polymer (P48), reduction in the intensity of the N—H stretching vibration peak at 3185 cm$^{-1}$ confirmed the N—Cl bond formation through chlorination and observed a peak for the quaternary nitrogen at 936 cm$^{-1}$ along with other carbonyl peaks at 1666 cm$^{-1}$.

M49, P49, P49Cl, P49Q and P49ClQ. The changes observed in the xanthine-based monomer M49 compared to SM49 were shift in the peaks of C=O from 1694, 1655 cm$^{-1}$ to 1655 cm$^{-1}$ and shift in the amide N—H peaks from 3131 to 3137 cm$^{-1}$. The disappearance of all the peaks related —CH=CH$_2$ was found in the polymer (P49) and —NH bond was observed at 3135 cm$^{-1}$. Compared to P49, reduction in the intensity of the N—H stretching vibration (3135 cm$^{-1}$) in the chlorinated polymer (P49Cl) confirmed the generation of the N—Cl bond through chlorination. In quaternized polymer (P49Q) observed a prominent peak at 957 cm$^{-1}$ for the quaternary nitrogen and along with the C=O peaks at 1653 cm$^{-1}$. In the chlorinated-quaternized polymer (P49ClQ) compared to polymer (P49), reduction in the intensity of the N—H stretching vibration peak at 3205 cm$^{-1}$ confirmed the N—Cl bond formation through chlorination and observed a peak for the quaternary nitrogen at 958 cm$^{-1}$ along with other carbonyl peaks at 1697 cm$^{-1}$.

M50, P50, P50Cl, P50Q and P50ClQ. The changes observed in the 5-(4-hydroxybutyl) hydantoin-based monomer M50 compared to SM50 were shift in the peaks of C=O from 1772, 1749, 1693 cm$^{-1}$ to 1752, 1693 cm$^{-1}$ and disappearance of imide N—H at 3283 cm$^{-1}$ and shift in the amide N—H peaks from 3131 to 3119 cm$^{-1}$. Also found —CH=CH$_2$ overtone at 1806 cm$^{-1}$, observed stretching of C=C at 1640 cm$^{-1}$ and also bending out of the plane was observed for the —CH=CH$_2$ at 917 and 1000 cm$^{-1}$. The —N—CH$_2$— bond was found as a peak at 1234 cm$^{-1}$. The disappearance of all the peaks related —CH=CH$_2$ was found in the polymer (P50) and —NH bond was observed at 3205 cm$^{-1}$. Compared to P50, reduction in the intensity of the N—H stretching vibration (3205 cm$^{-1}$) in the chlorinated polymer (P50Cl) confirmed the generation of the N—Cl bond through chlorination. In quaternized polymer (P50Q) observed a prominent peak at 958 cm$^{-1}$ for the quaternary nitrogen and along with the C=O peaks at 1766 cm$^{-1}$. In the chlorinated-quaternized polymer (P50ClQ) compared to polymer (P50), reduction in the intensity of the N—H stretching vibration peak at 3205 cm$^{-1}$ confirmed the N—Cl bond formation through chlorination and observed a peak for the quaternary nitrogen at 961 cm$^{-1}$ along with other carbonyl peaks at 1763 and 1705 cm$^{-1}$.

NMR Results

Several representatives of the starting materials, and their respective monomers, polymers, chlorinated polymers, quaternized polymers, and polymers containing both N-halamine and quaternary ammonium, were characterized by their chemical structure using $^1$H-NMR.

$^1$H NMR spectra of the hydantoin (SM1), 1-allyhydantoin (M1), and the respective hydantoin polymer P1, chlorinated hydantoin polymer P1Cl, quaternized hydantoin polymer P1Q, and hydantoin polymer containing both N-halamine and quaternary ammonium P1ClQ, as examples only, shown in FIGS. 1-6, and FIG. 7 shows comparative spectra of hydantoin, hydantoin monomer and hydantoin polymer derivatives.

Percentage (%) Quaternary Ammonium Quantification

The percentage quat of P1Q and P1ClQ was calculated and were found to be 52.31% and 40.15%, respectively.

Molecular Structure Analysis, Elemental Analysis and GPC Results

Molecular weights of the polymers were determined by GPC using standard procedure. The representative samples molecular weights are given in the below Table 7. Chemical compositions were determined by elemental analysis of C %, H % and N % per functionalization and representative analysis is given in Table 8.

TABLE 7

Representative polymers molecular weights and their polydispersities

| Sample | Polymer | Mn (Daltons) | MW (Daltons) | MP (Daltons) | PDI |
|---|---|---|---|---|---|
| 1 | P9 | 66559 | 81405 | 88541 | 1.223060 |
| 2 | P10 | 42130 | 65738 | 87986 | 1.127827 |
| 3 | P18 | 61353 | 78268 | 83070 | 1.275697 |
| 4 | P19 | 33873 | 60646 | 79249 | 1.793325 |
| 5 | P20 | 45200 | 68606 | 77937 | 1.151783 |

TABLE 7-continued

Representative polymers molecular weights and their polydispersities

| Sample | Polymer | Mn (Daltons) | MW (Daltons) | MP (Daltons) | PDI |
|---|---|---|---|---|---|
| 6 | P47 | 43810 | 68103 | 79697 | 1.554498 |
| 7 | P48 | 47776 | 69153 | 90731 | 1.447423 |
| 8 | P49 | 51733 | 71525 | 80463 | 1.382582 |

TABLE 8

Representative elemental analysis of C %, H % and N % per functionalization

| Functionalized polymer | N % | C % | H % |
|---|---|---|---|
| P9 | 14.18 | 33.69 | 3.95 |
| P9Cl | 11.43 | 26.61 | 2.80 |
| P9Q | 9.80 | 24.60 | 3.23 |
| P10 | 19.85 | 26.86 | 2.75 |
| P10Cl | 17.00 | 20.16 | 1.42 |
| P10Q | 18.55 | 21.95 | 1.35 |
| P48 | 24.60 | 38.13 | 2.94 |
| P48Cl | 18.29 | 27.58 | 1.99 |
| P48Q | 16.70 | 25.63 | 1.79 |

DSC Thermal Analysis and Stability

Figure 9:
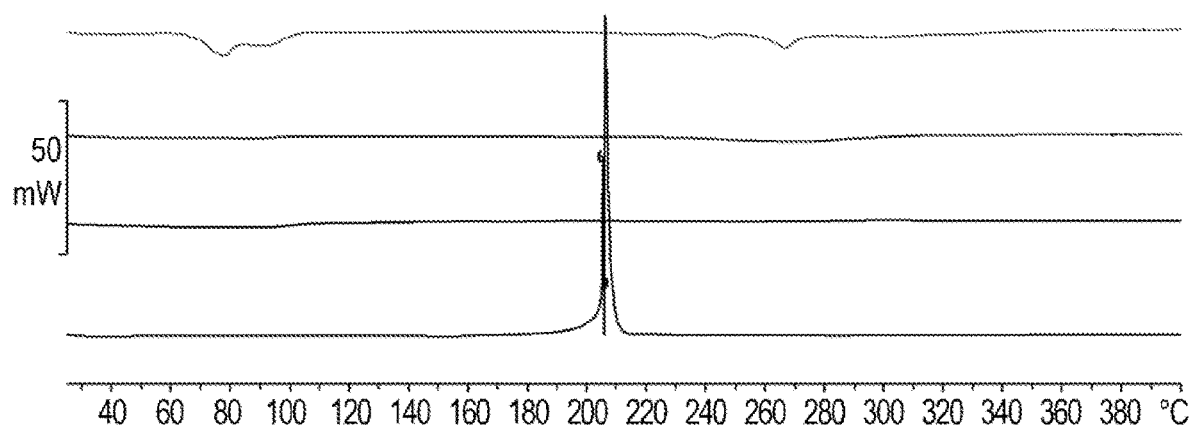
FIG. 9 shows DSC studies of P1, P1Q, P1ClQ, and P1Cl (from top to bottom, respectively), performed at a heating rate of 10° C./min from room temperature to 400° C. under N₂ atmosphere.
Figure 10:
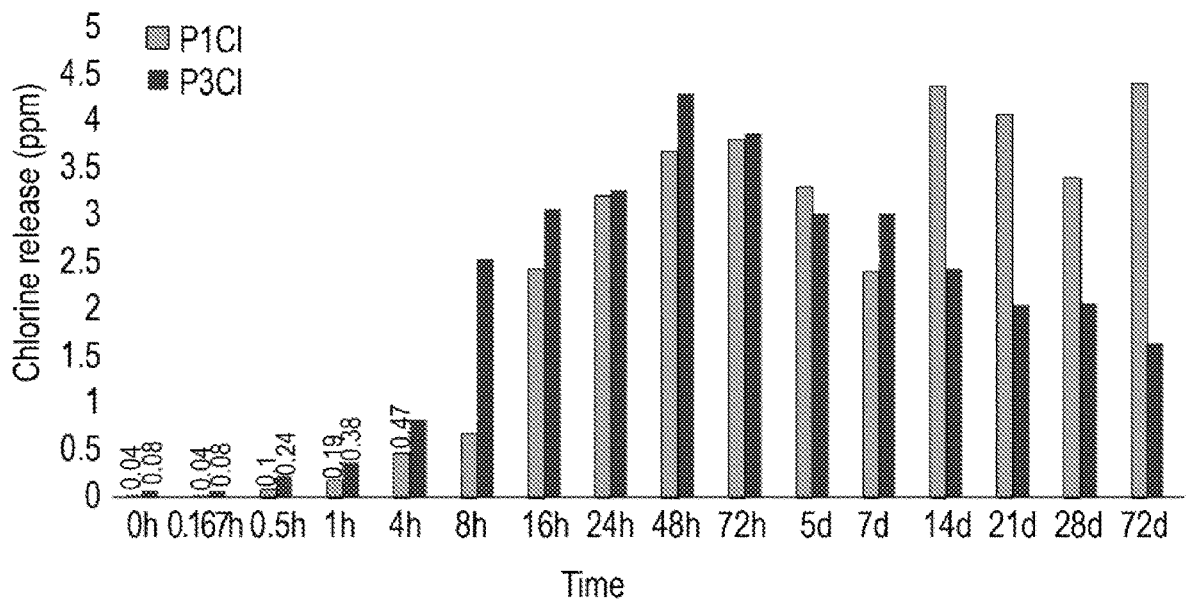
FIG. 10 shows free chlorine release from P1Cl and P3Cl (values of less than 0.5 ppm only are explicitly indicated).
Figure 11:
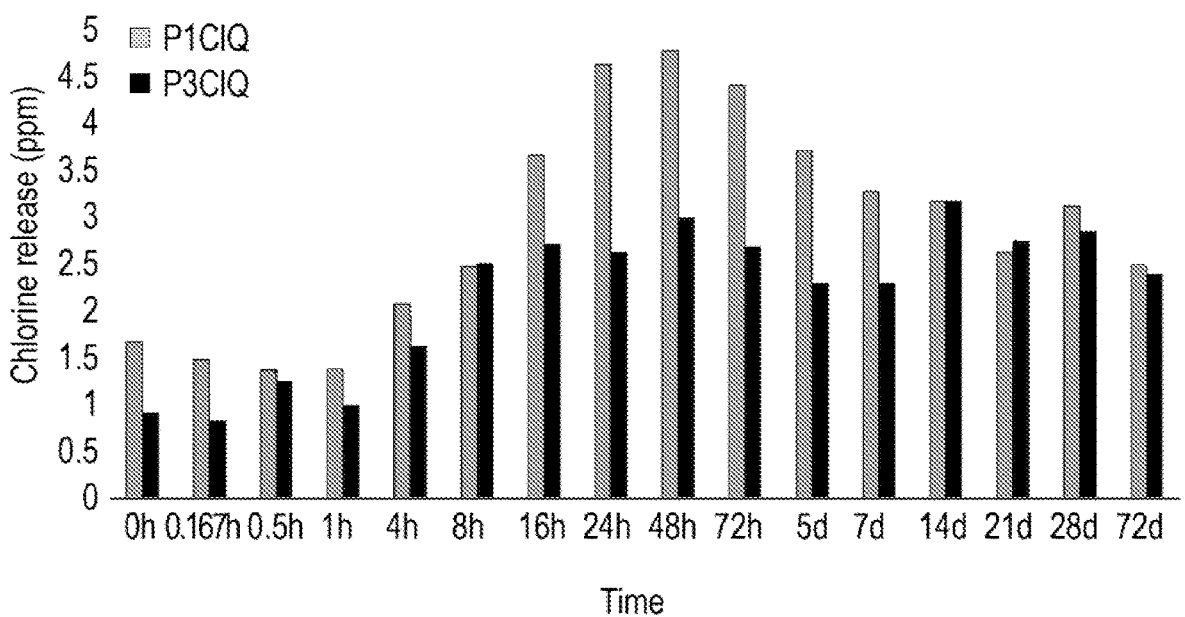
FIG. 11 shows free chlorine release from P1ClQ and P3ClQ.
Figure 12:
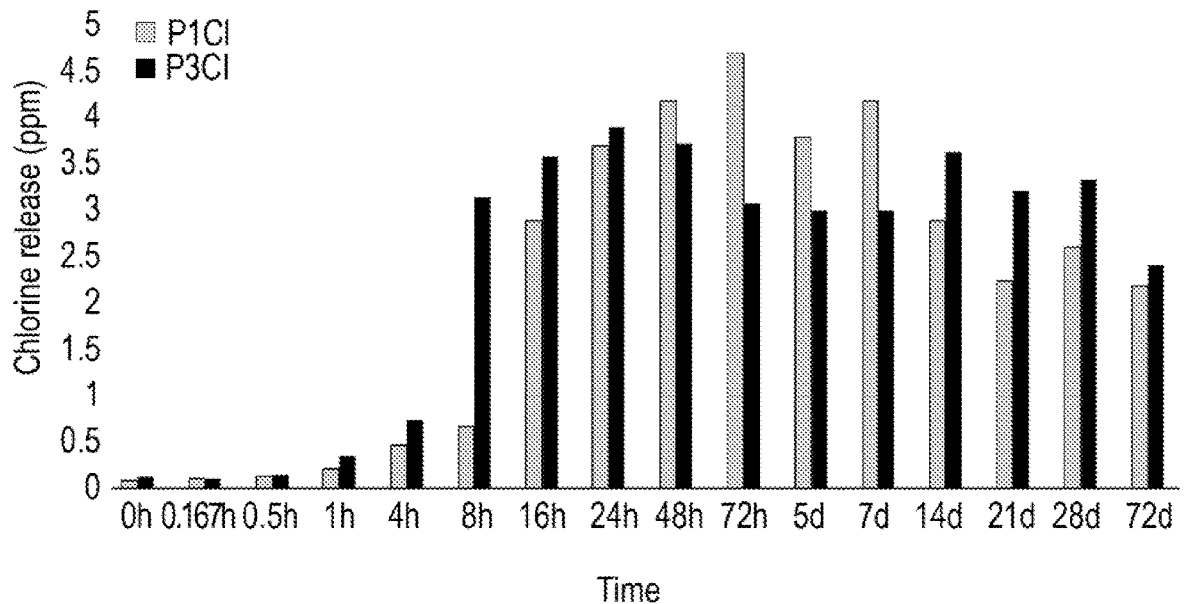
FIG. 12 shows total chlorine from P1Cl and P3Cl.
Figure 13:
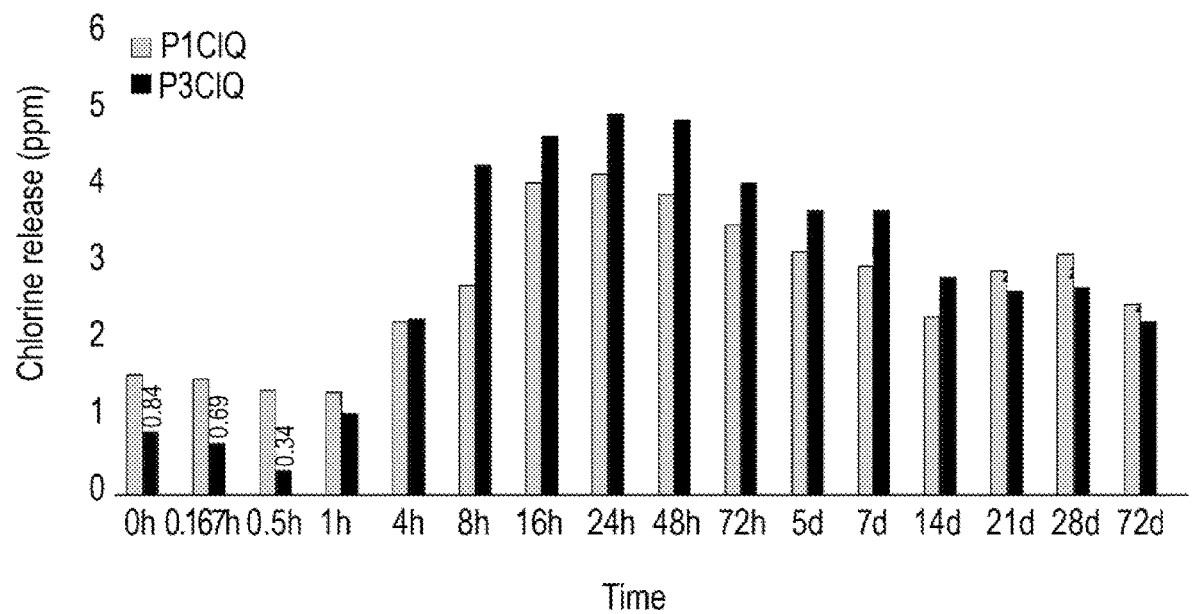
FIG. 13 shows total chlorine from P1ClQ and P3ClQ (non-purified polymers) (values of less than 1 ppm only are explicitly indicated).

The thermal analysis and stabilities of the different functionalized polymers were studied using DSC instrument. Depending on the functionalization, the stabilities of the polymers were varied over room temperature, exhibiting structure stability of the modified functional moieties (FIGS. 8-9).

Oxidative Chlorine Release

Figure 14:
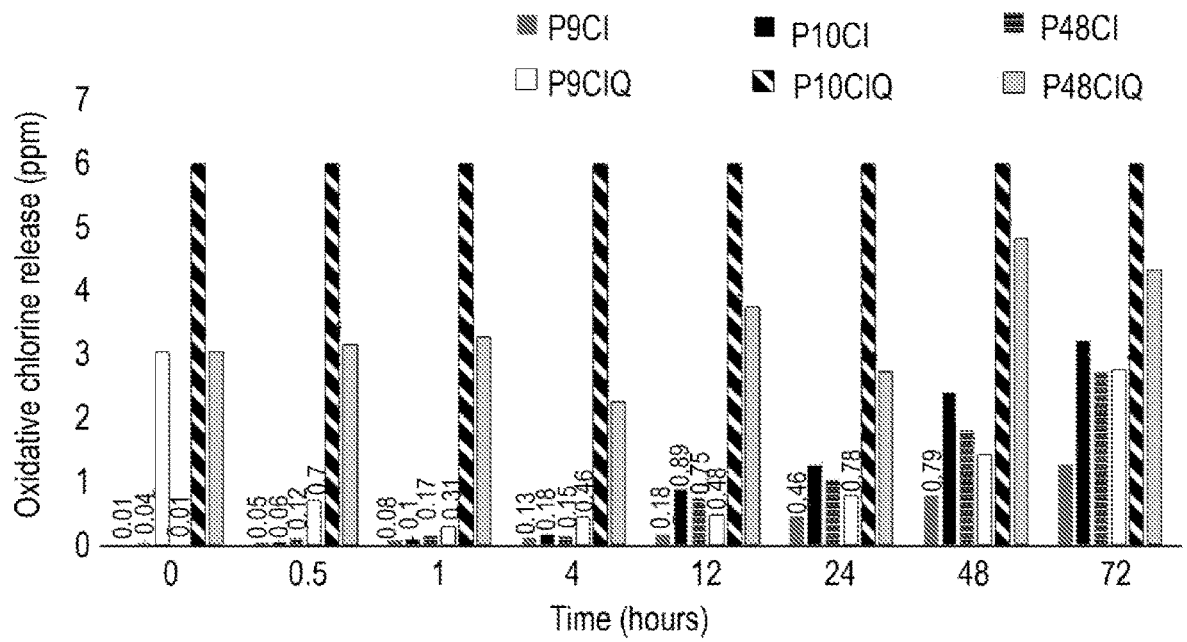
FIG. 14 shows free oxidative chlorine release from P9Cl, P10Cl, P48Cl, P9ClQ, P10ClQ, and P48ClQ (values of less than 1 ppm only are explicitly indicated).
Figure 15:
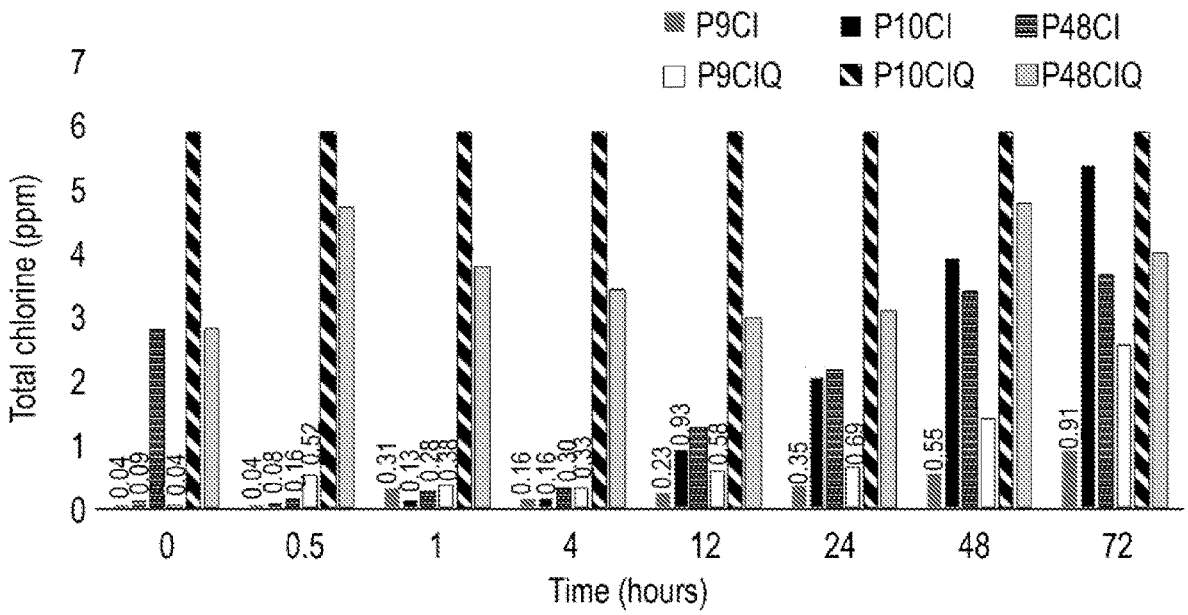
FIG. 15 shows total oxidative chlorine release from P9Cl, P10Cl, P48Cl, P9ClQ, P10ClQ, and P48ClQ (values of less than 1 ppm only are explicitly indicated).

The release of the oxidative chlorine was determined as described above. The chlorine release from the polymers and the total chlorine was followed up to 132 days, as shown in the FIGS. 10-13 for representative polymers showing the release for chlorinated and dual functionalized polymers vs. structural modifications in the cyclic repeating, exhibiting a tunable and continuous release. FIGS. 14-15 show the release of chlorine from the leading active polymers focusing on the first 72 hours.

Safety and Toxicity Assessment

The safety and toxicity of the developed polymers at varied concentrations (0.02-0.2 mg/ml) and contact time points (10 min up to 72 hours) against lungs cells (Beas-2b) and skin cells (HaCaT) were tested. HaCaT and Beas-2b cells were seeded at 10 k initial density and left to grow overnight. Treatment agents solubilized in PBS for 30 min before usage and different concentration were prepared at 4:1 Media to PBS ratio (v/v). The final polymer concentrations: 0.02 mg/ml, 0.1 mg/ml, and 0.2 mg/ml. Control cells were treated either with 3 mg/ml bleach (1/tenth household concentration) or left untreated. Media was aspirated and replaced with treatment solutions. Alamar blue was added at different time points: 10 min, 20 min, 90 min, 24 hours and 72 hours. Moreover, the cells incubated for another 4 hours at 37° C. before measurement (ex: 520-20 nm, em: 570-30 nm).

Figure 16:
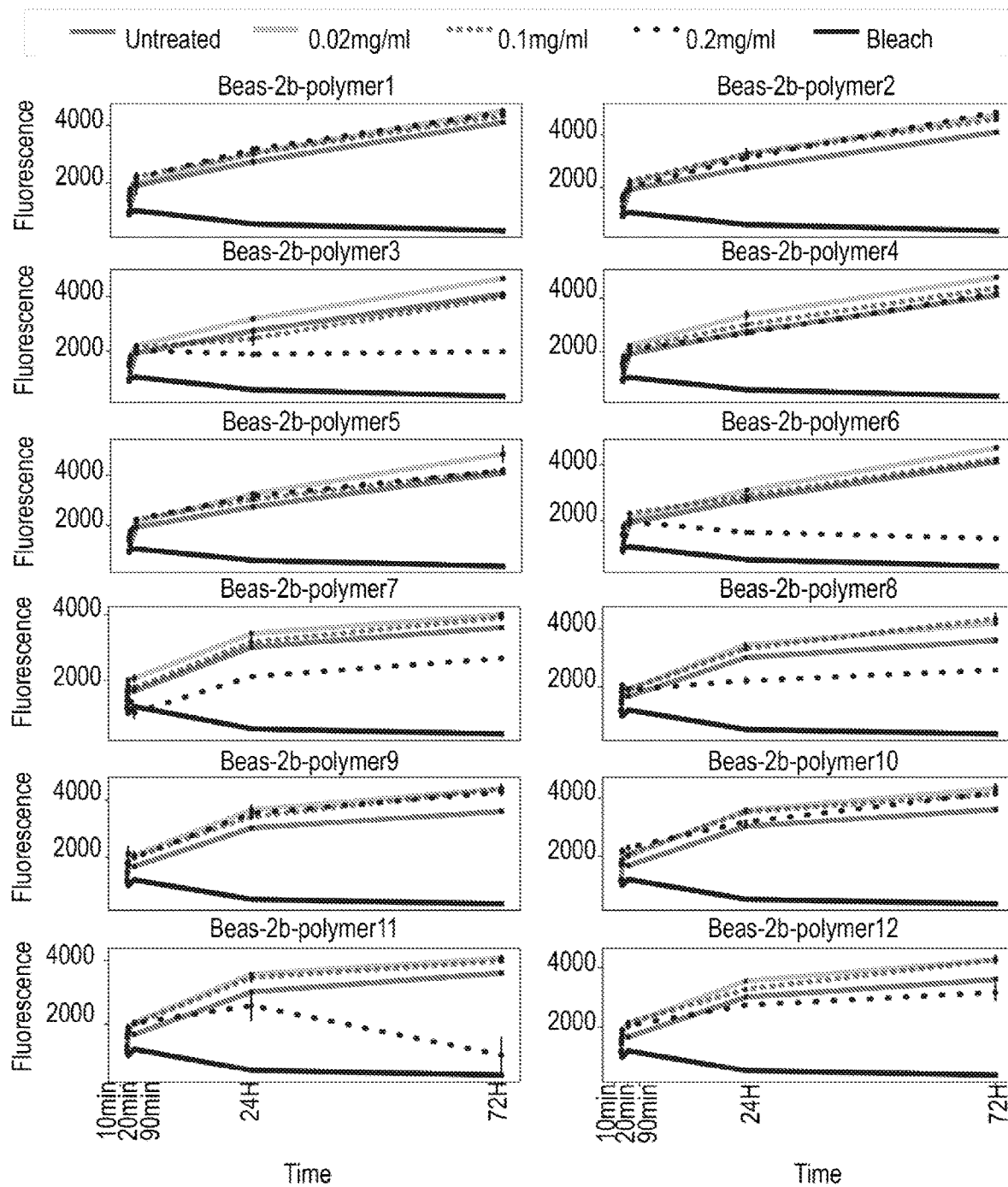
FIG. 16 shows the relative fluorescence intensity over time of Beas-2b cells following treatment with the different polymers indicating the cellular growth profiles. All measurements were performed after 4 hours of incubation with Alamar-Blue. Untreated cells and bleach-treated cells were used as controls.
Figure 17:
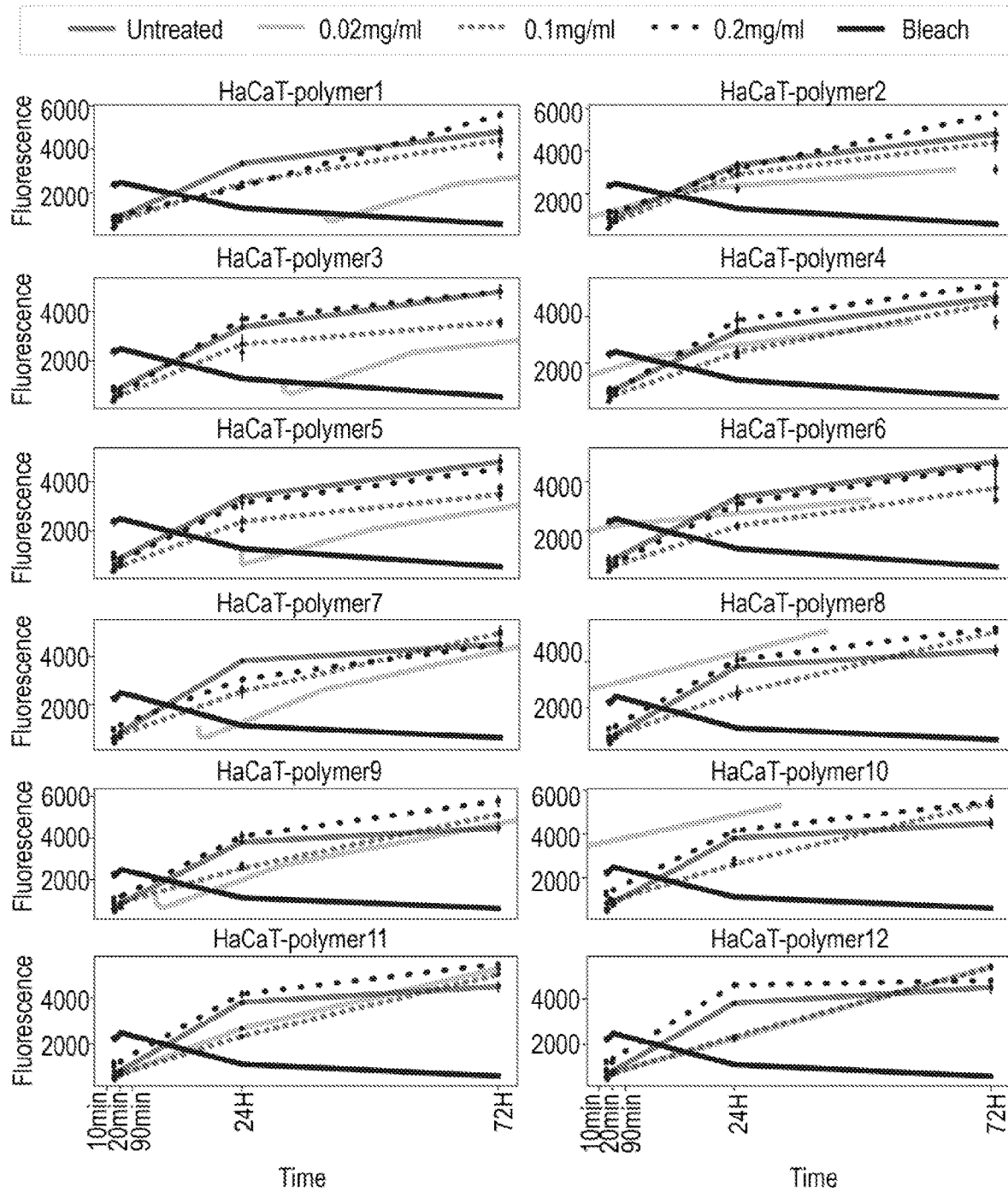
FIG. 17 shows the relative fluorescence intensity over time of HaCaT cells following treatment with the different polymers indicating the cellular growth profiles. All measurements were performed after 4 hours of incubation with Alamar-Blue. Untreated cells and bleach-treated cells were used as controls.
Figures 18, 19:
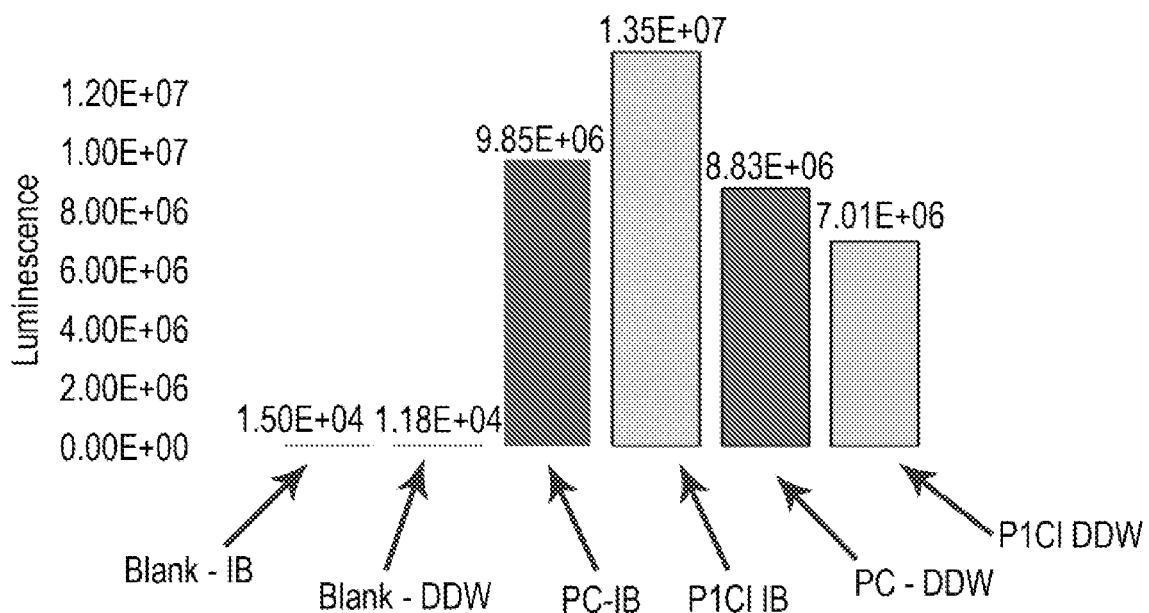
FIG. 18 shows the plate division by well type: blank, positive control, negative control and test wells (see Example 4).
FIG. 19 shows the medium effect of different DDW immuno buffer (IB) on the binding between SARS-CoV-2 spike and ACE2 in positive control (PC) and chlorinated hydantoin polymer P1Cl.
Figure 20:
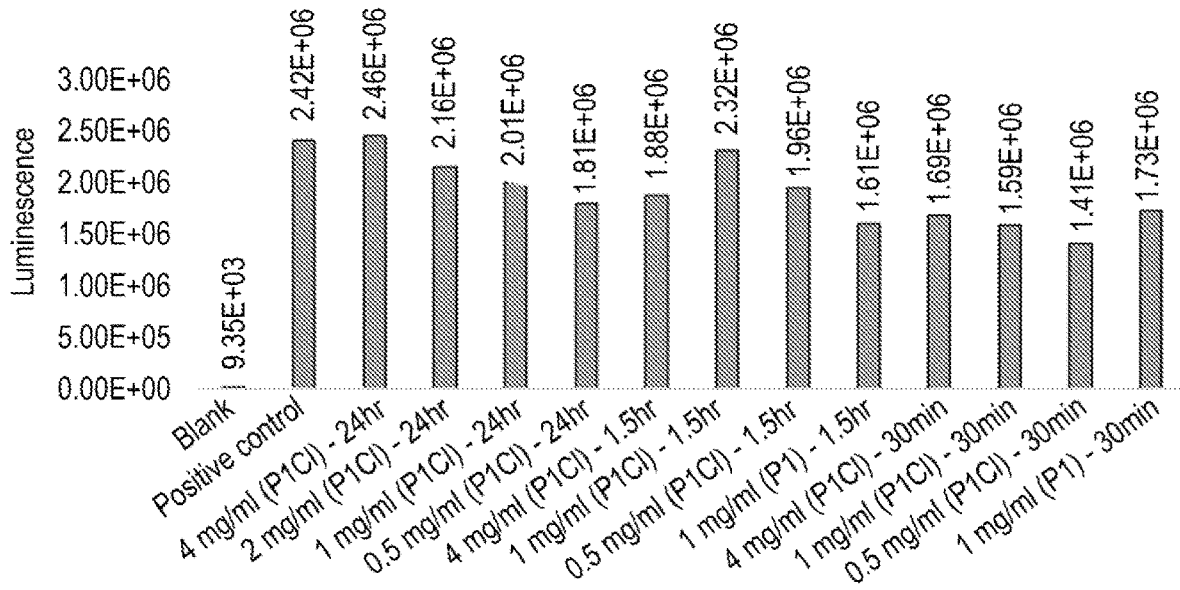
FIG. 20 shows the luminescence values of different P1 and P1Cl concentrations at different dissolution durations: 24, 1.5 and 0.5 hours.
Figure 21:
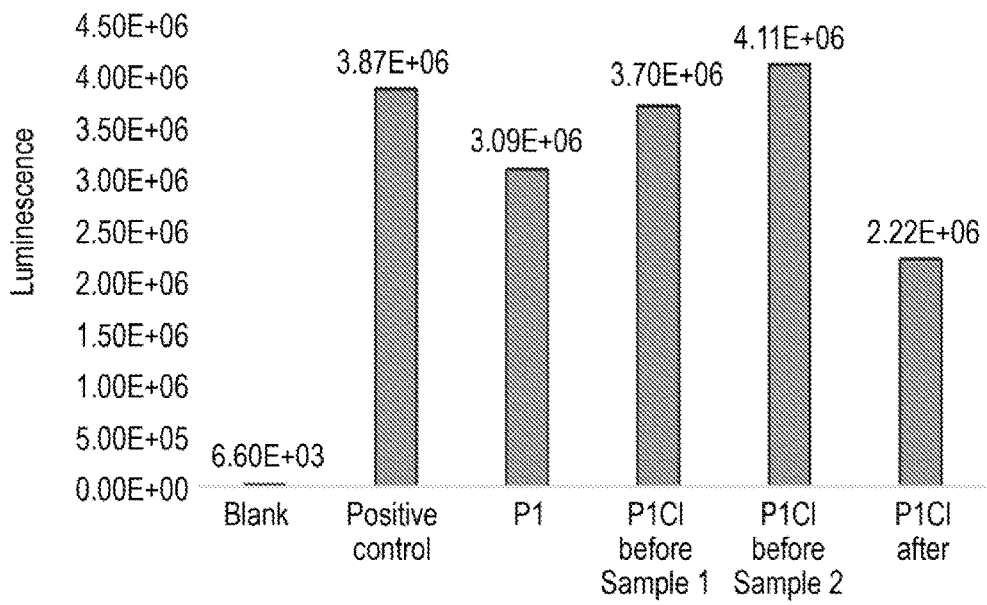
FIG. 21 shows the luminescence values of P1Cl before and after purification.

The results clearly indicate that while bleach was found to be very toxic and demolished both types of cells quickly starting of 90 min, the polymers tested showed no toxicity against the cells tested. Of note, against lungs cells only and at the highest tested concentration, polymers 3 and 6 exhibited limited cellular growth and polymer 11 showed cytotoxicity. These highest concentrations were excluded from further testing and considered as the upper limit of allowed concentration for these polymers (FIGS. 16-17).

Determination of the Oxidative Chlorine Content (% Cl+) Using Iodometric Titration The percentage (%) the oxidative chlorine content of P1Cl and P1ClQ was calculated and are given in Table 9.

TABLE 9

Percentage of quaternary ammonium quantification of P1Q and P1ClQ

| Sample | % Quat |
| --- | --- |
| P1Cl - Quaternized hydantoin polymer | 1.2 |
| P1ClQ - Chlorinated-quaternized hydantoin polymer | 1.42 |

Example 3. Synthesis of Copolymers and Homopolymers

Based on the biological activity shown for polymers P1-P50 (see Example 4), copolymers and homopolymers corresponding to the polymers found to be the most active were prepared, using the starting materials 5-aminouracil (SM9), 5-nitrouracil (SM10), thymine (SM18), 5-florouracil (SM19), 5-cholorouracil (SM20), lumazine (SM48), and xanthine (SM49). The synthesis of the allyl monomers based on the starting materials selected was performed as shown with respect to M1 in Scheme 1, and said allyl monomers were then utilized to prepare the N-chlorinated monomers (M9Cl, M10Cl, M18Cl, M19Cl, M20Cl, M48Cl, and M49Cl) following the procedure shown with respect to P1Cl in Scheme 3; and the quaternized monomers (M9Q, M10Q, M18Q, M19Q, M20Q, M48Q, and M49Q) following the procedure shown with respect to P1Q in Scheme 4.

Synthesis of copolymers (CP(MQ-M)) of quaternized monomers (MQ) and monomers (M). The prepared quaternized monomers and their respective monomers were dissolved in 10 mL of ethanol in parallel synthesizer tubes with a continuous stirring for 30 minutes at the rate of 600 rpm at 70° C. in order to completely dissolve the monomers in ethanol. After 30 minutes, 0.1 wt % of the catalyst AIBN was added to the tubes under nitrogen stream, and the reactions were continued for radical polymerizations for 24 h. Then, reactions cooled down to room temperature and the solvent was evaporated using high vacuum pump with a trapper. The obtained copolymers (CP(MQ-M)) were characterized using FT-IR (data not shown).

Synthesis of dual functionalized copolymers (CPQCl). The prepared copolymers were further N-chlorinated following the procedure described above. The dual functionalized copolymers prepared were purified by a dialysis membrane (cutoff MW 3500) for the removal of salts and the unreacted monomers, and were then characterized by FT-IR (data not shown). The structure of a representative such copolymer, consisting of quaternized and non-quaternized monomers of M9 (CP(M9Q-M9)), and of the dual functionalized copolymer (CO9QCl) is shown in Scheme 6.

Scheme 6. Chemical structure of CP(M9Q-M9) and the dual functionalized CP9QCl

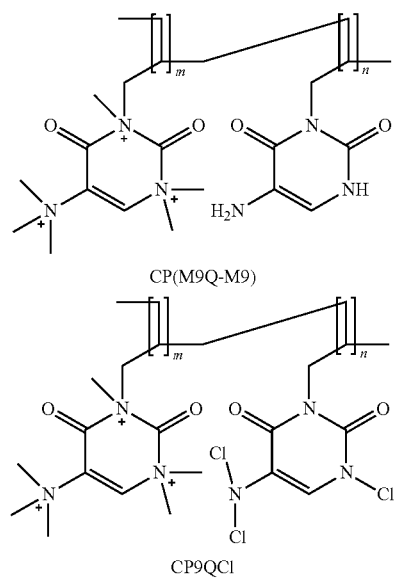

Synthesis of homopolymers. Synthesis of homopolymers of quaternized monomers (MQ) and chlorinated monomers (MCl): The synthesized quaternized monomers and their respective N-chlorinated allylic monomers were dissolved in 10 mL of ethanol in parallel synthesizer tubes with a continuous stirring for 30 minutes at the rate of 600 rpm at 70° C. in order to dissolve the monomer completely in ethanol. After 30 minutes, 0.1 wt % of the catalyst AIBN was added to the tubes under nitrogen stream and the reactions were continued for radical polymerizations for 24 h. Then, reactions cooled down to room temperature and the solvent was evaporated using high vacuum pump with a trapper. All the homopolymers (HPQ and HPCl) were purified by the dialysis membrane (cutoff MW 3500) for the removal of salts and the unreacted monomers, and then characterized by FT-IR (data not shown). The structures of representative such homopolymers, consisting of either quaternized or chlorinated monomers of M9 (HP9Q or HP9Cl), are shown in Scheme 7.

Scheme 7. Chemical structures of HP9Q or HP9Cl

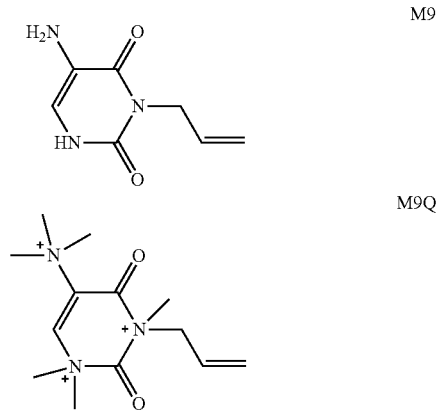

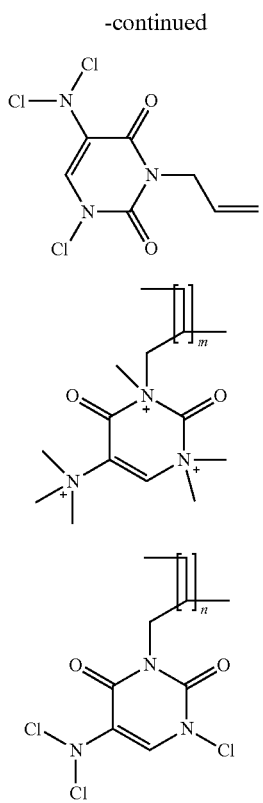

Example 4. Biological Assays and Antiviral Testing

In the present study, the efficacy and action mechanism of the polymers prepared in Example 1 have been evaluated, while narrowing down the variety of the polymers to the most efficient, ideal and superior disinfectants. The screening process has been composed of the following three testes: SARS-CoV-2 spike receptor binding domain (RBD):angiotensin converting enzyme 2 (ACE2) inhibitor screening assay kit; pseudovirus activity test; and clinically isolated SARS-CoV-2 test.

SARS-CoV-2 Spike RBD:ACE2 Inhibitor Screening Assay Kit (BPS Bioscience, Inc)

As known, the SARS-CoV-2 infection occurs through the binding of the spike RBD and the ACE2. This objective of the present assay was examining and quantifying the binding ability of the spike RBD with ACE2 soluble receptors, after treating the spike protein one of the developed polymers, and the test principle was set by measuring the bioluminescence of the tagged proteins.

Materials and methods. The present experiment was carried out in 96-well plates, which enable the screening of 28 different polymeric samples per one plate. The 28 polymeric samples are of 7 groups (7 different polymers) which are based on the starting polymer synthesized (P #), chlorinated polymer (P #Cl), quaternized polymer (P #Q), and chlorinated and quaternized polymer (P #ClQ). Each sample was examined in 3 wells (triplicates), and the blank and controls were examined in 4 well (quadruplicates). An example of the well allocation is presented in FIG. 18.

To briefly summarize the assay process and detection mechanism, the plate was coated with spike RBD. The polymers were added to interact with the spike coating. Then, a His-labeled ACE2 receptors were added to bind with the remaining spike in the plate. Anti-His horseradish peroxidase (HRP) antibodies were added, binding the His tag on the ACE2. Upon addition of the HRP substrate, the peroxidase enzyme acted and created a luminescent product that could be detected in luminescence reading in the plate reader.

Determining the effect of the medium. In this experiment, the compatibility of the medium in which the assay is made was tested. Since the assay involves several types of proteins that should be in certain environmental conditions, the solvent type has a great significance while operating the kit. We used 2 different methods to dissolve the polymer: DDW and Immuno buffer. The experiment's results are presented in FIG. 19. As high luminescence means high binding, one could see the Immuno buffer affects the binding between the spike RBD and the ACE2. The antiviral polymers should thus be dissolved in DDW.

Dissolution period and inhibitor concentrations. In this experiment, different concentration of chlorinated hydantoin at different dissolution times were tested, to find the optimal conditions for maximal activity. The polymers were tested in concentrations of 0.5, 1 and 1.5 mg/ml, wherein each concentration was dissolved in DDW for different duration (24, 1.5 and 0.5 hours) prior to their addition to the spike coated wells. The experiment's results are presented in FIG. 20. As we were looking for low luminescence, one could see that the best results were obtained for the 0.5 mg/ml concentration, for 30 minutes of dissolution. The conclusion that optimal concentration of the antiviral polymers is 0.5 mg/ml, and it should be dissolved 30 minutes prior to its addition was thus further applied to the rest of the experiments.

Salts removal and purification. As mentioned, the environmental conditions have a great significance for the assay. While preparing the polymers and modify them, some salts might get entrapped between the polymeric chains. These salts might affect the ACE2 receptor and harm them, therefore affecting the assay results. The purpose of this experiment was therefore to find out whether the salts have any effect on the kit. The sample were purified by using cellular membrane up to 3500 Da and compared with non-purified sample. The experiment's results are presented in FIG. 21. As low luminescence means higher activity of the materials, one could see that purified polymers give higher antiviral effect.

Protocol Finalization and Optimization

Samples preparation for assay. Prior to the test, all disinfectants went through a purification process to remove salts from the samples' solutions.

Plate coating with spike. The spike solution was diluted to the concentration of 1 μg/ml. afterwards, 50 μl of the solution was added to each well of the plate for an overnight incubation at 4° C. When the incubation ended, the spike solution was decanted, and the plate was washed 3 times with 100 μl Immuno-buffer (Tris-buffered solution). Afterwards, a blocking process was made by adding 100 μl of blocking buffer (PBS) to all wells, followed by 1 hr incubation in room temperature in slow shaking. Once incubation ended, the blocking buffer was decanted and the plate was washed 3 times with 100 μl Immuno-buffer again.

Inhibitor addition. There are 4 types of well: blank, positive control, negative control, and tested disinfectant (FIG. 18 and Table 10). 30 μl of DDW were added to blank and positive control wells. To the negative control and inhibitors test well, 20 μl of DDW were added. Then, 10 μl of 0.05% household bleach was added to the negative control wells. 30 minutes before their addition, the polymers were dissolved in DDW to reach 0.5 mg/ml concentration. Then, 10 µl of each disinfectant was added to the test wells. The plate was then incubated for 1.5 hr with slow shaking (90 rpm) in room temperature.

His-tagged ACE2 addition. An ACE2 His-tagged solution was diluted to 2.5 ng/µl by Immuno buffer. 20 µl of Immuno buffer were added to the blank wells, and 20 µl of the diluted His-tagged ACE2 were added to all the other wells (positive control, negative control, and test wells). The plate was then incubated for 1 hr with slow shaking (90 rpm) in room temperature. Once incubation ended, the His-tagged ACE2 solution was decanted and the plate was washed 3 times with 100 µl Immuno-buffer again. Afterwards, a blocking process was made by 10 min incubation of the plate with 100 µl of blocking buffer in all wells. the plate was then washed 3 times with 100 µl Immuno-buffer again.

HRP-labeled anti-His antibody addition. The antibodies were diluted by blocking buffer and 100 µl were added to all wells for 1 hr incubation in slow shaking (90 rpm). The solution was then decanted, and the plate was washed 3 times with 100 µl Immuno-buffer. Afterwards, a blocking process was made by 10 min incubation of the plate with 100 µl of blocking buffer in all wells. When incubation finished, the blocking buffer was decanted.

Luminescence assay by plate reader. Preparing ELISA ECL substrate solution. 100 µl of the ELISA solution were added to all well right before the plate was examined by the plate reader. The chemiluminescence was made with 1 sec integration time, and delay after plate movement was 100 milliseconds.

TABLE 10

Summary of the treatment of each well type

| | Spike RBD | Inhibitor addition | His-tagged ACE2 | HRP-labeled anti-His antibody |
|---|---|---|---|---|
| Blank | V | DDW | no | V |
| Positive control | V | DDW | V | V |
| Negative control | V | 0.05% bleach | V | V |
| Sample | V | inhibitor | V | V |

Assay results. The polymeric materials prepared were screened following the protocol described above and assayed. The luminescence value of each sample was measured and documented. Since positive control is the maximal binding (and therefore maximal luminescence), the activity of each sample was calculated as followed:

$$\% B = \left(1 - \frac{S}{P}\right) * 100\%,$$

where B is the percentage of the bioactivity of the tested polymer; S is the sample luminescence; and P is the luminescence of the positive control. In case the sample luminescence was higher than the positive control luminescence (causing the % bioactivity to be negative), the activity was set as 0%.

Activity per sample. The polymers were screened at 0.05% concentration (60 times lower than the allowed household bleach −3%). The activity values for the polymers P1-P50 are presented in Table 11. As can be shown, most of the 90-100% activity was exhibited in polymers that are dual functionalized, i.e., both chlorinated and quarternized. Twelve lead candidates with activity higher than 99% were found while the bleach at the same tested concentration was found to range from 95.89%-99.77%. Seven of them were found to exhibit an activity higher than 99.77%, among them five candidates showed even better anti-SARS-CoV-2 spikes activity.

TABLE 11

Anti-SARS-COV-2's spikes activity of P1-P50 with and without functionalization

| | Polymer modification | | | |
|---|---|---|---|---|
| Polymer# | P | PCl | PQ | PClQ |
| 1 | 0.02% | 0.00% | 40.23% | 81.24% |
| 2 | 0.00% | 0.00% | 27.78% | 77.51% |
| 3 | 0.00% | 0.00% | 0.00% | 0.00% |
| 4 | 0.00% | 0.00% | 0.00% | 10.55% |
| 5 | 18.31% | 17.01% | 11.77% | 26.65% |
| 6 | 0.00% | 0.00% | 0.00% | 13.44% |
| 7 | 21.55% | 11.02% | 6.95% | 35.54% |
| 8 | 0.00% | 0.00% | 97.31% | 17.90% |
| 9 | 0.00% | 0.00% | 6.46% | 99.49% |
| 10 | 0.00% | 0.00% | 0.00% | 99.46% |
| 11 | 0.00% | 0.00% | 1.27% | 18.31% |
| 12 | 0.00% | 0.00% | 67.30% | 18.18% |
| 13 | 0.00% | 0.00% | 53.73% | 82.67% |
| 14 | 40.60% | 36.45% | 80.41% | 52.38% |
| 15 | 0.00% | 16.08% | 19.91% | 96.65% |
| 16 | 0.00% | 2.98% | 17.49% | 39.91% |
| 17 | 0.00% | 2.17% | 14.17% | 59.08% |
| 18 | 28.06% | 28.43% | 99.77% | 99.84% |
| 19 | 0.00% | 12.97% | 95.19% | 99.89% |
| 20 | 3.09% | 32.12% | 99.53% | 99.84% |
| 21 | 14.81% | 28.71% | 48.59% | 39.88% |
| 22 | 11.92% | 0.00% | 8.44% | 55.00% |
| 23 | 0.44% | 0.00% | 0.00% | 51.19% |
| 24 | 12.07% | 4.02% | 0.30% | 6.92% |
| 25 | 10.02% | 6.12% | 5.52% | 8.0 |
| 26 | 5.73% | 5.05% | 0.00% | 0.32% |
| 27 | 7.43% | 2.91% | 1.15% | 2.54% |
| 28 | 26.81% | 25.70% | 16.35% | 23.45% |
| 29 | 45.06% | 0.00% | 0.00% | 76.42% |
| 30 | 87.54% | 6.32% | 24.89% | 35.35% |
| 31 | 15.78% | 5.63% | 90.93% | 75.68% |
| 32 | 10.21% | 9.72% | 57.48% | 49.60% |
| 33 | 9.01% | 17.80% | 13.21% | 98.18% |
| 34 | 6.48% | 7.37% | 0.65% | 78.21% |
| 35 | 17.09% | 20.30% | 44.14% | 45.68% |
| 36 | 0.00% | 0.00% | 65.16% | 99.76% |
| 37 | 2.35% | 1.61% | 87.61% | 79.46% |
| 38 | 1.18% | 0.00% | 91.22% | 8.60% |
| 39 | 0.00% | 0.00% | 0.00% | 0.00% |
| 40 | 5.88% | 0.00% | 0.29% | 12.36% |
| 41 | 9.42% | 12.47% | 6.68% | 21.08% |
| 42 | 23.66% | 28.62% | 94.37% | 62.55% |
| 43 | 0.00% | 0.00% | 84.88% | 85.64% |
| 44 | 0.00% | 0.00% | 71.67% | 54.82% |
| 45 | 11.29% | 0.91% | 4.98% | 2.54% |
| 46 | 0.00% | 0.02% | 0.00% | 13.97% |
| 47 | 0.00% | 0.00% | 0.61% | 99.13% |
| 48 | 10.38% | 9.07% | 51.98% | 99.83% |
| 49 | 24.79% | 26.48% | 99.65% | 99.76% |
| 50 | 2.86% | 6.27% | 81.34% | 89.20% |

Anti-SARS-CoV-2 activity discussion and conclusions. The highest anti-SAR-CoV-2's spikes activity values were observed are for P9ClQ (99.49%), P10ClQ (99.46%), P18ClQ (99.84%), P19ClQ (99.89%) and P20ClQ (99.84%), P36CLQ (99.76%), P48ClQ (99.83%), P49ClQ (99.76%) making them the leading candidates out of those tested.

When examining the non-modified polymers, one could see that they demonstrated a relatively low activity to no activity. However, some of the polymers presented a low yet detectable activity (P14, P18, P28, P29, P30), suggesting that some of the polymers themselves might have an anti-viral effect.

The chlorinated polymers didn't demonstrate a significant antiviral effect giving the low polymer concentration in this screening analysis and slow hypohalogen release in the time frame of the analysis. In contrast, some of the quaternized polymers reached very satisfying results: P8Q (97.31%), P18Q (99.77%), P19Q (95.19%), P20Q (99.53%), P29Q (99.65%). As the antiviral effect of quaternary amine (QA) depends on direct interaction, it might have a benefit in this test.

An important trend may be observed when examining the activity of each modification: in most of the cases (1, 2, 4, 6, 7, 9, 10, 11, 13, 15, 16, 17, 22, 23, 25, 29, 33, 34, 36, 40, 47, 48) the dual modifications gave a higher activity than the sum of activity for a single modification. These findings indicate that the double modification of chlorine and QA might cause a synergistic antiviral effect on the spike RBD. This points out the great potential of developing a dual functionalized antiviral polymers as long-term disinfectant.

Moreover, when comparing the leading candidates (in which each repeating unit is bifunctional) with the copolymers or homopolymers mixtures, a significant drop in the activity is very clearly shown, indicating the importance of dual functionality on the same repeating units for maximum anti-SARS-CoV-2 activity.

Pseudovirus SARS-CoV-2 Activity Test

In this assay, the infection of a cell line by the spike-pseudotyped HIV, which is an enveloped RNA virus and thus may be used to simulate the SARS-CoV-2, was examined.

Materials and methods. In the process of preparing the pseudovirus from the HIV virions, a plasmid of SARS-CoV-2 spike RBD is inserted to, which causes the HIV to express the spike protein as if they were SARS-CoV-2. It is important to clarify that the pseudovirus are replication incompetent, since they lack the replication genes of HIV: gag, pol and rev (Δgag, Δpol, Δrev). However, they are still able to make a single infection. Thus, they are very suitable for this test.

Another important feature of the pseudovirus is a luciferase reporter gene, which enables tracking the infection progress. Since the infection occurs through a spike-ACE2 interaction mediated process, this process could be measured be detecting the luciferase reporter activity.

The selected cell line must be expressing the ACE2 receptor. It could be either human embryonic kidney cell line (HEK) or human airway epithelial cell line (Calu3). The cells are transfected with ACE2 insert, to express the receptor. This will enable their infection by the spike RBD, presented on the surface of the pseudovirus.

Figure 22A:
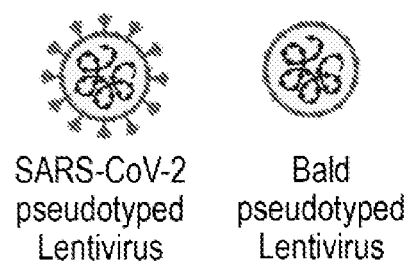
FIGS. 22A-22B show an illustration of the spike (SARS-CoV-2) pseudotyped lentivirus and the bald pseudotyped lentivirus (22A); and the observed luminescence of HEK cell line with and without ACE2 receptors, in the presence of bald pseudo-virus and spike pseudo-virus at different concentrations (22B).
Figure 22B:
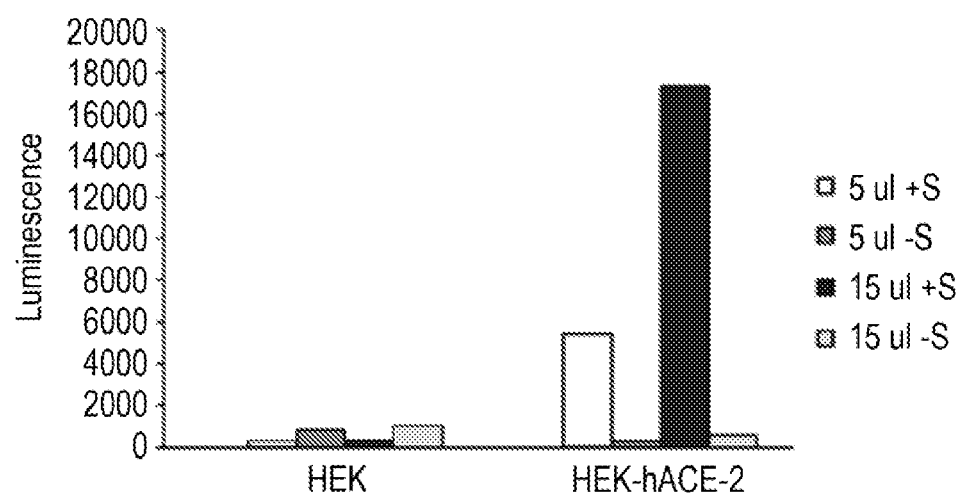

As the pseudovirus interacts with the cells, they could infect them by binding the ACE2 receptors. The luciferase reporter gene allows detecting the infection levels. As the antiviral effect increases, a decrease in the luminescence is expected. Leading synthesized materials from level 1 were further evaluated for activity in this model. The observed luminescence of HEK cell line human embryonic kidney cells (HEK-293T) expressing human ACE2 (HEK-293T-hACE2), with and without ACE2 receptors, in the presence of bald pseudo-virus (without spikes) and spike pseudo-virus at different concentration, is shown in FIG. 22B.

The cytotoxicity assessment of the prepared polymers was performed as per the following procedure. Day 1: 30,000 293T-hACE2 cells were seeded in a 96 well plate. Three wells for each condition. Media volume: 100 µl DMEM. Day 2: Media was removed, and cells were incubated with the tested polymeric materials (30 µl of the desired concentration dilution, 1 mg/ml, 0.5 mg/ml, 0.1 mg/ml, 0.05 mg/ml and 0.01 mg/ml resulting in ranges of 0.1%-0.001% w/v). Day 3: 70 µl of DMEM media was added to each well to increase cell viability. Day 4: Cells were harvested from the wells. Triplicates were combined into one vial. Cells were mixed with Trypan blue (which stain dead cell only, Sigma). The live cells were counted in a light microscope. Each well was counted by two individuals to reduce counting errors.

Figure 23:
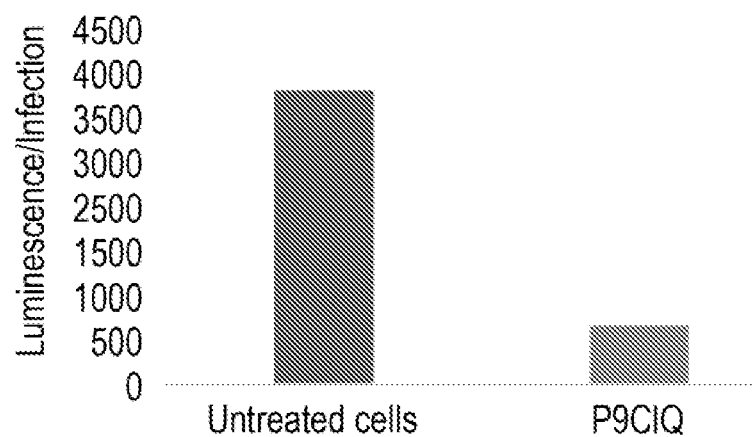
FIG. 23 shows the antiviral activity of P9ClQ, at a concentration of 0.1 mg/ml (0.01% w/v), against SARS-CoV-2 pseudovirus using HEK-293T-hACE2 cells. The polymer deactivated the infection capability of the pseudovirus by about 81%.

A representative example is shown in Table 12, illustrating a comparison study of the cytotoxicity of P9ClQ vs. bleach. While the bleach was found to be highly cytotoxic at all concentrations resulting in literally "ZERO" cells viability and 100% cells death, P9ClQ showed a lower cytotoxicity in correlation to concentration up to no toxicity at all at concentration of 0.1 mg/ml (0.01% w/v). Based on these results, the antiviral activity of said polymer, at the same concentration (0.1 mg/ml, i.e., 0.01% w/v), was tested, and is shown in FIG. 23, indicating that the polymer deactivated the infection capability of the pseudovirus by about 81%.

TABLE 12

| Polymers vs. household bleach cytotoxicity against HEK-293T cells | | | |
|---|---|---|---|
| Substance | Untreated cells | P9ClQ polymer | Household bleach |
| UT | 413334 | | |
| 1 mg/ml | | 6667 | 0 |
| 0.5 mg/ml | | 53333 | 0 |
| 0.1 mg/ml | | 433333 | 0 |

Figure 24:
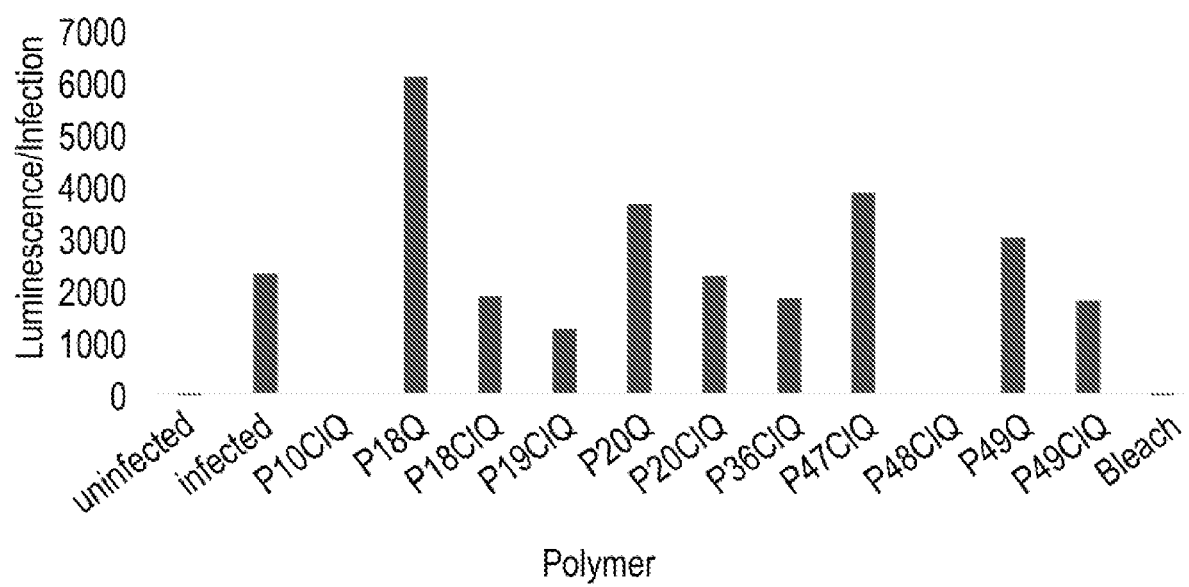
FIG. 24 shows the antiviral activity of P10ClQ, P18Q, P18ClQ, P19ClQ, P20Q, P20ClQ, P36ClQ, P47ClQ, P48ClQ, P49Q, and P49ClQ, at a concentration of 0.1 mg/ml (0.01% w/v) with 1 hour contact, against SARS-CoV-2 pseudovirus, using HEK-293T-hACE2 cells. Bleach was used as a negative control.
Figure 25:
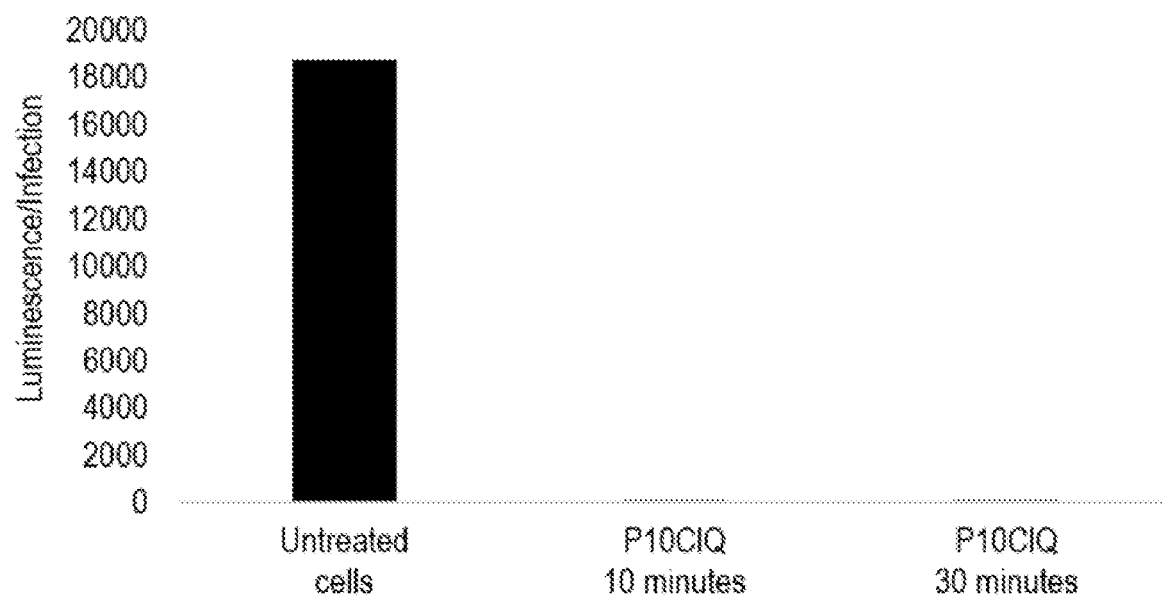
FIG. 25 shows the antiviral activity of P10ClQ, at a concentration of 0.1 mg/ml (0.01% w/v), against SARS-CoV-2 pseudovirus (using HEK-293T-hACE2 cells). P10ClQ deactivated the infection capability of the pseudovirus by 99%.
Figure 26:
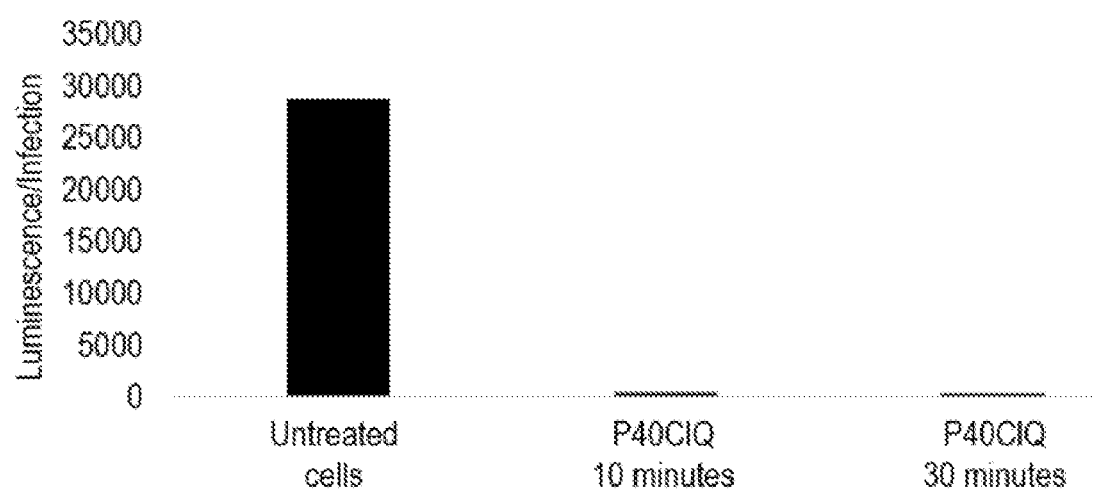
FIG. 26 shows the antiviral activity of P48ClQ, at a concentration of 0.1 mg/ml (0.01% w/v), against SARS-CoV-2 pseudovirus (using HEK-293T-hACE2 cells). P48ClQ deactivated the infection capability of the pseudovirus by 99.98%.

In a similar way, the cytotoxicity of the twelve leading candidates from the Anti-SARS-CoV-2 spikes test, at a concentration of 0.1 mg/ml, was tested, and none of them was found to be toxic (data not shown). The antiviral activity of all those polymers, at said concentration with 1 hour contact against SARS-CoV-2 pseudovirus using HEK-293T-hACE2 is shown in FIG. 24. As shown, the various polymers deactivated the infection capability of the pseudovirus at various levels, while the superior candidates were P9ClQ, P10ClQ and P48ClQ. After challenging for activity test in 10 mins, polymers P10ClQ and P48ClQ were found to induce 3 log reduction in 10 min and 99.99% deactivation of infection capability of SARS-CoV-2 in the pseudovirus model (FIGS. 25-26).

Surface Coating and Longevity Test

Figure 27:
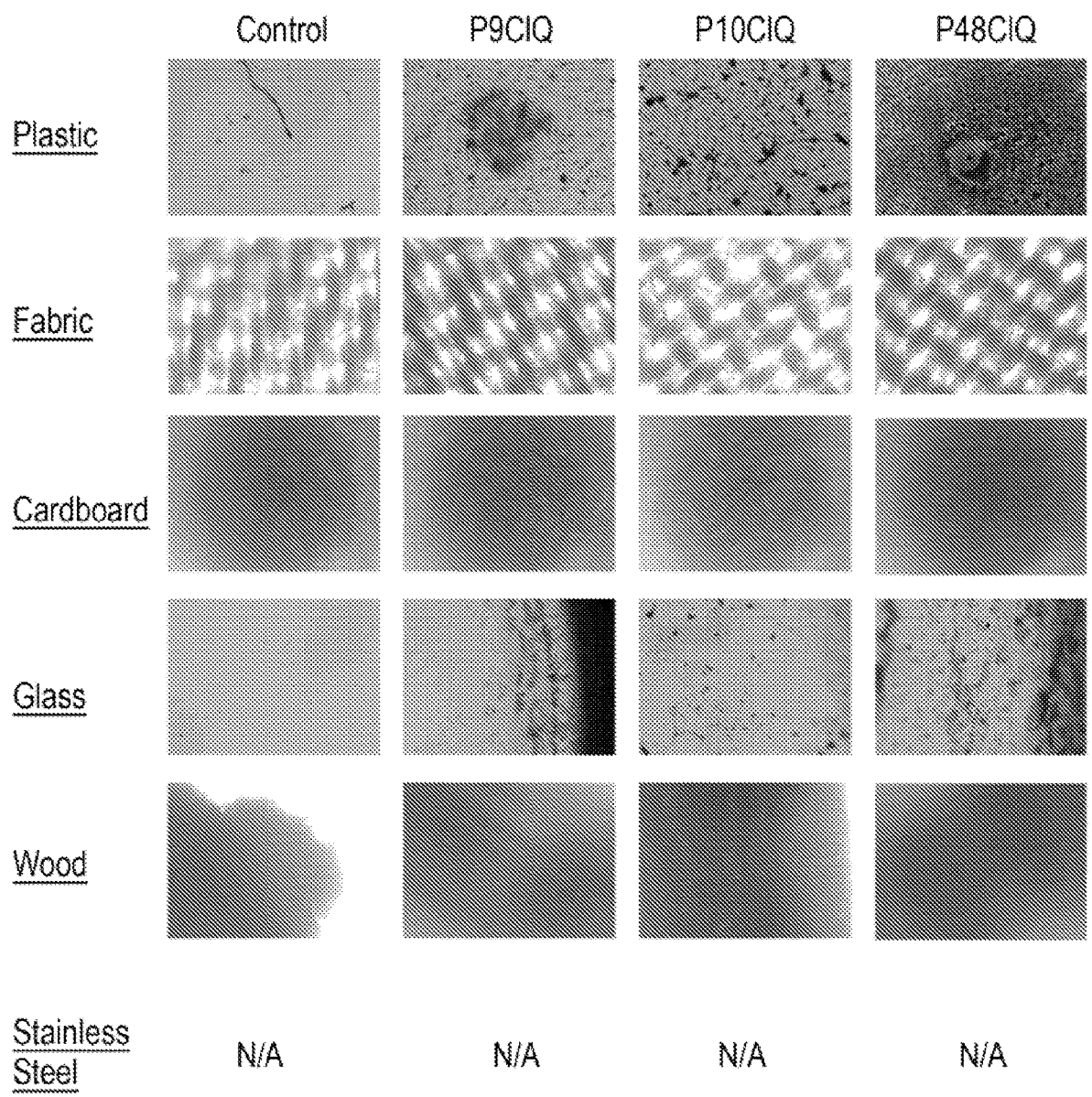
FIG. 27 shows microscopic evaluation of different surfaces coated with P9ClQ, P10ClQ or P48ClQ, a week after coating.
Figure 28:
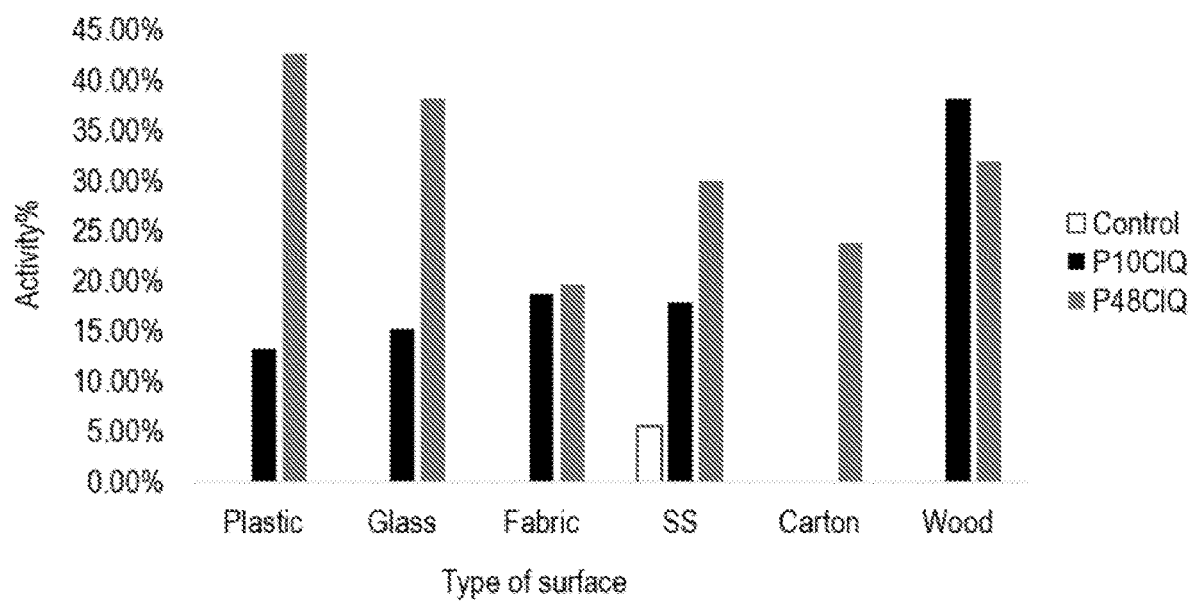
FIG. 28 shows the anti-SARS-CoV-2 spikes activity of P10ClQ and P48ClQ on different surfaces a week after coating in ventilated open space.

The superior polymers identified were tested on the following surfaces: plastic, glass, fabric, stainless steel, carton, and wood at harsh condition for 1 week open to air at day light at ventilated room. The protocol was similar to the described luminescence assay, with small changes: surfaces were coated with 100 µl of the polymer at very low concentration of 0.05% (60 times lower than the household bleach) by simple drop casting. A week post-coating, the coatings were microscopically imaged (FIG. 27). Then, 100 µl of DDW were added to each one of the surfaces, and the coatings were then retrieved and examined for activity against the spikes (FIG. 28). Coatings still showed anti-SARS-CoV-2 spikes activity at the varied surfaces. A higher concentration solution is expected to exhibit significant impact and for an elongated time.

Clinically Isolated SARS-Cov-2 Test

In this study, the superior polymers identified were tested against SARS-CoV-2, clinically isolated from a patient in an Israeli hospital, using Vero-E6 non-human primate cells.

Protocol: 1. 20,000 Vero-E6 cells were incubated in a well (using a 96-wells plate) in a growth medium supplemented with 10% serum at 37° C. for overnight. 2. Polymers were suspended in PBS to final concentration of 2 mg/ml 30 minutes prior to the experiment, and 1 mg/ml and 0.2 mg/ml stock solutions were further prepared. 3. From each solution, 50 μl were added to 50 μl growth medium (in a cytotoxicity test) or 50 μl viral dilution. Mixtures were incubated at room temperature for 60 minutes. 4. Mixtures were diluted 1:1000 in growth medium supplemented with 2% serum. 5. Cell's growth media was replaced with 50 μl of the diluted solutions above (Item 4) and incubated at humidified incubator for 60 minutes at 33° C. 6. Cells were washed with medium and fresh growth media supplemented with 2% serum was placed on the cells. 7. Total RNA was extracted from the growth medium three days post infection for qPCR analysis. Viral copies were calculated from qPCR Ct values.

Figure 29:
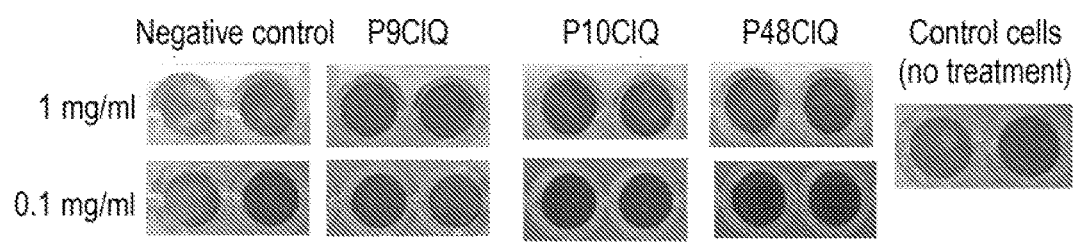
FIG. 29 shows cytotoxicity analysis of P9ClQ, P10ClQ and P48ClQ against clinically isolated SARS-CoV-2. Cells were stained with Cristal Violet (1%) solution. While bleach (negative control) showed significant cytotoxicity, the polymers showed no toxicity.

Cytotoxicity test: growth medium was discarded and cells were stained with Cristal Violet (1%) solution. While bleach showed significant toxicity to cells, the superior polymers showed no toxicity (FIG. 29).

TABLE 13

Log reduction in viral copies as compared to untreated SARS-COV-2

|  | mg/ml | Log difference |
|---|---|---|
| Negative control | 1 | 3.992846 |
|  | 0.1 | 0.490114 |
| P48ClQ | 1 | 0.420314 |
|  | 0.1 | 0.231967 |
| P10ClQ | 1 | 3.915367 |
|  | 0.1 | 0.201823 |
| P9ClQ | 1 | 5.210241 |
|  | 0.1 | 0.423778 |

Figure 30:
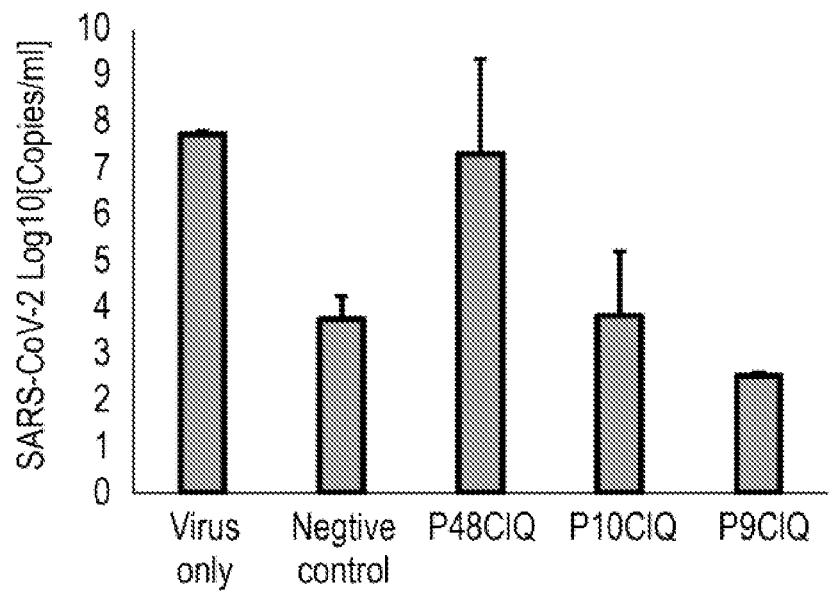
FIG. 30 shows the antiviral activity of P9ClQ, P10ClQ and P48ClQ against a clinically isolated SARS-CoV-2, using Vero-E6 non-human primate cells. Graph shows the average viral log 10 copies/ml that were detected by qPCR in 1 mg/ml. P9ClQ was found to be the most active polymer and was superior to bleach (negative control). The polymers were used at a concentration of 1 mg/ml, except for P48ClQ (where a solubility issue was reported in the test resulting in huge y-bars).
Figure 31:
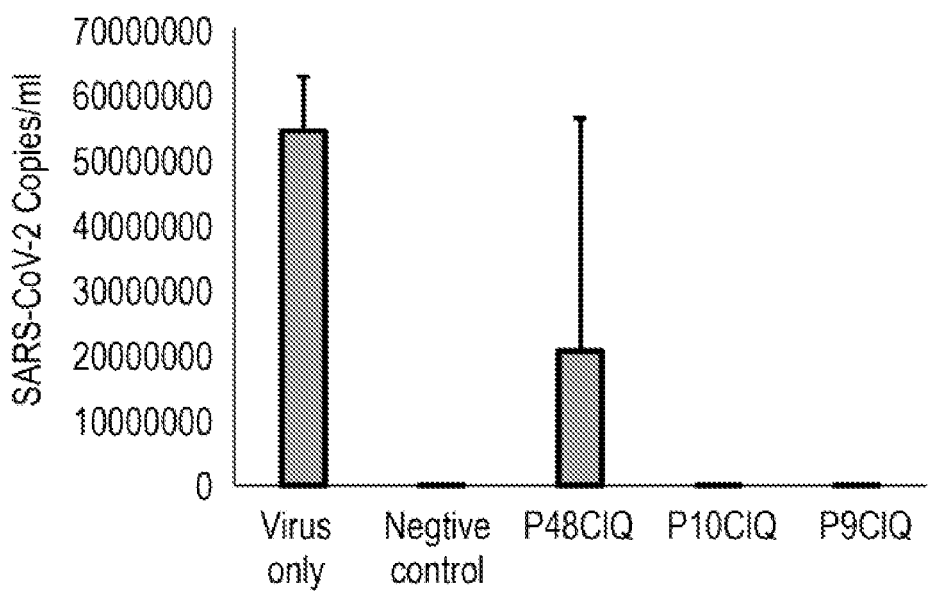
FIG. 31 shows the antiviral activity of P9ClQ, P10ClQ and P48ClQ against a clinically isolated SARS-CoV-2, using Vero-E6 non-human primate cells. The polymers were used at a concentration of 1 mg/ml, except for P48ClQ (where a solubility issue was reported in the test resulting in huge y-bars).

Antiviral activity test: A significant antiviral effect was detected at 1 mg/ml in most of the tested polymers. 4-5 Log reduction in viral copies as compared to untreated SARS-CoV-2 where found (Table 13). While P10ClQ was found comparable to bleach in its rapid efficiency in demolishing the clinically isolated SARS-CoV-2, polymer P9ClQ was found to be the most active polymer showing a bigger log reduction compared to bleach (FIGS. 30-31).

Example 5. The Antiviral Activity of the Copolymers and Homopolymer Mixtures

Figure 32:
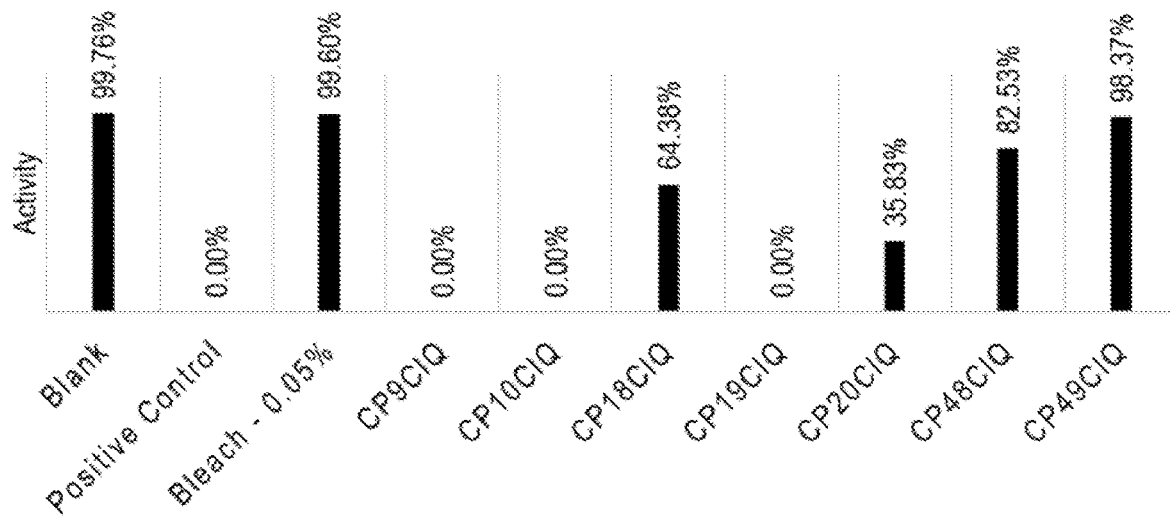
FIG. 32 shows the antiviral activities of copolymers CP9ClQ, CP10ClQ, CP18ClQ, CP19ClQ, CP20ClQ, CP48ClQ, and CP49ClQ against SARS-CoV-2's spikes, specifically the impact on the binding of the spike RBD and the ACE2.
Figure 33:
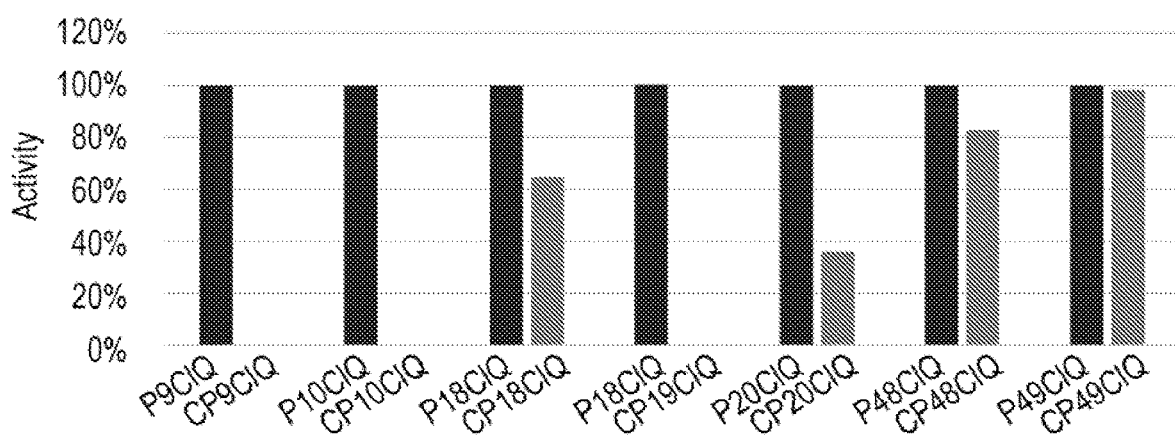
FIG. 33 shows the antiviral activities of copolymers CP9ClQ, CP10ClQ, CP18ClQ, CP19ClQ, CP20ClQ, CP48ClQ, and CP49ClQ against SARS-CoV-2's spikes, compared to those of the corresponding dual functional polymers P9ClQ, P10ClQ, P18ClQ, P19ClQ, P20ClQ, P48ClQ, and P49ClQ.

The copolymers prepared in Example 3 were tested against the SARS-CoV-2 spikes following the protocol described above. The activity values for the copolymers prepared are presented in Table 14 and show a significant drop in the activity compared to that of the corresponding polymers, suggesting the importance of the dual functionality on the same repeating units for maximum anti-SARS-CoV-2 activity (FIGS. 32-33). As clearly shown, most of the copolymers do not maintain the exceptionally high activity shown by the corresponding polymers, with the exception of CP49 and CP48 that still demonstrate high satisfying antiviral activity.

Figure 34:
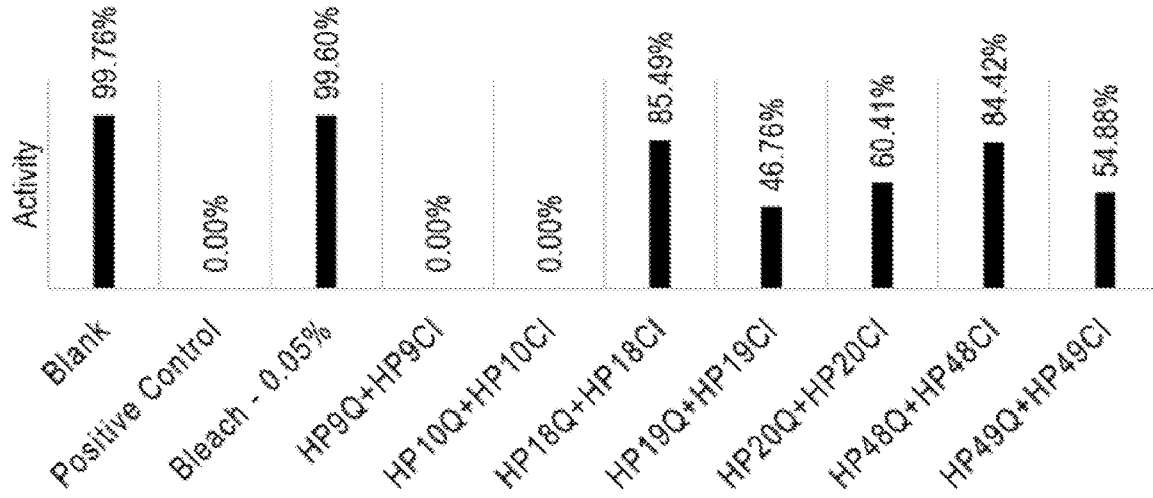
FIG. 34 shows the antiviral activities of homopolymer mixtures HP9Q+HP9Cl, HP10Q+HP10Cl, HP18Q+HP18Cl, HP19Q+HP19Cl, HP20Q+HP20Cl, HP48Q+HP48Cl, and HP49Q+HP49Cl against SARS-CoV-2's spikes, specifically the impact on the binding of the spike RBD and the ACE2.
Figure 35:
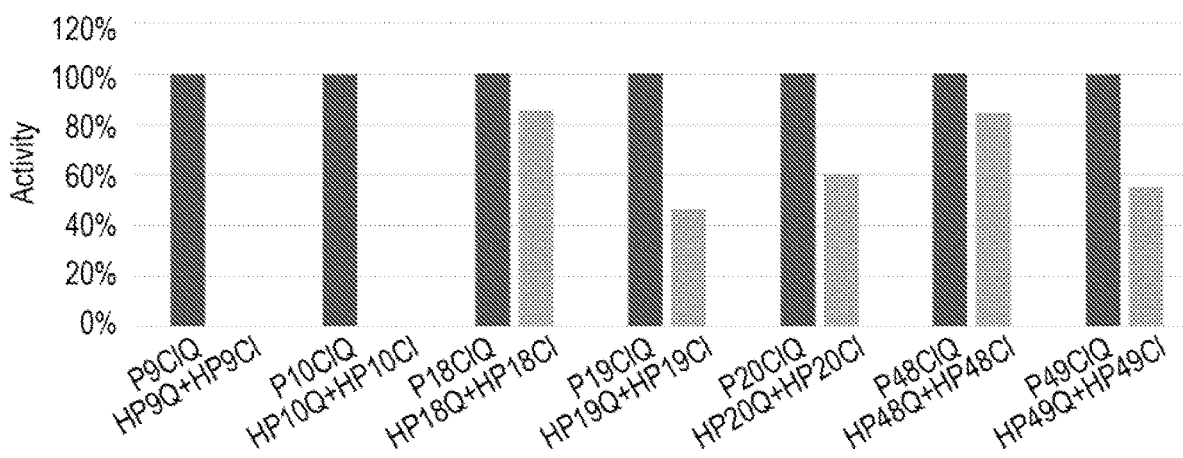
FIG. 35 shows the antiviral activities of homopolymer mixtures HP9Q+HP9Cl, HP10Q+HP10Cl, HP18Q+HP18Cl, HP19Q+HP19Cl, HP20Q+HP20Cl, HP48Q+HP48Cl, and HP49Q+HP49Cl against SARS-CoV-2's spikes, compared to those of the corresponding dual functional polymers P9ClQ, P10ClQ, P18ClQ, P19ClQ, P20ClQ, P48ClQ, and P49ClQ.

The homopolymers prepared in Example 3 were tested, as mixtures, against the SARS-CoV-2 spikes following the protocol described above. The activity values for the homopolymer mixtures are presented in Table 15 and show a significant drop in the activity compared to that of the corresponding polymers, suggesting the importance of dual functionality on the same repeating units for maximum anti-SARS-CoV-2 activity (FIGS. 34-35). As clearly shown, most of the homopolymer mixtures do not maintain the exceptionally high activity shown by the corresponding polymers, with the exception of the homopolymer mixtures of P18 and P48 that still demonstrate high satisfying antiviral activity.

TABLE 14

The anti-SARS-COV-2's spikes activity of copolymer CP9ClQ, CP10ClQ, CP18ClQ, CP19ClQ, CP20ClQ, CP48ClQ compared to that of the corresponding polymers P9ClQ, P10ClQ, P18ClQ, P19ClQ, P20ClQ, P48ClQ, and P49ClQ

| Polymer# | Polymer modification | | | | Copolymer |
|---|---|---|---|---|---|
|  | P | PCl | PQ | PClQ |  |
| 9 | 0.00% | 0.00% | 6.46% | 99.49% | 0.00% |
| 10 | 0.00% | 0.00% | 0.00% | 99.46% | 0.00% |
| 18 | 28.06% | 28.43% | 99.77% | 99.84% | 64.38% |
| 19 | 0.00% | 12.97% | 95.19% | 99.89% | 0.00% |
| 20 | 3.09% | 32.12% | 99.53% | 99.84% | 35.83% |
| 48 | 10.38% | 9.07% | 51.98% | 99.83% | 82.53% |
| 49 | 24.79% | 26.48% | 99.65% | 99.76% | 98.37% |

TABLE 15

The anti-SARS-COV-2's spikes activity of certain homopolymer mixtures compared to that of their corresponding dual functionalized polymers

| Polymer# | Polymer modification | | | | Homopolymer mixture |
|---|---|---|---|---|---|
|  | P | PCl | PQ | PClQ |  |
| 9 | 0.00% | 0.00% | 6.46% | 99.49% | 0.00% |
| 10 | 0.00% | 0.00% | 0.00% | 99.46% | 0.00% |
| 18 | 28.06% | 28.43% | 99.77% | 99.84% | 85.49% |
| 19 | 0.00% | 12.97% | 95.19% | 99.89% | 46.76% |
| 20 | 3.09% | 32.12% | 99.53% | 99.84% | 60.41% |
| 48 | 10.38% | 9.07% | 51.98% | 99.83% | 84.42% |
| 49 | 24.79% | 26.48% | 99.65% | 99.76% | 54.88% |

TABLE 1

Structures of starting materials SM1-SM50

SM1

SM2

SM3

SM4

TABLE 1-continued

Structures of starting materials SM1-SM50

SM5: 5-(4-hydroxyphenyl)imidazolidine-2,4-dione

SM6: (2,5-dioxoimidazolidin-4-yl)urea

SM7: uracil

SM8: 2-thiouracil

SM9: 5-aminouracil

SM10: 5-nitrouracil

SM11: orotic acid

SM12: parabanic acid (imidazolidine-2,4,5-trione)

SM13: 5-phenylimidazolidine-2,4-dione

SM14: guanine

SM15: bis-hydroxy linked barbituric acid dimer

SM16: methylenebis-urea linked bis-hydantoin with hydroxymethyl groups

SM17: 1,2,4-triazolidine-3,5-dione (urazole)

SM18: thymine

SM19: 5-fluorouracil

SM20: 5-chlorouracil

SM21: dihydrouracil

TABLE 1-continued

Structures of starting materials SM1-SM50

| Structure | ID |
|---|---|
| (quinazoline-2,4-dione) | SM22 |
| (5-amino-2,3-dihydrophthalazine-1,4-dione) | SM23 |
| (pyrimidine-2,4,5,6-tetraone) | SM24 |
| (murexide / ammonium purpurate) | SM25 |
| (uric acid) | SM26 |
| (sodium dichloroisocyanurate) | SM27 |
| (cyanuric acid / 1,3,5-triazinane-2,4,6-trione) | SM28 |
| (2-thiohydantoin) | SM29 |
| (5-methyl-5-phenylhydantoin) | SM30 |
| (5-ethyl-5-methylhydantoin) | SM31 |
| (5-(4-chlorobutyl)hydantoin) | SM32 |
| (5-propylhydantoin) | SM33 |
| (1-aminohydantoin) | SM34 |
| (hydantoin-5-acetic acid) | SM35 |
| (5,6-dimethyluracil) | SM36 |
| (5-ethyluracil) | SM37 |
| (5-bromouracil) | SM38 |

TABLE 1-continued

Structures of starting materials SM1-SM50

| | |
|---|---|
| SM39 | SM47 |
| SM40 | SM48 |
| SM41 | SM49 |
| SM42 | SM50 |
| SM43 | |
| SM44 | |
| SM45 | |
| SM46 | |

TABLE 2

Structures of monomers M1-M50

M1

M2

M3

TABLE 2-continued
Structures of monomers M1-M50
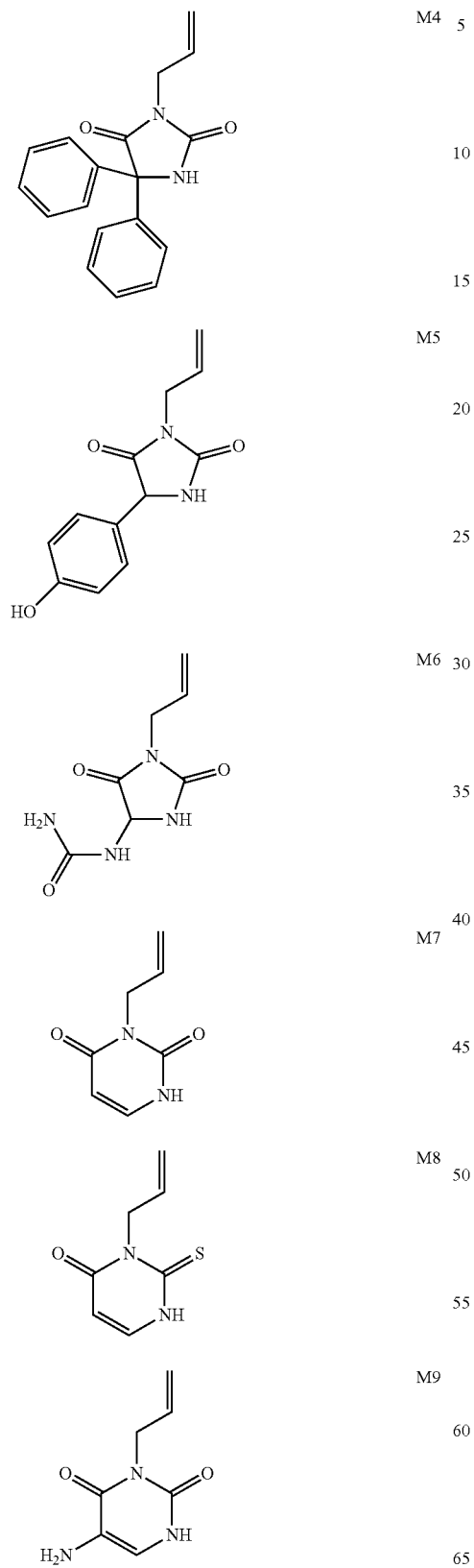
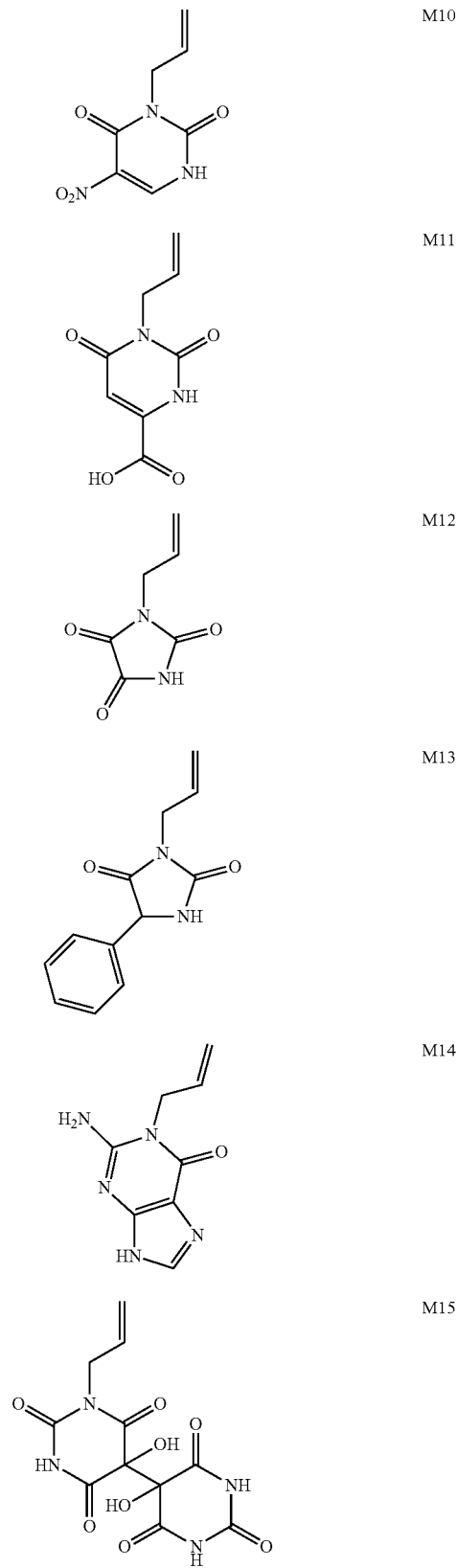

TABLE 2-continued
Structures of monomers M1-M50
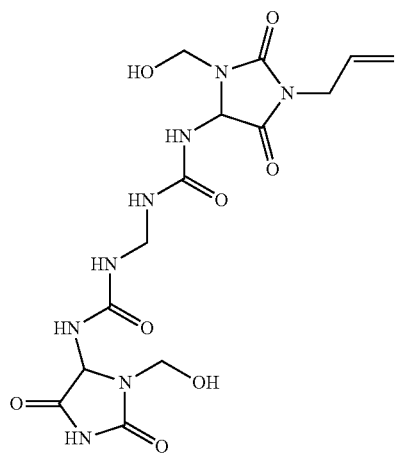 [SMILES: C=CCN1C(=O)C(NC(=O)NCNC(=O)NC2C(=O)NC(=O)N2CO)N(CO)C1=O]
M16
M22
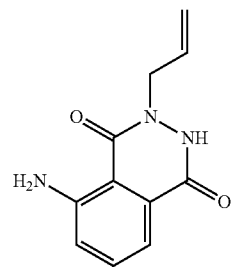
M23
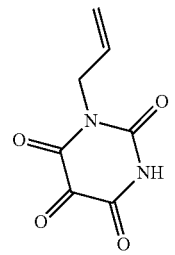
M24
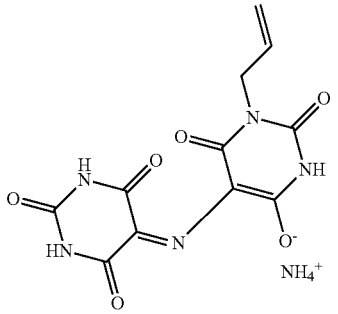 [SMILES: C=CCn1c(=O)[nH]c([O-])c(N=C2C(=O)NC(=O)NC2=O)c1=O ; [NH4+]]
M25
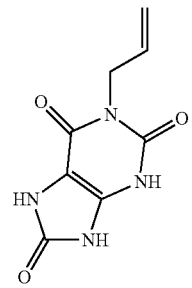
M26

TABLE 2-continued
Structures of monomers M1-M50
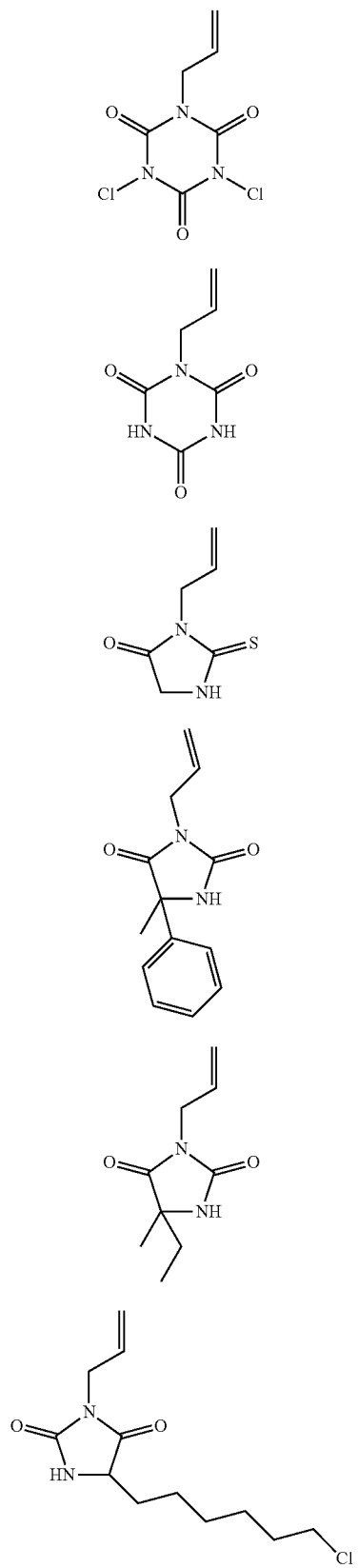
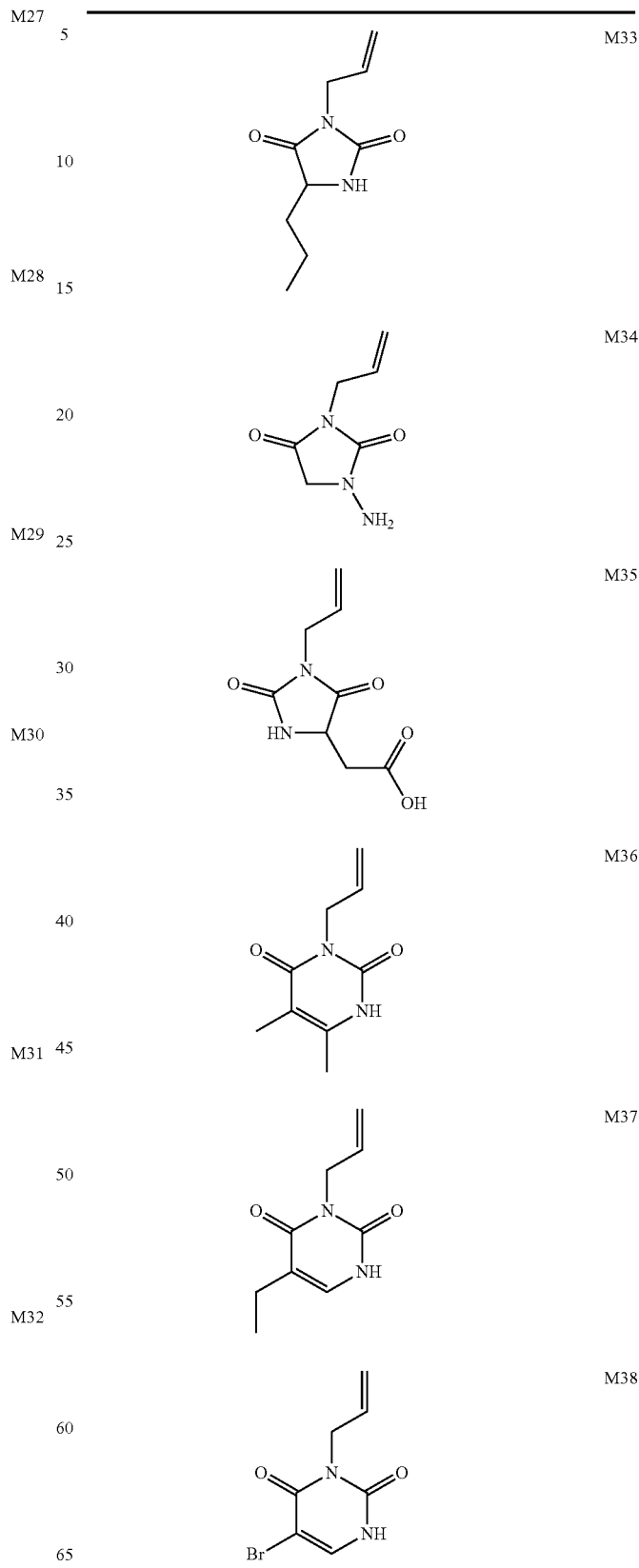

TABLE 2-continued
Structures of monomers M1-M50
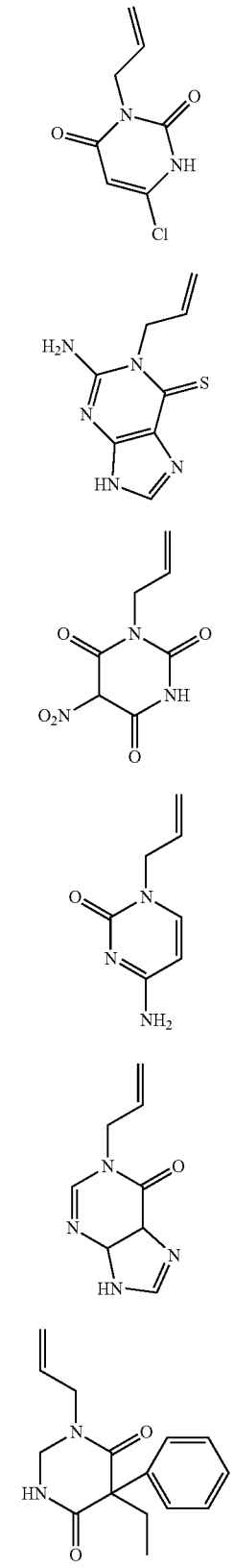

TABLE 2-continued
Structures of monomers M1-M50
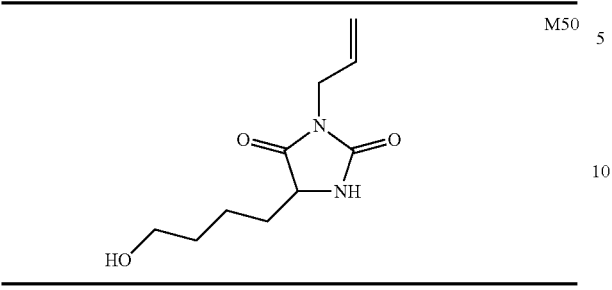
M50
TABLE 3
Structures of polymers P1-P50
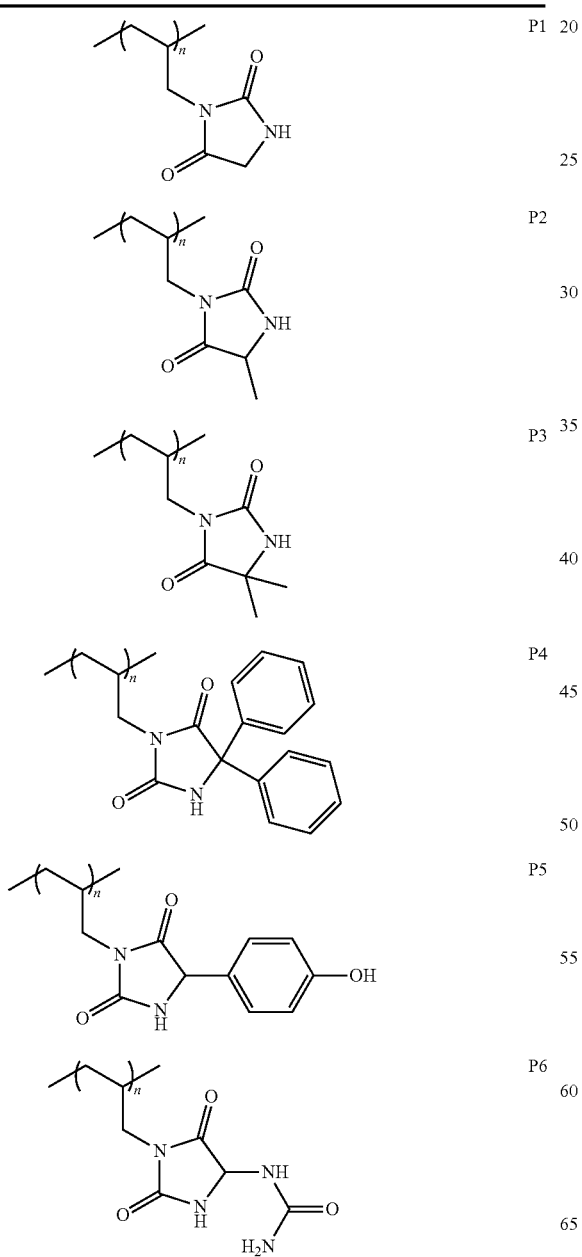
TABLE 3-continued
Structures of polymers P1-P50
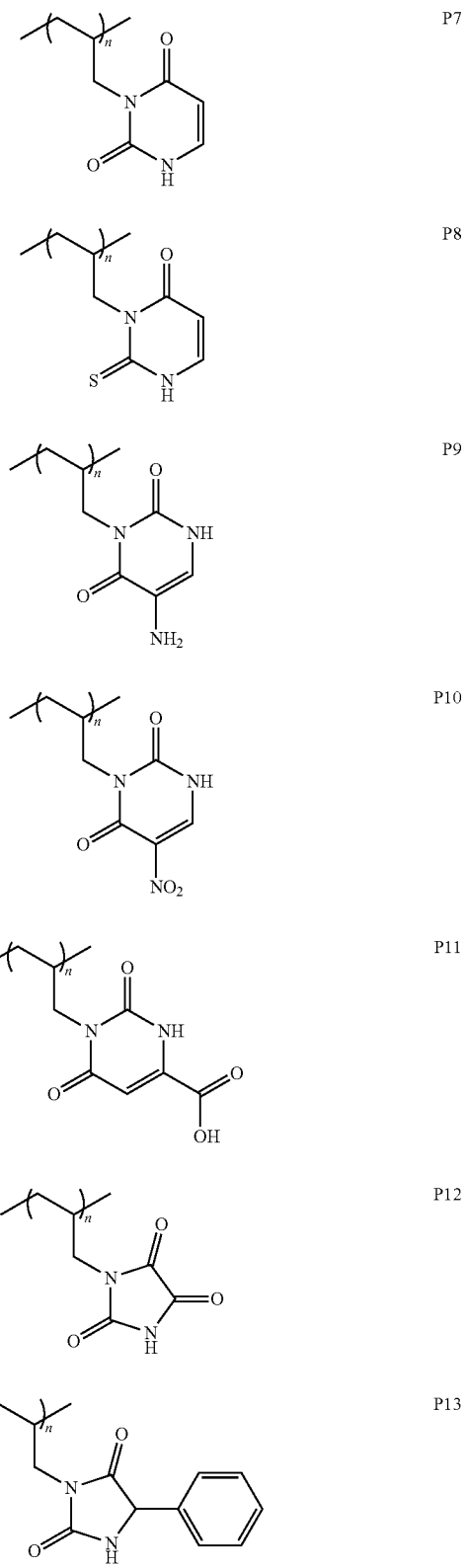

TABLE 3-continued
Structures of polymers P1-P50
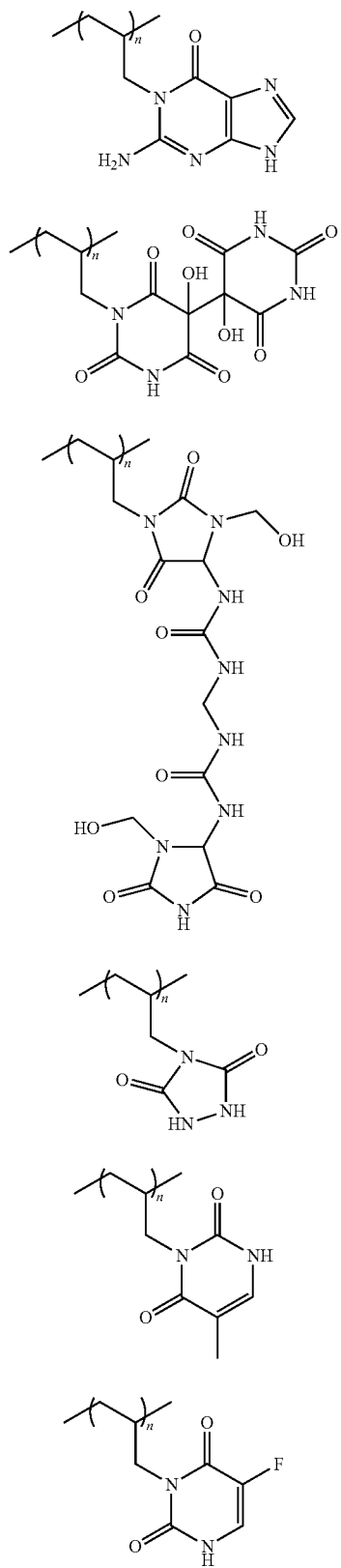
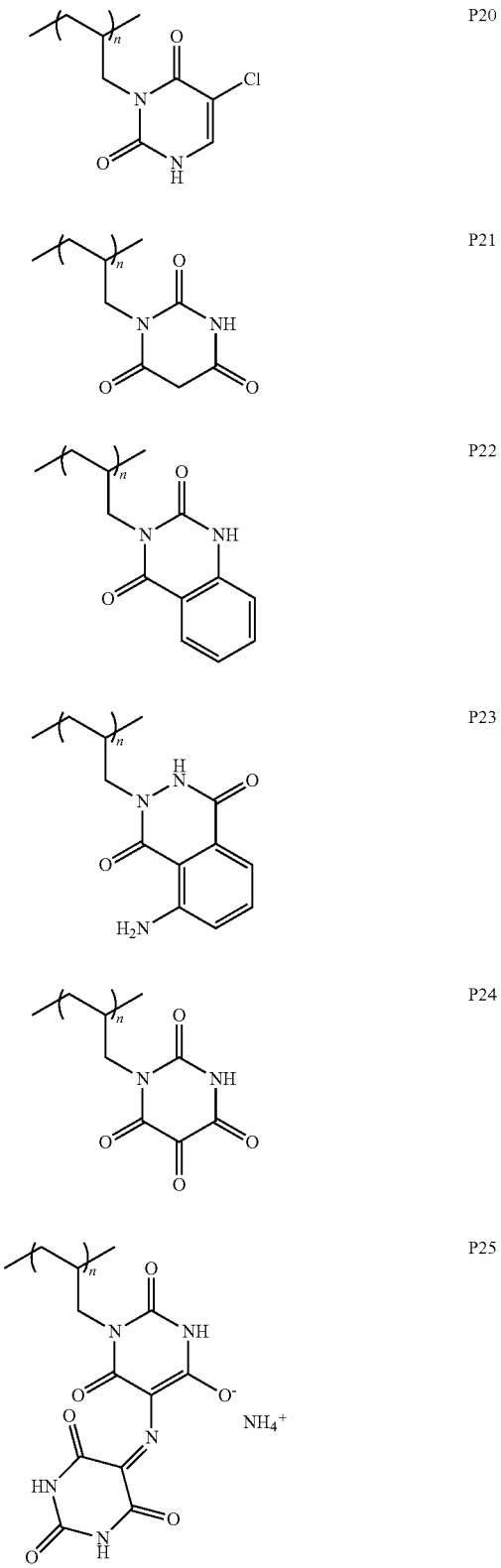

TABLE 3-continued
Structures of polymers P1-P50
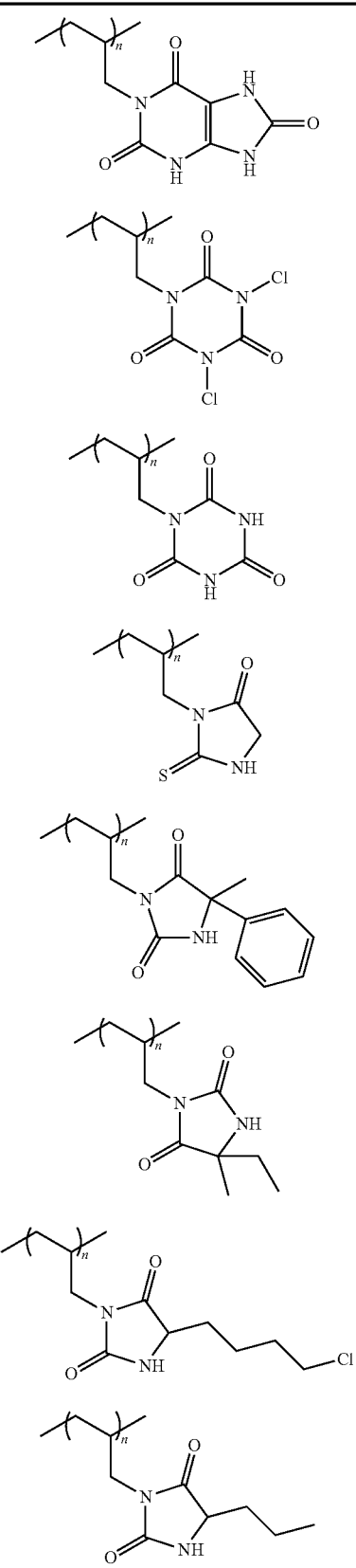
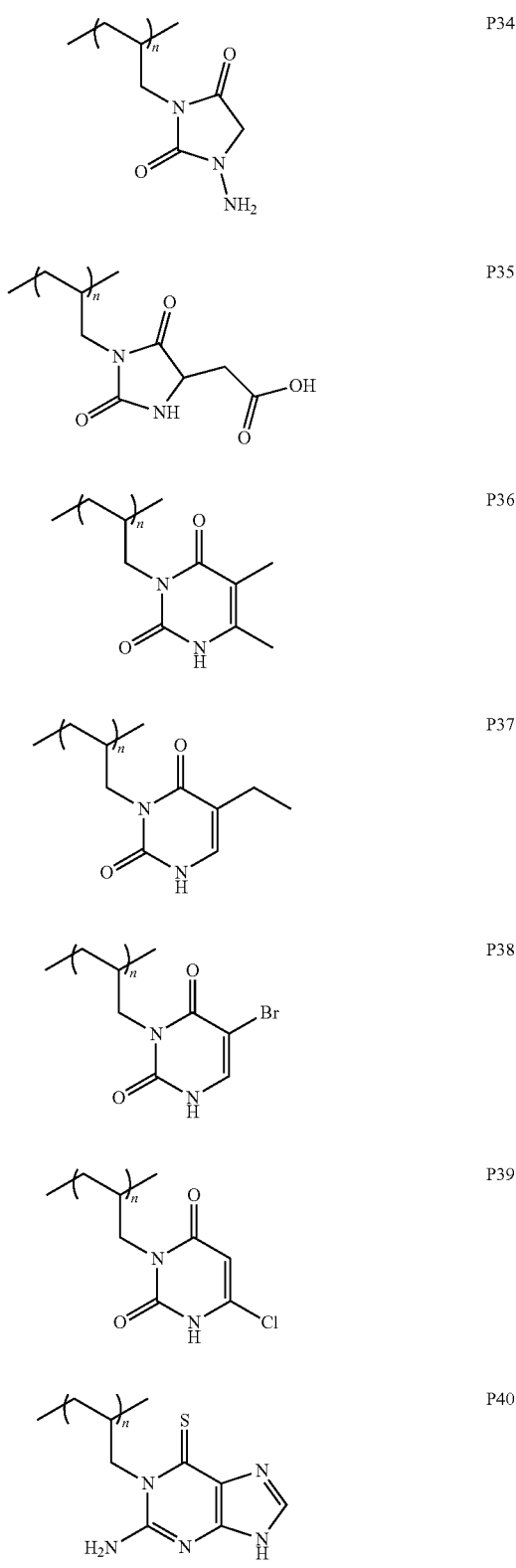

TABLE 3-continued
Structures of polymers P1-P50
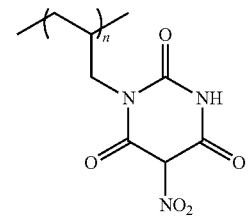 P41
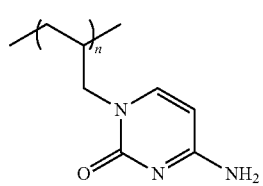 P42
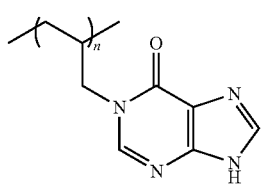 P43
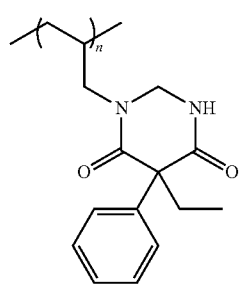 P44
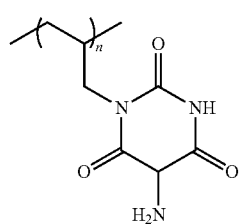 P45
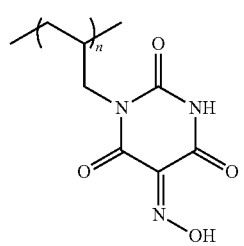 P46
TABLE 3-continued
Structures of polymers P1-P50
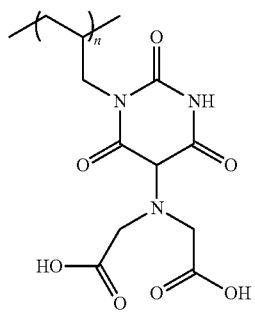 P47
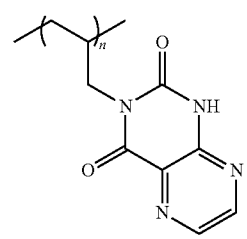 P48
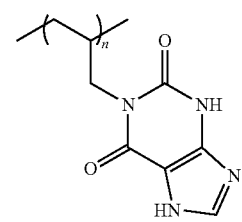 P49
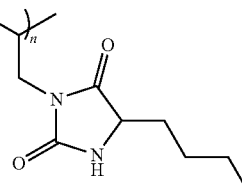 P50
TABLE 4
Structures of chlorinated polymers P1Cl-P50Cl
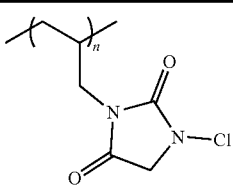 P1-Cl
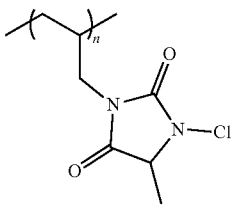 P2-Cl TABLE 4-continued
Structures of chlorinated polymers P1Cl-P50Cl
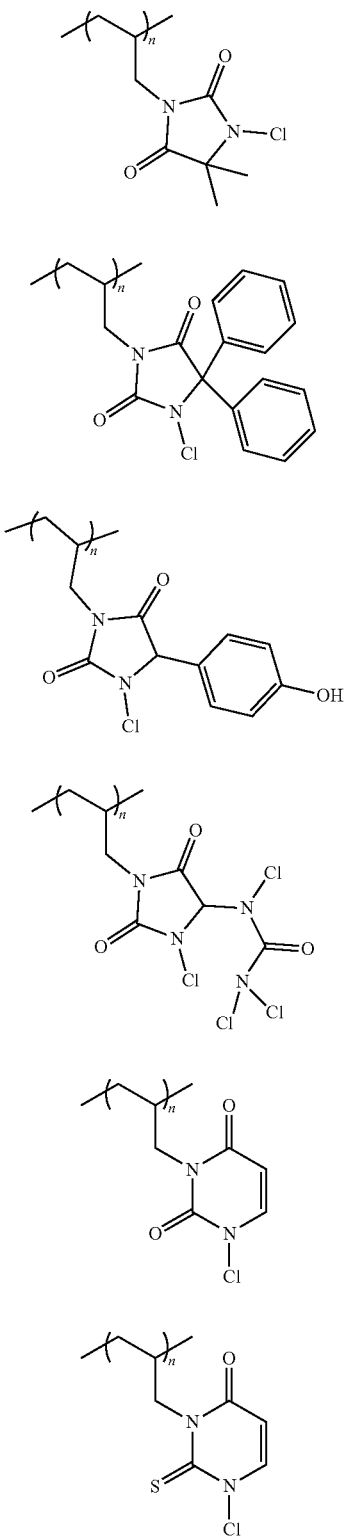
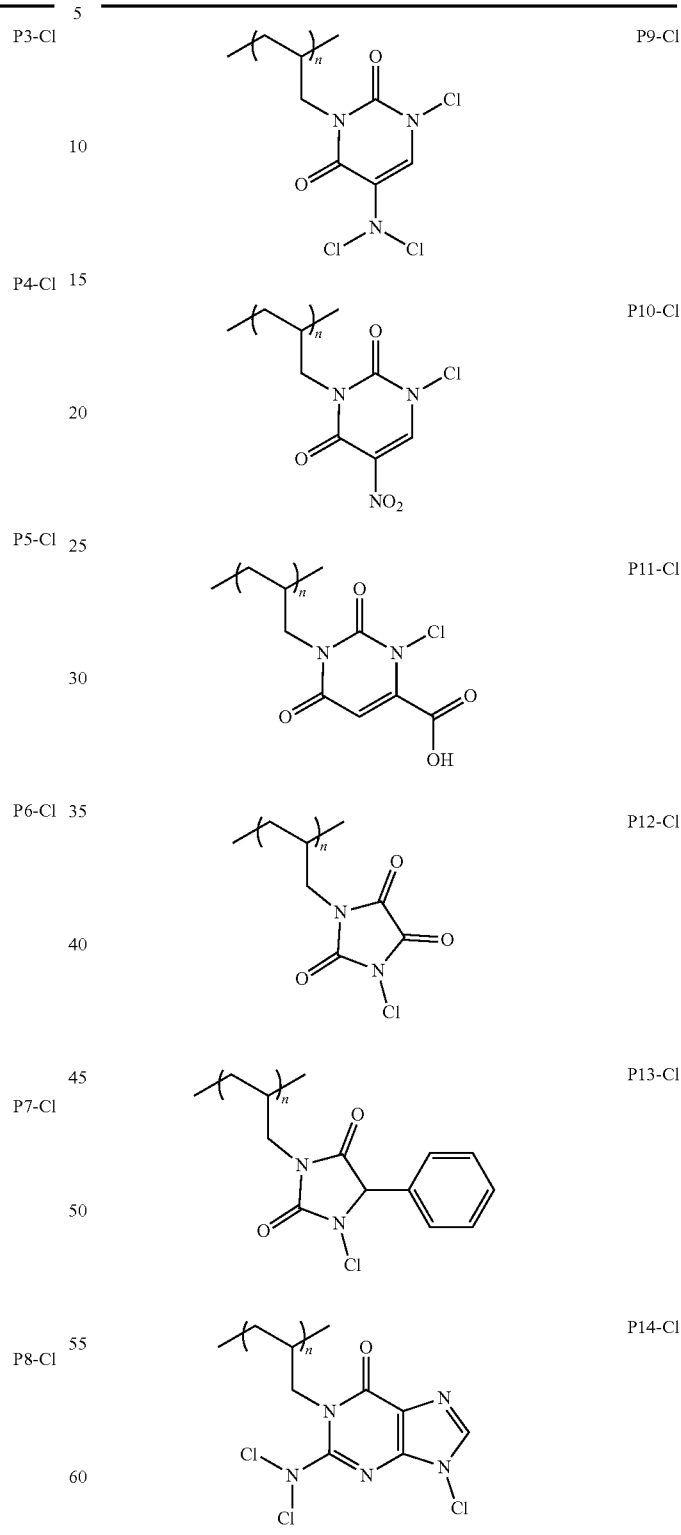

TABLE 4-continued
Structures of chlorinated polymers P1Cl-P50Cl
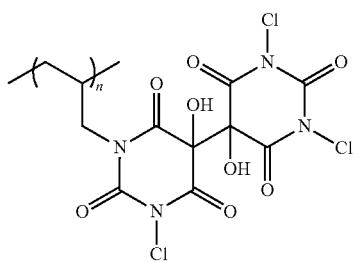
P15-Cl
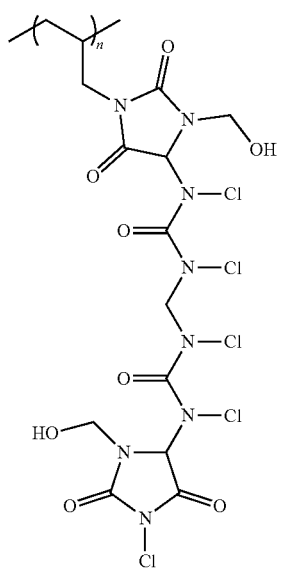
P16-Cl
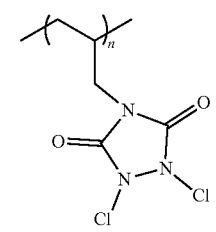
P17-Cl
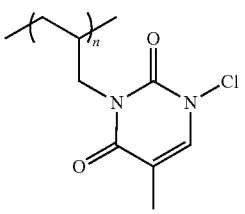
P18-Cl
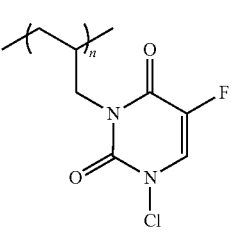
P19-Cl
TABLE 4-continued
Structures of chlorinated polymers P1Cl-P50Cl
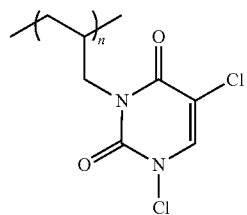
P20-Cl
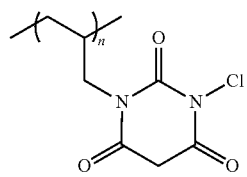
P21-Cl
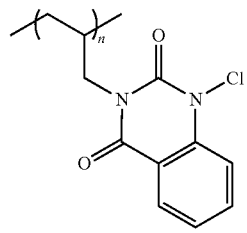
P22-Cl
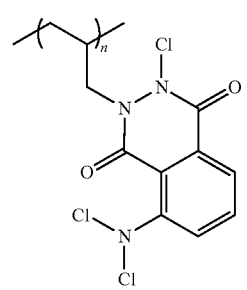
P23-Cl
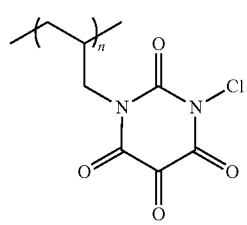
P24-Cl
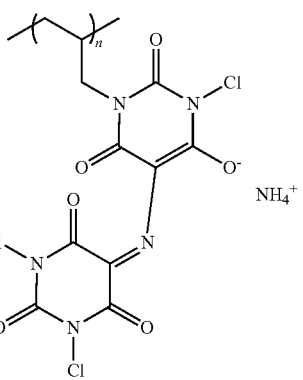
P25-Cl TABLE 4-continued
Structures of chlorinated polymers P1Cl-P50Cl
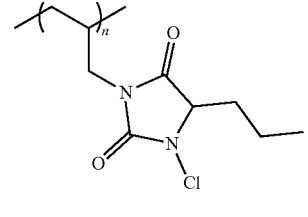

TABLE 4-continued
Structures of chlorinated polymers P1Cl-P50Cl
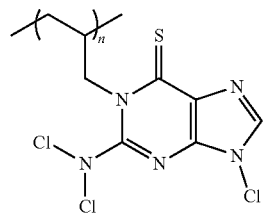
P40-Cl
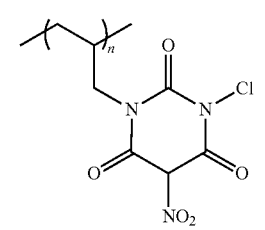
P41-Cl
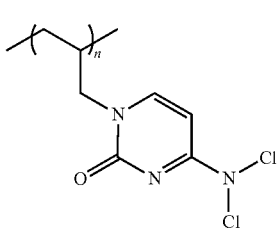
P42-Cl
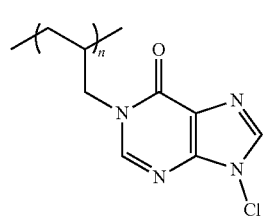
P43-Cl
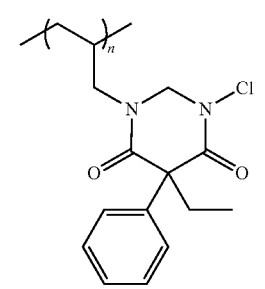
P44-Cl
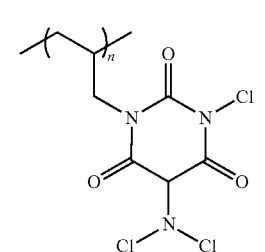
P45-Cl
TABLE 4-continued
Structures of chlorinated polymers P1Cl-P50Cl
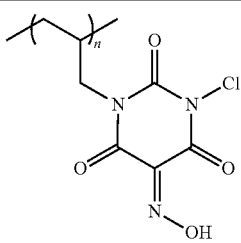
P46-Cl
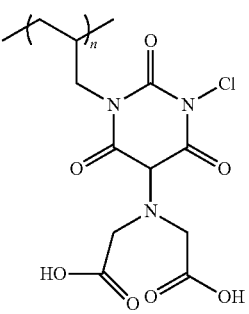
P47-Cl
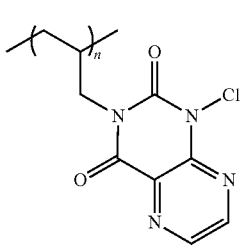
P48-Cl
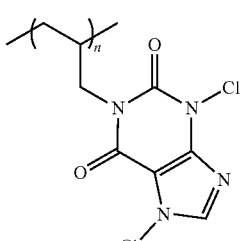
P49-Cl
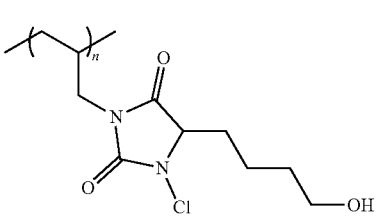
P50-Cl
TABLE 5
Structures of quaternized polymers P1Q-P50Q
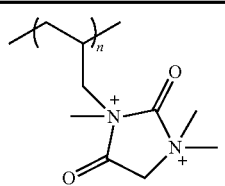
P1-Q TABLE 5-continued Structures of quaternized polymers P1Q-P50Q TABLE 5-continued
Structures of quarternized polymers P1Q-P50Q
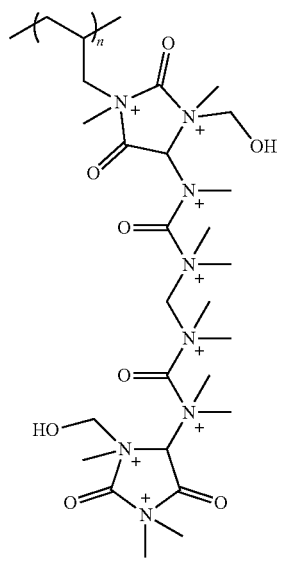 P16-Q
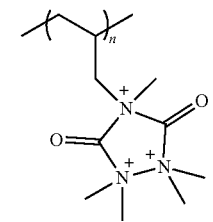 P17-Q
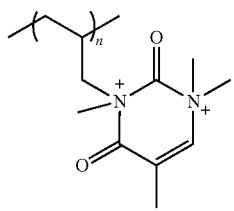 P18-Q
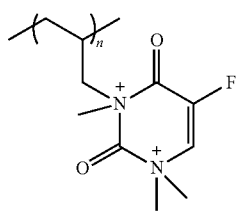 P19-Q
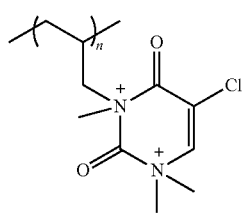 P20-Q
TABLE 5-continued
Structures of quarternized polymers P1Q-P50Q
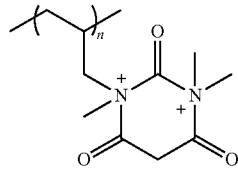 P21-Q
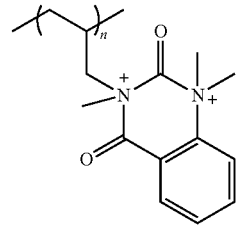 P22-Q
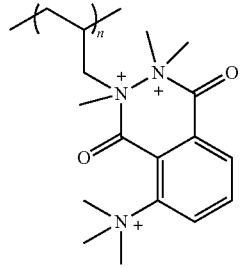 P23-Q
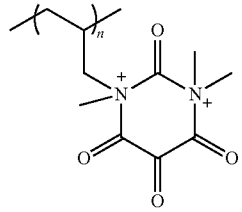 P24-Q
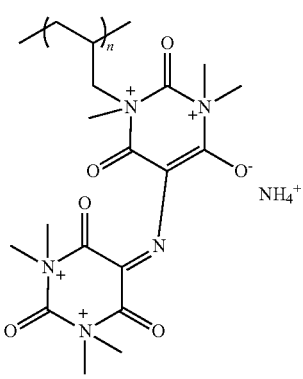 P25-Q
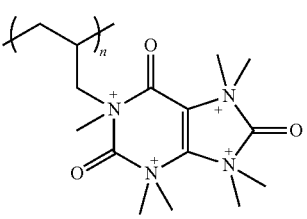 P26-Q TABLE 5-continued
Structures of quarternized polymers P1Q-P50Q
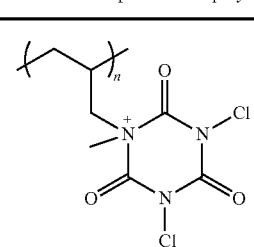 P27-Q
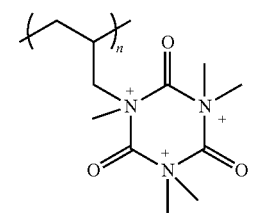 P28-Q
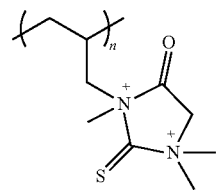 P29-Q
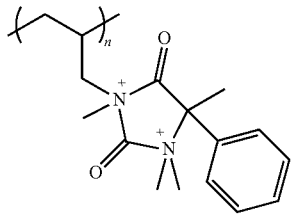 P30-Q
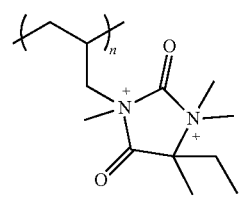 P31-Q
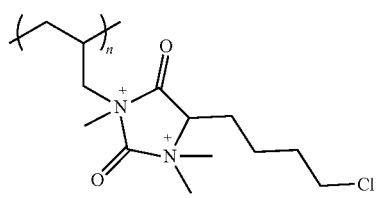 P32-Q
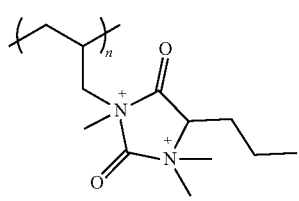 P33-Q
TABLE 5-continued
Structures of quarternized polymers P1Q-P50Q
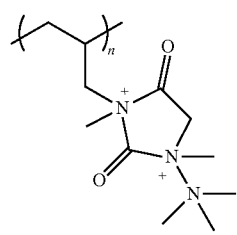 P34-Q
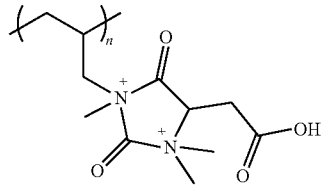 P35-Q
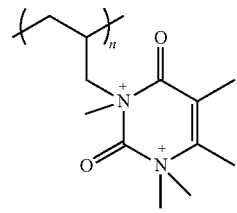 P36-Q
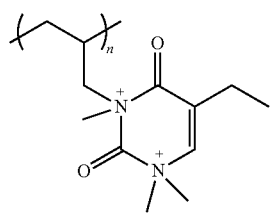 P37-Q
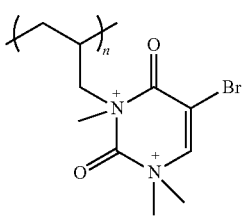 P38-Q
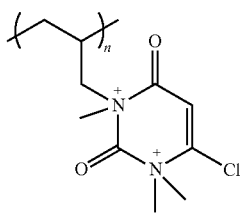 P39-Q
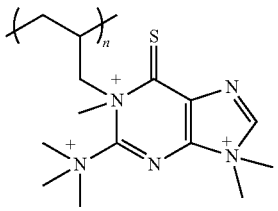 P40-Q TABLE 5-continued Structures of quarternized polymers P1Q-P50Q TABLE 6-continued
Structures of functionalized chlorinated-quaternized polymers P1ClQ-P50ClQ
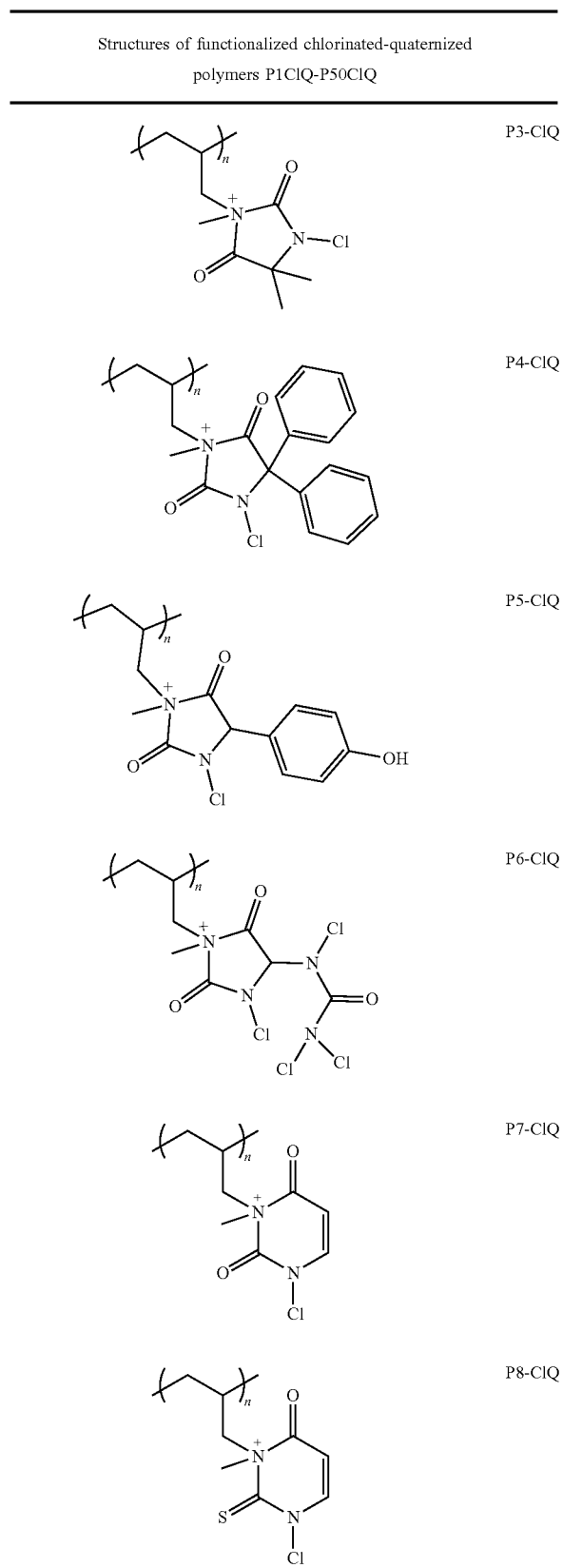
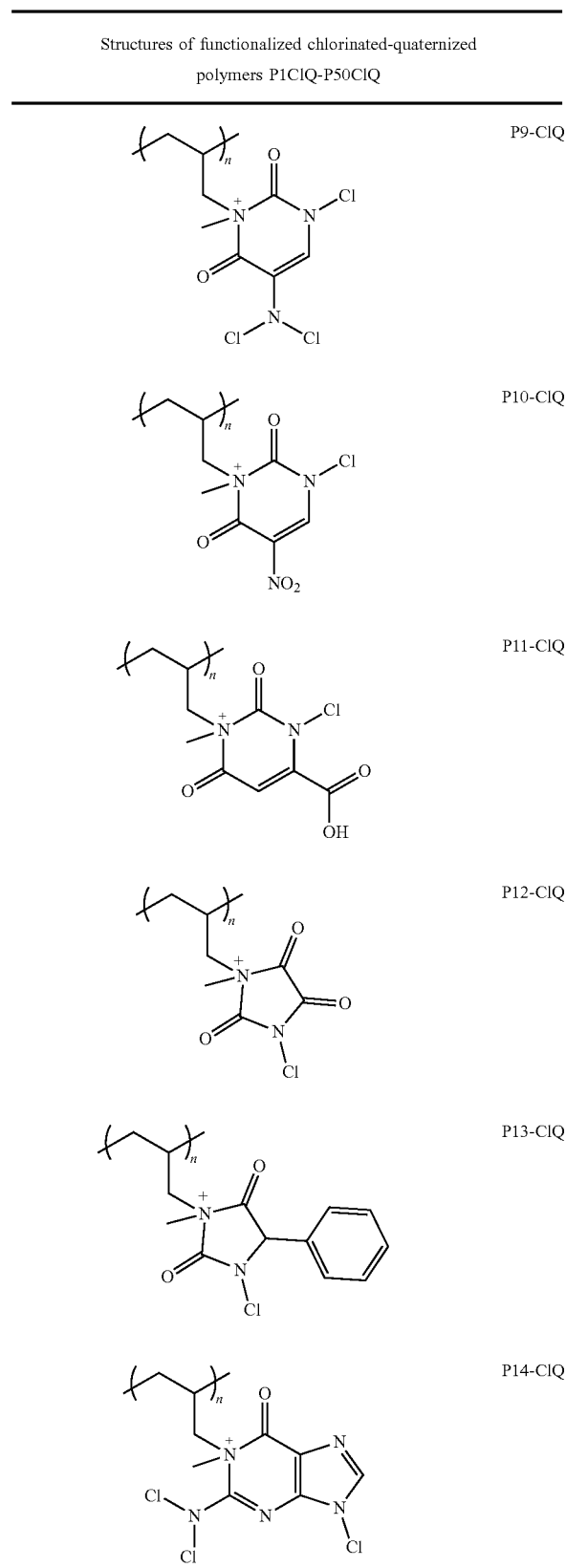

TABLE 6-continued
Structures of functionalized chlorinated-quaternized polymers P1ClQ-P50ClQ
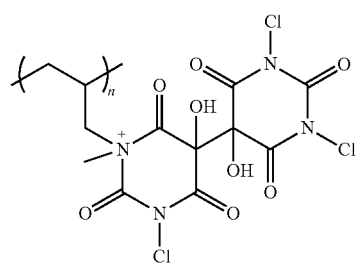
P15-ClQ
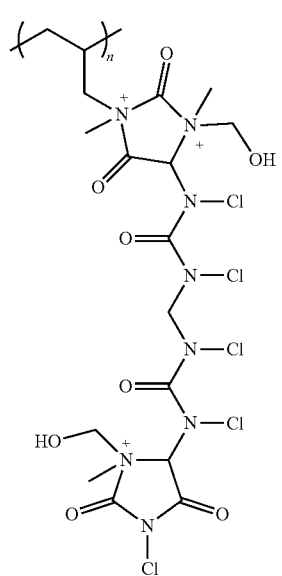
P16-ClQ
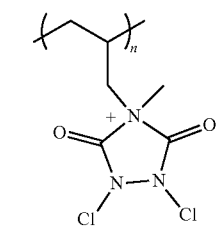
P17-ClQ
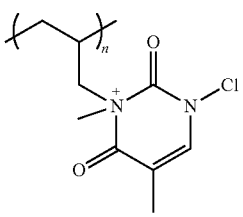
P18-ClQ
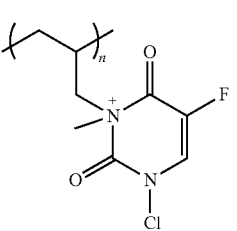
P19-ClQ
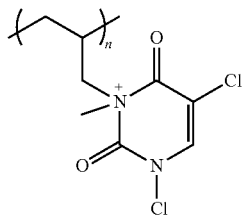
P20-ClQ
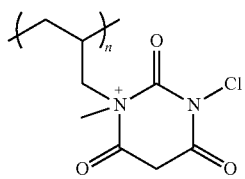
P21-ClQ
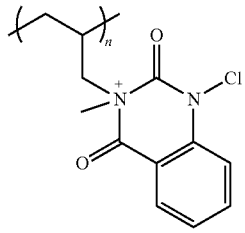
P22-ClQ
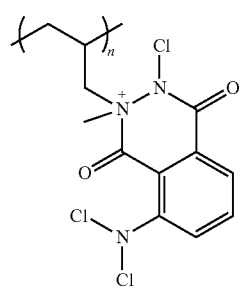
P23-ClQ
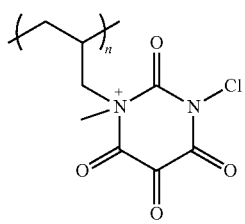
P24-ClQ
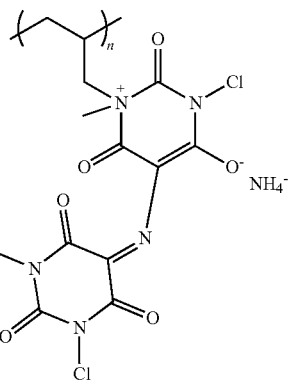
P25-ClQ TABLE 6-continued
Structures of functionalized chlorinated-quaternized polymers P1ClQ-P50ClQ
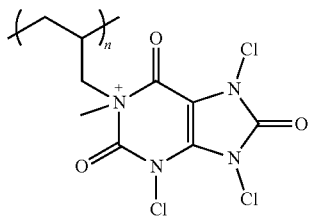 P26-ClQ
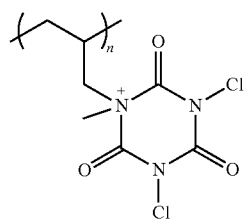 P27-ClQ
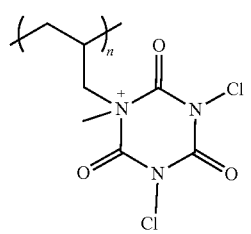 P28-ClQ
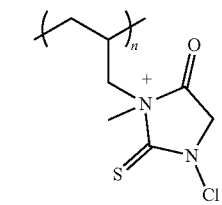 P29-ClQ
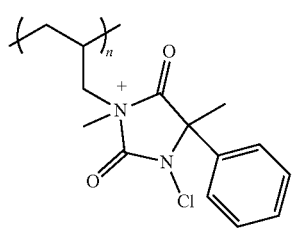 P30-ClQ
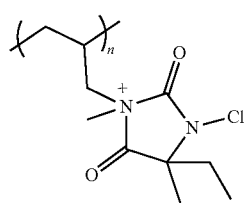 P31-ClQ
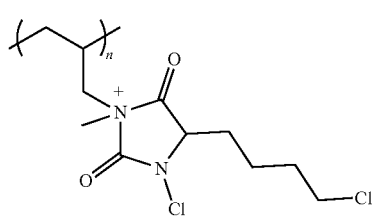 P32-ClQ
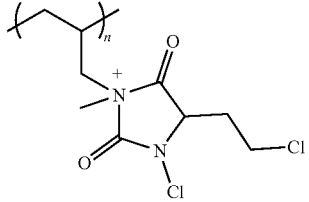 P33-ClQ
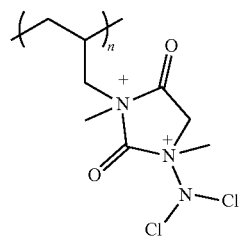 P34-ClQ
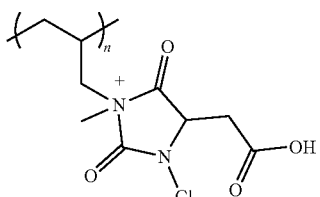 P35-ClQ
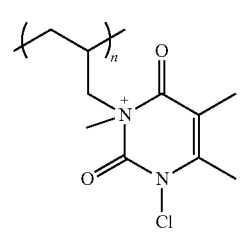 P36-ClQ
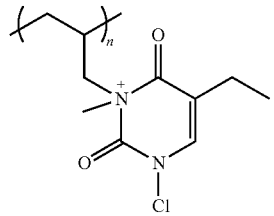 P37-ClQ
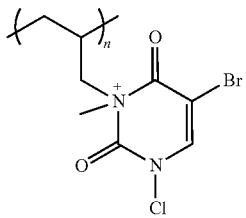 P38-ClQ
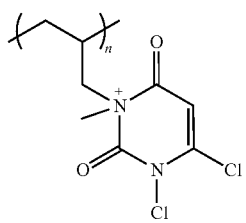 P39-ClQ TABLE 6-continued Structures of functionalized chlorinated-quaternized polymers P1ClQ-P50ClQ

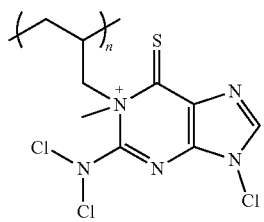
P40-ClQ

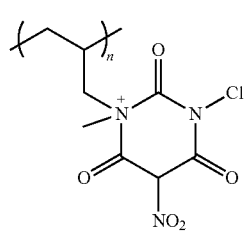
P41-ClQ

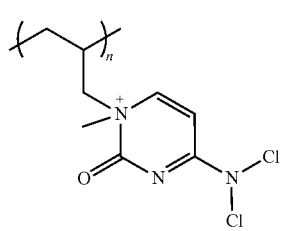
P42-ClQ

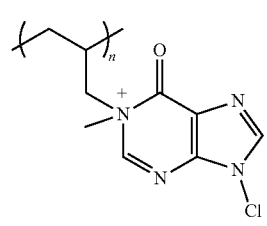
P43-ClQ

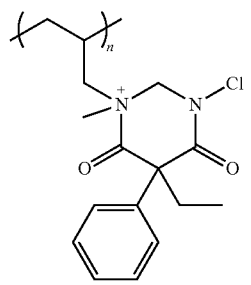
P44-ClQ

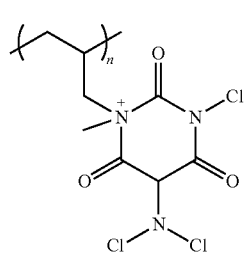
P45-ClQ

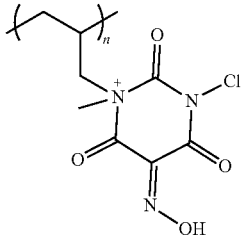
P46-ClQ

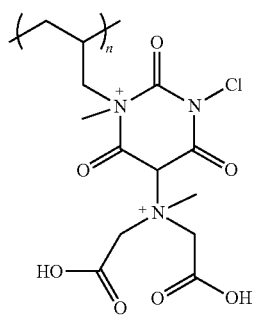
P47-ClQ

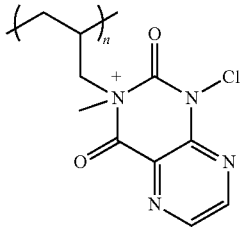
P48-ClQ

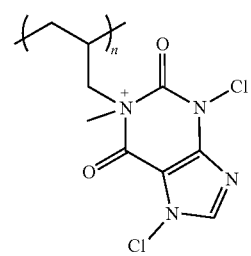
P49-ClQ

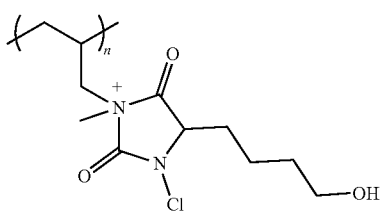
P50-ClQ

What is claimed is:

1. A polymer represented by the formula Q-[L-A]$_n$, wherein:

Q is an aliphatic chain optionally interrupted by one or more groups each independently selected from the group consisting of —O—, —CO—, —NH—, —S—, —CO—NH—, —NH—CO—, —NH—CO—NH—, cycloalkylene, cycloalkenylene, arylene, and heteroarylene, and further optionally substituted by one or more groups each independently selected from the group consisting of alkyl, —O-alkyl, cycloalkyl, cycloalkenyl, heterocyclyl, aryl, and heteroaryl;

L is selected from the group consisting of alkylene, alkenylene, alkynylene, cycloalkylene, cycloalkenylene, arylene, and heteroarylene, wherein said alkylene, alkenylene and alkynylene each independently is optionally interrupted by one or more groups each independently selected from the group consisting of —O—, —CO—, —NH—, —S—, —CO—NH—, —NH—CO—, —NH—CO—NH—, cycloalkylene, cycloalkenylene, arylene, and heteroarylene;

A each independently is a mono- or poly-cyclic heterocyclyl or heteroaryl of formula I, II, III, or IV:

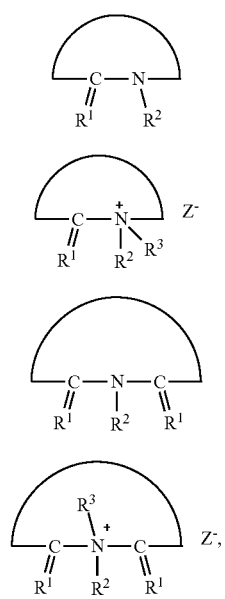

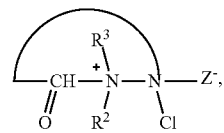

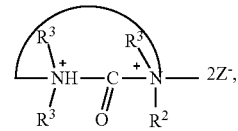

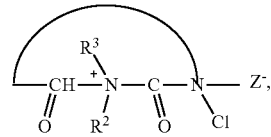

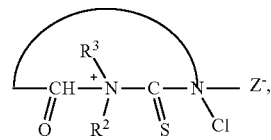

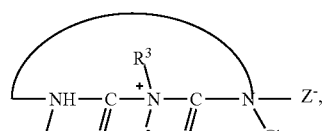

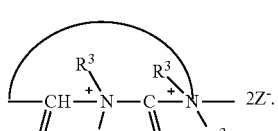

linked to group L via any one of the ring atoms, and optionally further substituted with one or more groups each independently selected from the group consisting of =O, =S, halogen, —CN, —OH, —COOH, =N—OH, —NO$_2$, alkyl, cycloalkyl, cycloalkenyl, heterocyclyl, aryl, heteroaryl, —N(R$^4$)$_2$, —NR$^4$C(O)N(R$^4$)$_2$, [—NR$^4$C(O)—NR$^4$—(CH$_2$)$_l$—NR$^4$C(O)—NR$^4$]$_m$—R$^5$, —N=R$^5$, and —O$^-$B$^+$, wherein said alkyl, cycloalkyl, cycloalkenyl, heterocyclyl, aryl, and heteroaryl each independently is optionally substituted with one or more groups each independently selected from the group consisting of halogen, —OH, —COOH, =O, =S, and —N(R$^4$)$_2$;

R$^1$ each independently is O or S;
R$^2$ is H, halogen, alkyl, or represents group L;
R$^3$ is alkyl;
R$^4$ each independently is H, halogen, alkyl, cycloalkyl, cycloalkenyl, heterocyclyl, aryl, or heteroaryl;
R$^5$ each independently is cycloalkyl or heterocyclyl;
l and m each independently is an integer of at least 1;
n is an integer of at least 1;
B$^+$ is an organic cation or a metal ion; and
Z$^-$ is a counter anion,
provided that at least about 1% of the A groups comprises both at least one quaternary ammonium group and at least one N-halogen bond.

2. The polymer of claim 1, wherein A each independently is a mono- or poly-cyclic heterocyclyl or heteroaryl of formula IIa, IIb, IVa, IVb, IVc, or IVd:

3. The polymer of claim 1, represented by formula V:

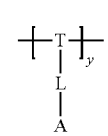

wherein:
T is a group of the formula C$_p$R$^6$$_{2p-1}$ optionally interrupted by one or more groups each independently selected from the group consisting of —O—, —CO—, —NH—, —S—, —CO—NH—, —NH—CO—, —NH—CO—NH—, cycloalkylene, cycloalkenylene, arylene, and heteroarylene;
R$^6$ each independently is H, alkyl, —O-alkyl, cycloalkyl, cycloalkenyl, heterocyclyl, aryl, or heteroaryl;
p is an integer of at least 1; and
y is an integer of at least 2.

4. The polymer of claim 3, wherein:
(i) R$^6$ each independently is H or alkyl; or
(ii) p is 2 or 3; or
(iii) L is (C$_1$-C$_6$)alkylene.

5. The polymer of claim 3, wherein A is a 5-7-membered mono-cyclic or 9-12-membered poly-cyclic heterocyclyl of the formula I, II, III, or IV.

6. The polymer of claim 5, wherein:
(i) A is a group of the formula II, wherein $R^1$ is O or S; or of the formula IV, wherein one of $R^1$ is O and the other one of $R^1$ is O or S; and
(ii) $R^2$ represents group L.

7. The polymer of claim 6, wherein A is a group of the formula IV, wherein $R^3$ is methyl; and the ring comprises a further nitrogen atom adjacent to one of the —C($R^1$)— groups and substituted with Cl.

8. The polymer of claim 7, wherein:
(i) A is a group of formula $IVa_1$:

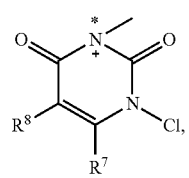

IVa₁ wherein $R^7$ and $R^8$ each independently is selected from the group consisting of H, —NH₂, halogen, —N(halogen)₂, ($C_1$-$C_6$)alkyl, —NO₂, —COOH, —O⁻B⁺, and —N=heterocyclyl, wherein said alkyl and heterocyclyl each independently is optionally substituted with one or more groups each independently selected from the group consisting of halogen, —OH, —COOH, =O, =S, and —N($R^4$)₂;

(ii) A is a group of formula $IVb_1$:

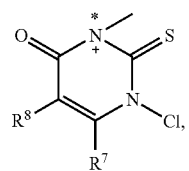

IVb₁ wherein $R^7$ and $R^8$ each independently is selected from the group consisting of H, —NH₂, halogen, —N(halogen)₂, ($C_1$-$C_6$)alkyl, —NO₂, —COOH, —O⁻B⁺, and —N=heterocyclyl, wherein said alkyl and heterocyclyl each independently is optionally substituted with one or more groups each independently selected from the group consisting of halogen, —OH, —COOH, =O, =S, and —N($R^4$)₂;

(iii) A is a group of formula $IVa_2$:

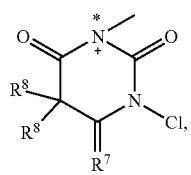

IVa₂ wherein:
$R^7$ is O or S; and
$R^8$ each independently is selected from the group consisting of H, —NH₂, halogen, —N(halogen)₂, ($C_1$-$C_6$)alkyl, —NO₂, —COOH, —OH, —O⁻B⁺, heterocyclyl, and —N(CH₂COOH)₂, wherein said alkyl and heterocyclyl each independently is optionally substituted with one or more groups each independently selected from the group consisting of halogen, —OH, —COOH, =O, =S, and —N($R^4$)₂;

(iv) A is a group of formula $IVa_3$:

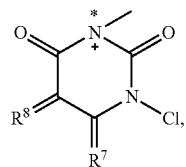

IVa₃ wherein:
$R^7$ is O or S; and
$R^8$ is =N—OH, O, or S; or (v) A is a group of formula $IVa_4$:

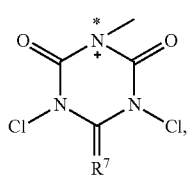

IVa₄ wherein $R^7$ is O or S;

(vi) A is a group of the formula IV, selected from the group consisting of

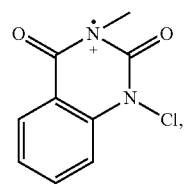

IVa₅

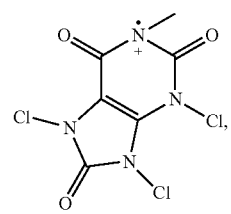

IVa₆

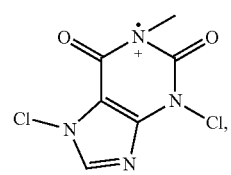

IVa₇

-continued

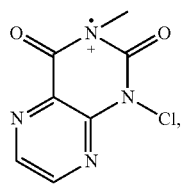
IVa8

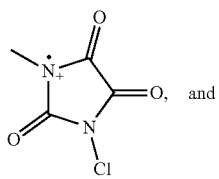
IVa9

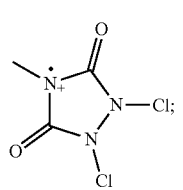
IVa10

(vii) A is a group of formula IVa11:

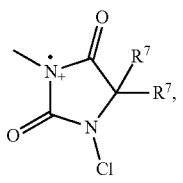
IVa11 wherein $R^7$ each independently is selected from the group consisting of H, $(C_1-C_6)$alkyl, aryl, and —$NR^4C(O)N(R^4)_2$, wherein said alkyl and aryl each independently is optionally substituted with one or more groups each independently selected from the group consisting of halogen, —OH, —COOH, =O, =S, and —$N(R^4)_2$; or (viii) A is a group of the formula IV, selected from the group IVb2:

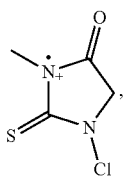
IVb2 wherein • represents the point of attachment to group L.

9. The polymer of claim 8, wherein:
(i) A is a group of the formula IVa1; and at least one of $R^7$ and $R^8$ is H, —$NH_2$, or methyl;
(ii) A is a group of the formula IVa1; and $R^7$ and $R^8$ each is H, —$NH_2$, or methyl;
(iii) A is a group of the formula IVa1; $R^7$ is H; and $R^8$ is —$NCl_2$, —$NO_2$, methyl, ethyl, F, Cl, or Br;
(iv) A is a group of the formula IVa1; $R^7$ is —COOH; and $R^8$ is H;
(v) A is a group of the formula IVa1; $R^7$ is Cl; and $R^8$ is H;
(vi) A is a group of the formula IVa1; $R^7$ is —$O^-B^+$, wherein $B^+$ is ammonium; and $R^8$ is 1,3-dichloro-5-iminopyrimidinyl-2,4,6(1H,3H,5H)-trione;
(vii) A is a group of the formula IVb1; and at least one of $R^7$ and $R^8$ is H, —$NH_2$, or methyl;
(viii) A is a group of the formula IVb1; and $R^7$ and $R^8$ each is H;
(ix) A is a group of the formula IVa2; $R^7$ is O; one of $R^8$ is —OH; and the other one of $R^8$ is 1,3-dichloro-5-hydroxy-5-pyrimidinyl-2,4,6(1H,3H,5H)-trione;
(x) A is a group of the formula IVa2; $R^7$ is O; and $R^8$ each is H;
(xi) A is a group of the formula IVa2; $R^7$ is O; one of $R^8$ is —$NO_2$; and the other one of $R^8$ is H;
(xii) A is a group of the formula IVa2; $R^7$ is O; one of $R^8$ is —$NCl_2$; and the other one of $R^8$ is H;
(xiii) A is a group of the formula IVa2; $R^7$ is O; one of $R^8$ is —$N(CH_2COOH)_2$; and the other one of $R^8$ is H;
(xiv) A is a group of the formula IVa3; $R^7$ is O; and $R^8$ is =N—OH;
(xv) A is a group of the formula IVa3; and $R^7$ and $R^8$ each is O;
(xvi) A is a group of the formula IVa4; and $R^7$ is O;
(xvii) A is a group of the formula IVa11; and $R^7$ each is H, methyl, or phenyl;
(xviii) A is a group of the formula IVa11; one of $R^7$ is methyl; and the other one of $R^7$ is H, ethyl, or phenyl; or
(xix) A is a group of the formula IVa11; and one of $R^7$ is H; and the other one of $R^7$ is phenyl, 4-hydroxyphenyl, propyl, hydroxybutanyl, chlorobutanyl, carboxymethyl, or —$N(Cl)C(O)NCl_2$.

10. The polymer of claim 6, wherein A is a group of the formula IV, selected from the group IV1:

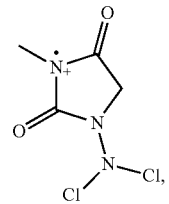
IV1 wherein • represents the point of attachment to group L.

11. The polymer of claim 6, wherein A is a group of the formula II, selected from the group consisting of:

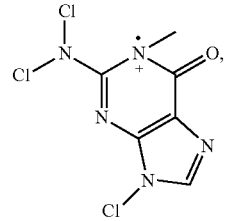
IIc1

-continued

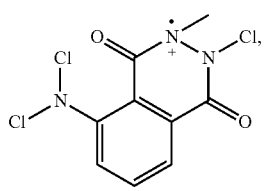 IIa₁

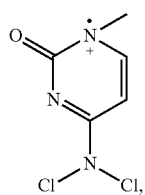 IIc₂

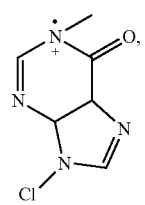 IIc₃

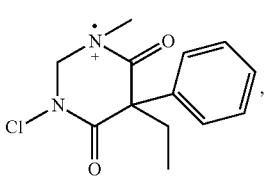 IIc₄

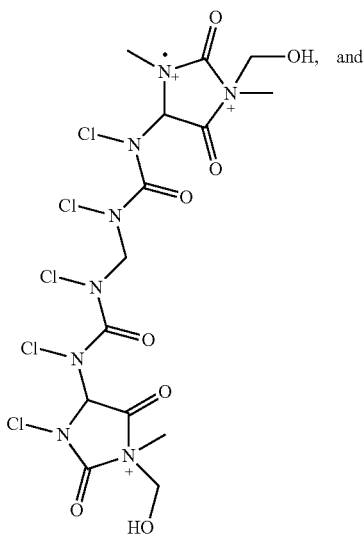 IIc₅

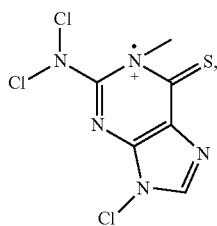 IIc₆ wherein • represents the point of attachment to group L.

12. The polymer of claim 3, wherein:
(i) R⁶ each independently is H, or alkyl;
(ii) p is 2 or 3;
(iii) L is (C₁-C₆)alkylene; and
(iv) A is a group of the formula II, wherein R¹ is O or S; or of the formula IV, wherein one of R¹ is O and the other one of R¹ is O or S; and R² represents group L.

13. The polymer of claim 12, wherein A is a group of the formula IV, wherein one of R¹ is O and the other one of R¹ is O or S; R³ is methyl; and the ring comprises a further nitrogen atom adjacent to one of the —C(R¹)— groups and substituted with Cl.

14. The polymer of claim 13, wherein:
(i) A is a group of the formula IVa₁:

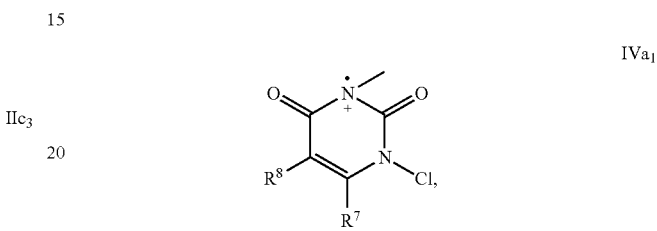

IVa₁ wherein R⁷ and R⁸ each independently is selected from the group consisting of H, —NH₂, halogen, —N(halogen)₂, (C₁-C₆)alkyl, —NO₂, —COOH, —O⁻B⁺, and —N=heterocyclyl, wherein said alkyl and heterocyclyl each independently is optionally substituted with one or more groups each independently selected from the group consisting of halogen, —OH, —COOH, =O, =S, and —N(R⁴)₂;

(ii) A is a group of the formula IVb₁:

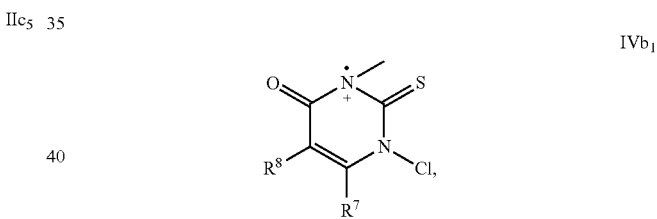

IVb₁ wherein R⁷ and R⁸ each independently is selected from the group consisting of H, —NH₂, halogen, —N(halogen)₂, (C₁-C₆)alkyl, —NO₂, —COOH, —O⁻B⁺, and —N=heterocyclyl, wherein said alkyl and heterocyclyl each independently is optionally substituted with one or more groups each independently selected from the group consisting of halogen, —OH, —COOH, =O, =S, and —N(R⁴)₂;

(iii) A is a group of the formula IVa₂:

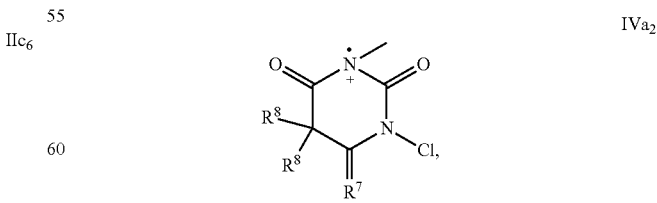

IVa₂ wherein:
R⁷ is O or S; and
R⁸ each independently is selected from the group consisting of H, —NH₂, halogen, —N(halogen)₂, (C₁-

$C_6$)alkyl, —$NO_2$, —COOH, —OH, —$O^-B^+$, heterocyclyl, and —$N(CH_2COOH)_2$, wherein said alkyl and heterocyclyl each independently is optionally substituted with one or more groups each independently selected from the group consisting of halogen, —OH, —COOH, =O, =S, and —$N(R^4)_2$;

(iv) A is a group of the formula $IVa_3$:

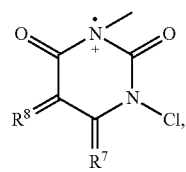

$IVa_3$ wherein:
$R^7$ is O or S; and
$R^8$ is =N—OH, O, or S;

(v) A is a group of the formula $IVa_4$:

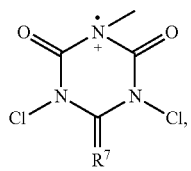

$IVa_4$ wherein $R^7$ is O or S;

(vi) A is a group selected from the group consisting of $IVa_5$, $IVa_6$, $IVa_7$, $IVa_8$, $IVa_9$, and $IVa_{10}$:

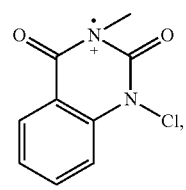

$IVa_5$

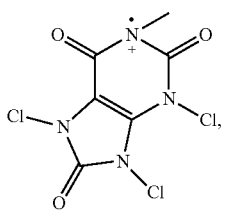

$IVa_6$

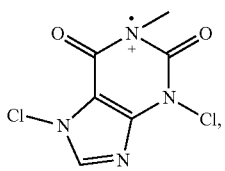

$IVa_7$

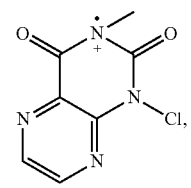

$IVa_8$

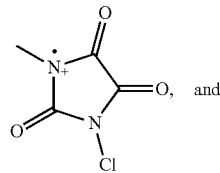

$IVa_9$

, and

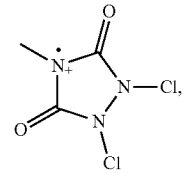

$IVa_{10}$ (vii) A is a group of the formula $IVa_{11}$:

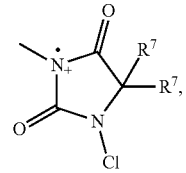

$IVa_{11}$ wherein $R^7$ each independently is selected from the group consisting of H, ($C_1$-$C_6$)alkyl, aryl, and —$NR^4C(O)N(R^4)_2$, wherein said alkyl and aryl each independently is optionally substituted with one or more groups each independently selected from the group consisting of halogen, —OH, —COOH, =O, =S, and —$N(R^4)_2$; or (viii) A is the group $IVb_2$:

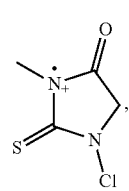

$IVb_2$ wherein • represents the point of attachment to group L.

15. The polymer of claim 14, wherein:
(i) A is a group of the formula $IVa_1$; and at least one of $R^7$ and $R^8$ is H, —$NH_2$, or methyl;
(ii) A is a group of the formula $IVa_1$; and $R^7$ and $R^8$ each is H, —$NH_2$, or methyl;
(iii) A is a group of the formula $IVa_1$; $R^7$ is H; and $R^8$ is —$NCl_2$, —$NO_2$, methyl, ethyl, F, Cl, Br, or —$NH_2$;
(iv) A is a group of the formula $IVa_1$; $R^7$ is —COOH; and $R^8$ is H;
(v) A is a group of the formula $IVa_1$; $R^7$ is Cl; and $R^8$ is H;

(vi) A is a group of the formula IVa$_1$; R$^7$ is —O$^-$B$^+$, wherein B$^+$ is ammonium; and R$^8$ is 1,3-dichloro-5-iminopyrimidinyl-2,4,6(1H,3H,5H)-trione;

(vii) A is a group of the formula IVb$_1$; and at least one of R$^7$ and R$^8$ is H, —NH$_2$, or methyl;

(viii) A is a group of the formula IVb$_1$; and R$^7$ and R$^8$ each is H;

(ix) A is a group of the formula IVa$_2$; R$^7$ is O; one of R$^8$ is —OH; and the other one of R$^8$ is 1,3-dichloro-5-hydroxy-5-pyrimidinyl-2,4,6(1H,3H,5H)-trione;

(x) A is a group of the formula IVa$_2$; R$^7$ is O; and R$^8$ each is H;

(xi) A is a group of the formula IVa$_2$; R$^7$ is O; one of R$^8$ is —NO$_2$; and the other one of R$^8$ is H;

(xii) A is a group of the formula IVa$_2$; R$^7$ is O; one of R$^8$ is —NCl$_2$; and the other one of R$^8$ is H;

(xiii) A is a group of the formula IVa$_2$; R$^7$ is O; one of R$^8$ is —N(CH$_2$COOH)$_2$; and the other one of R$^8$ is H;

(xiv) A is a group of the formula IVa$_3$; R$^7$ is O; and R$^8$ is =N—OH;

(xv) A is a group of the formula IVa$_2$; and R$^7$ and R$^8$ each is O;

(xvi) A is a group of the formula IVa$_4$; and R$^7$ is O;

(xvii) A is a group of the formula IVa$_{11}$; and R$^7$ each is H, methyl, or phenyl;

(xviii) A is a group of the formula IVa$_{11}$; one of R$^7$ is methyl; and the other one of R$^7$ is H, ethyl, or phenyl; or (xix) A is a group of the formula IVa$_{11}$; and one of R$^7$ is H; and the other one of R$^7$ is phenyl, 4-hydroxyphenyl, propyl, hydroxybutanyl, chlorobutanyl, carboxymethyl, or —N(Cl)C(O)NCl$_2$.

16. The polymer of claim 12, wherein:

(i) A is a group selected from the group consisting of:

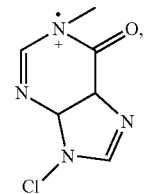

IIc$_1$

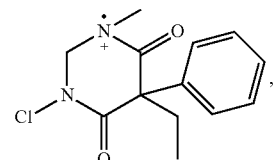

IIa$_1$

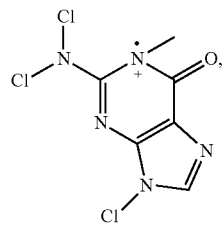

IIc$_2$

IIc$_3$

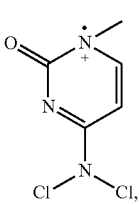

IIc$_4$

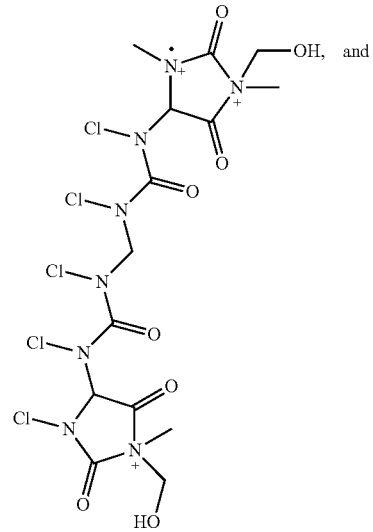

IIc$_5$

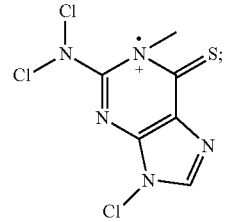

IIc$_6$ or (ii) A is the group IV$_1$:

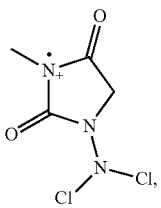

IVa$_{11}$ wherein • represents the point of attachment to group L.

17. A composition comprising a polymer according to claim 1.

18. The composition comprising a polymer according to claim 14.

19. A surface coating or disinfecting material comprising a composition according to claim 17.

20. A wet wipe impregnated with, or comprising, a composition according to claim 17.

21. A method for disinfecting a surface, comprising applying to said surface a disinfecting material according to claim 19, to thereby render said surface antiseptic.

22. The method of claim 21, wherein said surface is smooth, rough, tough, or soft surface; or wherein said surface is selected from the group consisting of a cardboard, cloth, stainless steel or metallic surface, plastic, glass, stone, rubber, ceramic, brick, silicon, asphalt, concrete, nylon, painted surface, wood, paper, surgical glove, and skin.

23. The composition comprising a polymer according to claim 15.

24. The composition comprising a polymer according to claim 16.

* * * * *